(12) United States Patent
Schmidt et al.

(10) Patent No.: US 7,464,878 B2
(45) Date of Patent: *Dec. 16, 2008

(54) AUTOMATICALLY-ACTIVATED WIRELESS HAND-SUPPORTABLE LASER SCANNING BAR CODE SYMBOL READING SYSTEM WITH AUTOMATIC COMMUNICATION RANGE DEPENDENT CONTROL

(75) Inventors: Mark Schmidt, Williamstown, NJ (US); Garrett Russell, Wilmington, DE (US); David M. Wilz, Sr., Sewell, NJ (US); Robert Blake, Woodbury Heights, NJ (US); Donald T. Hudrick, Sicklerville, NJ (US); Stephen J. Colavito, Brookhaven, PA (US); C. Harry Knowles, Moorestown, NJ (US); George Rockstein, Audubon, NJ (US); Xiaoxun Zhu, Marlton, NJ (US); John Bonanno, Woodbury, NJ (US); Sung Byun, Voorhees, NJ (US); Congwei Xu, Suzhou (CN); Min Jiang, Jiangsu (CN); Lin Wang, Suzhou (CN); Meng Hu, Suzhou (CN); Hongjian Jin, Suzhou Industrial Park (CN); MingQing Ji, Suzhou New District (CN); Shamei Shi, Suzhou (CN); Ka Man Au, Philadelphia, PA (US); Patrick Giordano, Blackwood, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/520,429

(22) Filed: Sep. 13, 2006

(65) Prior Publication Data
US 2007/0145147 A1   Jun. 28, 2007

Related U.S. Application Data

(63) Continuation of application No. 10/755,869, filed on Jan. 12, 2004, now Pat. No. 7,111,786, which is a continuation-in-part of application No. 10/342,433, filed on Jan. 12, 2003, now Pat. No. 7,028,904, and a continuation-in-part of application No. 10/611,813, filed on Jul. 1, 2003, now Pat. No. 7,137,561, and a continuation-in-part of application No. 10/630,622, filed on Jul. 30, 2003, now Pat. No. 7,172,126, and a continuation-in-part of application No. 10/613,774, filed on Jul. 3, 2003, now Pat. No. 7,281,663, and a continuation-in-part of application No. 10/611,846, filed on Jul. 1, 2003, now Pat. No. 7,325,740, and a continuation-in-part of application No. 10/613,527, filed on Jul. 3, 2003, now Pat. No. 7,007,849, and a continuation-in-part of application No. 10/630,358, filed on Jul. 30, 2003, now Pat. No. 7,278,578, and a continuation-in-part of application No. 10/613,758, filed on Jul. 3, 2003, now Pat. No. 7,048,192, and a continuation-in-part of application No. 09/204,176, filed on Dec. 3, 1998, now Pat. No. 6,283,375, and a continuation-in-part of application No. 09/452,976, filed on Dec. 2, 1999, now Pat. No. 6,595,420, and a continuation-in-part of application No. PCT/US99/28530, filed on Dec. 2, 1999.

(51) Int. Cl.
*G06K 7/10* (2006.01)

(52) U.S. Cl. .................. 235/472.01; 235/462.45; 235/462.46

(58) Field of Classification Search ............. 235/462.22, 235/462.01, 472.01, 462.46, 462.45
See application file for complete search history.

(56) References Cited

U.S. PATENT DOCUMENTS

| | | | |
|---|---|---|---|
| 4,072,859 A | 2/1978 | McWaters | 39/12 |
| 4,086,476 A | 4/1978 | King | 7/10 |
| 4,240,064 A | 12/1980 | DevChoudhury | 7/14 |
| 4,279,021 A | 7/1981 | See et al. | 15/6 |
| 4,282,425 A | 8/1981 | Chadima, Jr. et al. | 7/10 |
| 4,387,297 A | 6/1983 | Swartz et al. | 9/24 |
| 4,409,470 A | 10/1983 | Shepard et al. | 7/10 |

| | | | |
|---|---|---|---|
| 4,431,912 A | 2/1984 | Dickson et al. ................... 7/10 |
| 4,460,120 A | 7/1984 | Shepard et al. .................. 9/24 |
| 4,465,926 A | 8/1984 | Apitz et al. |
| 4,496,831 A | 1/1985 | Swartz et al. ..................... 7/10 |
| 4,521,678 A | 6/1985 | Winter .............................. 7/10 |
| 4,570,057 A | 2/1986 | Chadima, Jr. et al. ............. 7/10 |
| 4,575,625 A | 3/1986 | Knowles ........................... 7/10 |
| 4,593,186 A | 6/1986 | Swartz et al. ..................... 9/24 |
| 4,621,189 A | 11/1986 | Kumar et al. ...................... 7/10 |
| 4,639,606 A | 1/1987 | Boles et al. ....................... 7/10 |
| 4,647,143 A | 3/1987 | Yamazaki et al. .............. 26/10 |
| 4,673,805 A | 6/1987 | Shepard et al. .................. 7/10 |
| 4,713,785 A | 12/1987 | Antonelli et al. ................ 15/24 |
| 4,736,095 A | 4/1988 | Shepard et al. |
| 4,760,248 A | 7/1988 | Swartz et al. ..................... 7/10 |
| 4,766,297 A | 8/1988 | McMillan |
| 4,766,299 A | 8/1988 | Tierney et al. |
| 4,806,742 A | 2/1989 | Swartz et al. ..................... 7/10 |
| 4,816,660 A | 3/1989 | Swartz et al. ..................... 7/10 |
| 4,825,057 A | 4/1989 | Swartz et al. ..................... 7/10 |
| 4,835,374 A | 5/1989 | Swartz et al. ..................... 7/10 |
| 4,845,349 A | 7/1989 | Cherry ............................. 7/10 |
| 4,877,949 A | 10/1989 | Danielson et al. ................. 7/10 |
| 4,897,532 A | 1/1990 | Swartz et al. ..................... 7/10 |
| D305,885 S | 2/1990 | Barkan et al. |
| 4,930,848 A | 6/1990 | Knowles ........................... 0/10 |
| 4,933,538 A | 6/1990 | Heiman et al. .................... 7/10 |
| 4,935,610 A | 6/1990 | Wike, Jr. .......................... 7/10 |
| 4,958,894 A | 9/1990 | Khowles .......................... 26/10 |
| 4,962,980 A | 10/1990 | Knowles ......................... 26/10 |
| 4,970,379 A | 11/1990 | Danstrom ........................ 7/14 |
| 5,015,833 A | 5/1991 | Shepard et al. ................... 7/10 |
| 5,017,765 A | 5/1991 | Shepart et al. .................... 7/10 |
| 5,019,698 A | 5/1991 | Eastman ........................... 7/10 |
| 5,021,641 A | 6/1991 | Swartz et al. ..................... 7/10 |
| 5,029,183 A | 7/1991 | Tymes ............................. 15/0 |
| 5,047,617 A | 9/1991 | Shepard et al. ................... 7/10 |
| 5,059,777 A | 10/1991 | Wittensoldner et al. .......... 7/10 |
| 5,065,003 A | 11/1991 | Wakatsuki et al. |
| 5,075,538 A | 12/1991 | Swartz et al. ..................... 7/10 |
| 5,080,456 A | 1/1992 | Katz et al. ....................... 26/10 |
| 5,086,215 A | 2/1992 | Carsner et al. .................... 7/10 |
| 5,107,100 A | 4/1992 | Shepard et al. ................... 7/10 |
| 5,132,523 A | 7/1992 | Bassett ............................. 7/1 |
| 5,142,550 A | 8/1992 | Tymes .............................. 1/0 |
| 5,149,950 A | 9/1992 | Swartz et al. ..................... 7/10 |
| 5,153,417 A | 10/1992 | Sakai et al. ....................... 7/10 |
| 5,155,346 A | 10/1992 | Doing et al. ...................... 7/10 |
| 5,157,687 A | 10/1992 | Tymes .............................. 1/0 |
| 5,180,904 A | 1/1993 | Shepard et al. ................... 7/10 |
| 5,198,650 A | 3/1993 | Wike, Jr. .......................... 7/10 |
| 5,206,492 A | 4/1993 | Shepard et al. ................... 7/1 |
| 5,212,370 A | 5/1993 | Wittensoldner et al. .......... 7/10 |
| 5,216,231 A | 6/1993 | Ouchi ............................. 7/10 |
| 5,237,161 A | 8/1993 | Grodevant ....................... 7/10 |
| 5,247,162 A | 9/1993 | Swartz et al. ..................... 7/10 |
| 5,250,790 A | 10/1993 | Melitsky et al. .................. 7/10 |
| 5,250,792 A | 10/1993 | Swartz et al. ..................... 7/10 |
| 5,260,553 A | 11/1993 | Rockstein et al. ................. 7/10 |
| 5,262,627 A | 11/1993 | Shepard ........................... 7/10 |
| 5,272,323 A | 12/1993 | Martino ........................... 7/10 |
| 5,272,324 A | 12/1993 | Blevins ............................ 7/10 |
| 5,280,162 A | 1/1994 | Marwin ............................ 7/10 |
| 5,294,782 A | 3/1994 | Kumar ............................. 7/10 |
| 5,324,924 A | 6/1994 | Cai et al. .......................... 7/10 |
| 5,334,821 A | 8/1994 | Campo et al. ..................... 5/0 |
| 5,340,971 A | 8/1994 | Rockstein et al. ................. 7/10 |
| 5,340,973 A | 8/1994 | Knowles et al. .................. 7/10 |
| 5,347,113 A | 9/1994 | Reddersen et al. ................ 7/10 |
| 5,354,977 A | 10/1994 | Roustaei ........................... 7/10 |
| 5,371,348 A | 12/1994 | Kumar et al. ...................... 7/10 |
| 5,420,411 A | 5/1995 | Salatto, Jr. et al. ................ 7/10 |
| 5,424,525 A | 6/1995 | Rockstein et al. ................. 7/10 |
| 5,468,949 A | 11/1995 | Swartz et al. ..................... 7/10 |
| 5,468,951 A | 11/1995 | Knowles et al. .................. 7/10 |
| 5,484,992 A | 1/1996 | Wilz et al. ........................ 7/10 |
| 5,496,992 A | 3/1996 | Madan et al. |
| 5,525,789 A | 6/1996 | Rockstein et al. ................. 7/10 |
| 5,528,024 A | 6/1996 | Rockstein et al. ................. 7/10 |
| 5,557,093 A | 9/1996 | Knowles et al. .................. 7/10 |
| 5,581,707 A | 12/1996 | Kuecken ........................... 13/0 |
| 5,591,953 A | 1/1997 | Rockstein et al. ................. 7/10 |
| 5,600,121 A | 2/1997 | Kahn et al. ....................... 7/10 |
| 5,610,386 A | 3/1997 | Ball et al. ......................... 7/10 |
| 5,616,908 A | 4/1997 | Wilz et al. ........................ 7/10 |
| 5,627,359 A | 5/1997 | Amundsen et al. ............... 7/10 |
| 5,637,852 A | 6/1997 | Knowles et al. .................. 7/10 |
| 5,661,292 A | 8/1997 | Knowles et al. .................. 7/10 |
| D385,265 S | 10/1997 | Knowles et al. |
| 5,736,982 A | 4/1998 | Suzuki et al. ...................... 3/0 |
| 5,742,043 A | 4/1998 | Knowles et al. .................. 7/10 |
| 5,756,982 A | 5/1998 | Knowles et al. |
| 5,767,501 A | 6/1998 | Schmidt et al. ................... 7/10 |
| 5,777,315 A | 7/1998 | Wilz et al. ........................ 7/10 |
| 5,786,582 A | 7/1998 | Roustaei et al. ................... 26/8 |
| 5,789,730 A | 8/1998 | Rockstein et al. ................. 7/10 |
| 5,789,731 A | 8/1998 | Amundsen et al. ............... 7/10 |
| 5,796,091 A | 8/1998 | Schmidt et al. ................... 7/10 |
| 5,808,285 A | 9/1998 | Rockstein et al. ................. 7/10 |
| 5,825,012 A | 10/1998 | Rockstein et al. ................. 7/10 |
| 5,828,048 A | 10/1998 | Rockstein et al. ................. 7/10 |
| 5,828,049 A | 10/1998 | Knowles et al. .................. 7/10 |
| 5,945,660 A | 8/1999 | Nakasuji et al. ................... 7/10 |
| 6,145,746 A | 11/2000 | Bard et al. |
| 6,158,662 A | 12/2000 | Kahn et al. ....................... 7/10 |
| 6,182,898 B1 | 2/2001 | Schmidt et al. |
| 6,318,636 B1 | 11/2001 | Reynolds et al. ................. 7/10 |
| 6,827,273 B2 | 12/2004 | Wilz, Sr. et al. .................. 7/10 |
| 6,869,016 B2 | 3/2005 | Waxelbaum ..................... 7/10 |
| 6,877,661 B2 | 4/2005 | Webb et al. ...................... 7/10 |
| 6,877,665 B2 | 4/2005 | Challa et al. ..................... 7/10 |
| 6,978,930 B2 * | 12/2005 | Harding et al. ............. 235/383 |
| 7,028,904 B2 * | 4/2006 | Schmidt et al. ........ 235/462.45 |
| 7,111,786 B2 * | 9/2006 | Schmidt et al. ........ 235/462.45 |

FOREIGN PATENT DOCUMENTS

| | | |
|---|---|---|
| EP | 0 323 848 | 7/1989 |
| EP | 0 414 452 A1 | 2/1991 |
| EP | 0 424 097 A1 | 4/1991 |
| EP | 0 424 976 A2 | 5/1991 |
| EP | 460 669 | 11/1991 |
| EP | 0 871 138 A2 | 10/1998 |

OTHER PUBLICATIONS

The Powerpoint presentation entitled "Bluetooth Architecture Overview" by James Kardach, Intel Corporation, Mar. 18, 1999, pp. 1-45.
The preliminary specification of the BGB100 Bluetooth Radio Module by Philips Semiconductors, Mar. 29, 2001, pp. 1-16.
The product for the PCF87750 Bluetooth Baseband Controller by Phillips Semiconductors, Nov. 29, 2001, pp. 1-263.
The web-based publication entitled "Pocket-Sized Computing for Mobile Industry Professionals" by Symbol Technologies, Inc., http://www.smbol.com/wp/stwp0006.htm, 1998, pp. 1-3.
The 1998 press release entitled "Symbol Adds Functionality to Palmpilot"by Symbol Technologies, Inc., http://www.symbol.com/press.100pr.htm, Mar. 23, 1998, pp. 1-2.
The product brochure for the MH290 Hand Held Laser Scanner by Metrologic Instruments, Inc., 1987, pp. 1-2.
The technical publication entitled "Hand-Held Holographic Scanner Having Highly Visible Locator Beam" by R.T. Cato, IBM Technical Disclosure Bulletin, vol. 27, No. 4, Sep. 1984, pp. 2021-2022.
PCT Search Report for PCT/US99/28530, 1999.

EPO Search Report for 99 96 2976.
PCT Search Report for PCT/US04/00741, Aug. 13, 2004.

\* cited by examiner

*Primary Examiner*—Ahshik Kim
(74) *Attorney, Agent, or Firm*—Thomas J. Perkowski, Esq., P.C.

(57) ABSTRACT

A wireless automatically-activated bar code symbol reading system for use in a work environment, the system including a device controller programmed to automatically detect when a wireless hand-supportable bar code symbol reader is located inside of a predetermined RF communication range based on measuring the strength of a detected reference signal, and thereupon to automatically transmit to a first RF-based transceiver, the symbol character data string produced while the wireless hand-supportable bar code symbol reader is located inside of the predetermined RF communication range. Also, the device controller is programmed to automatically detect when the wireless hand-supportable bar code symbol reader is located outside of the predetermined RF communication range based on measuring the strength of the detected reference signal, and thereupon to automatically collect and store in the data packet group buffer, the symbol character data string produced while the wireless hand-supportable bar code symbol reader is located outside of the predetermined RF communication range.

17 Claims, 63 Drawing Sheets

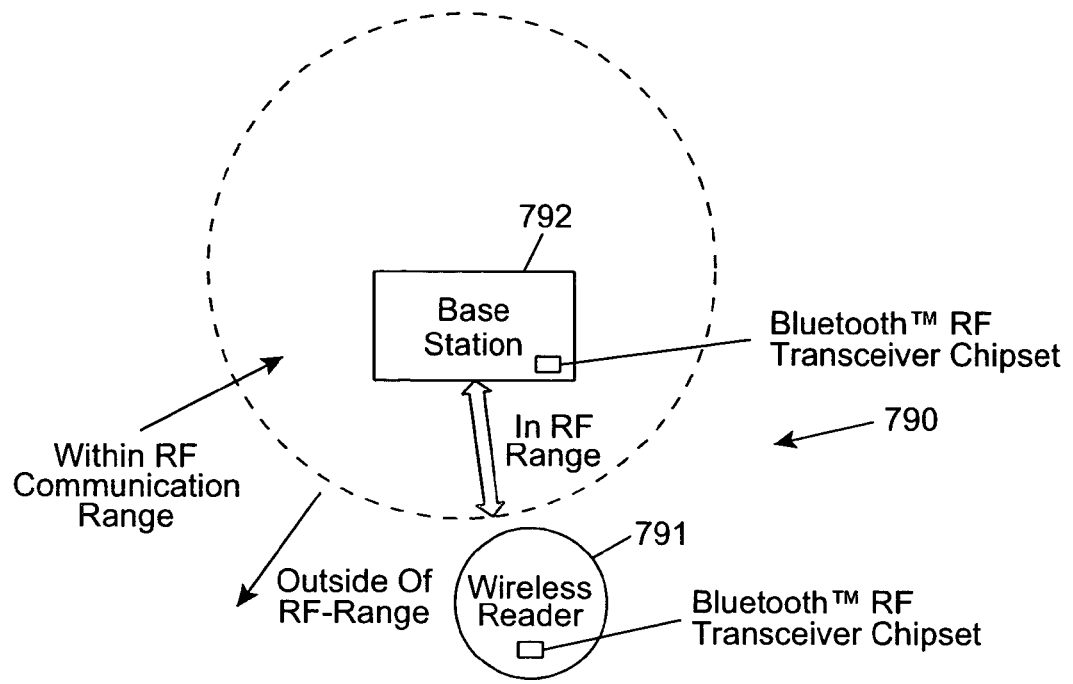
FIG. 1A1
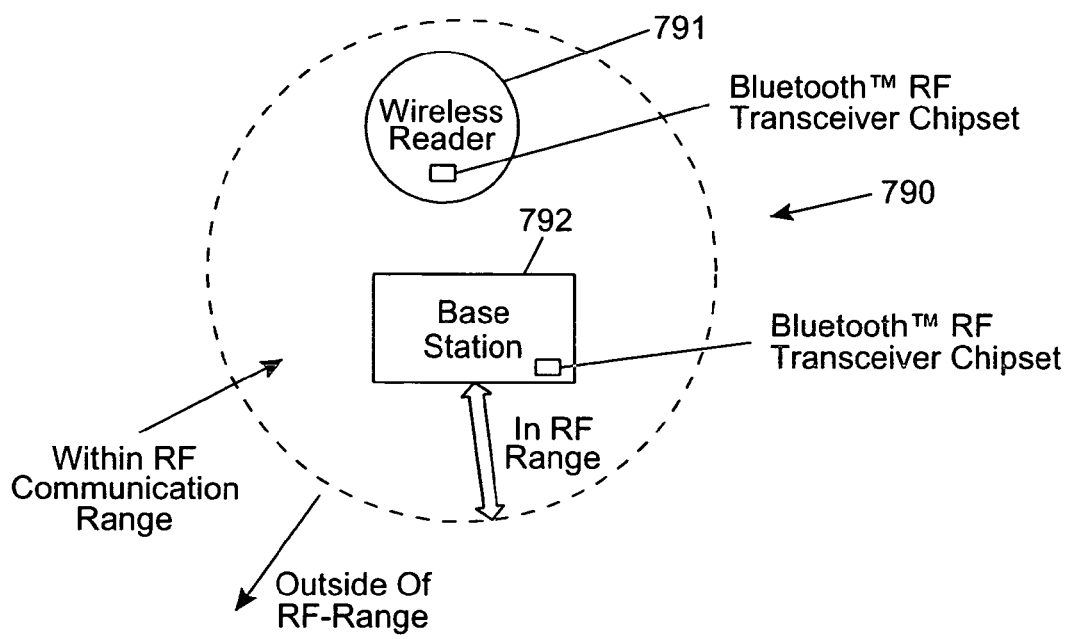
FIG. 1A2

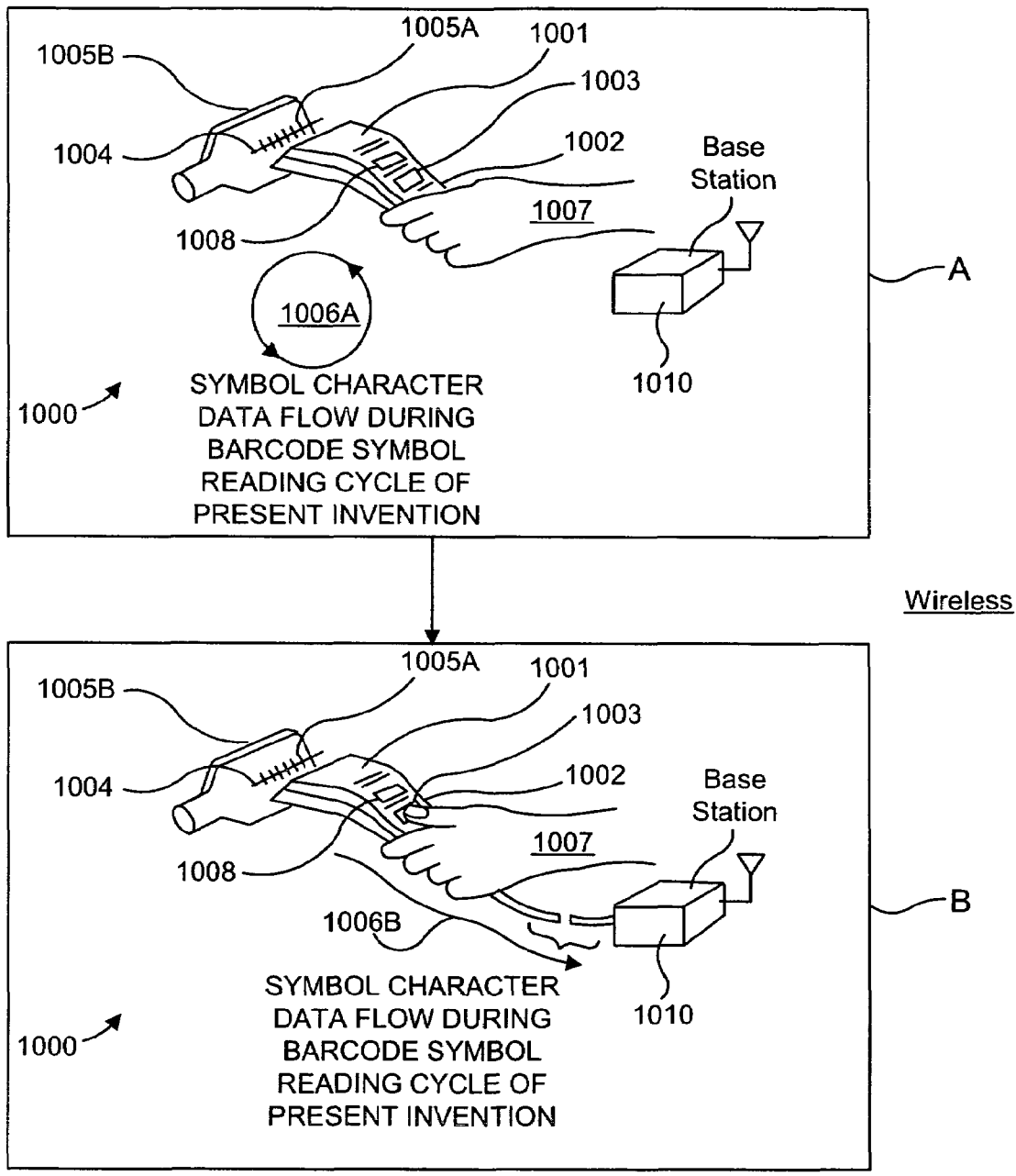
FIG. 1A3

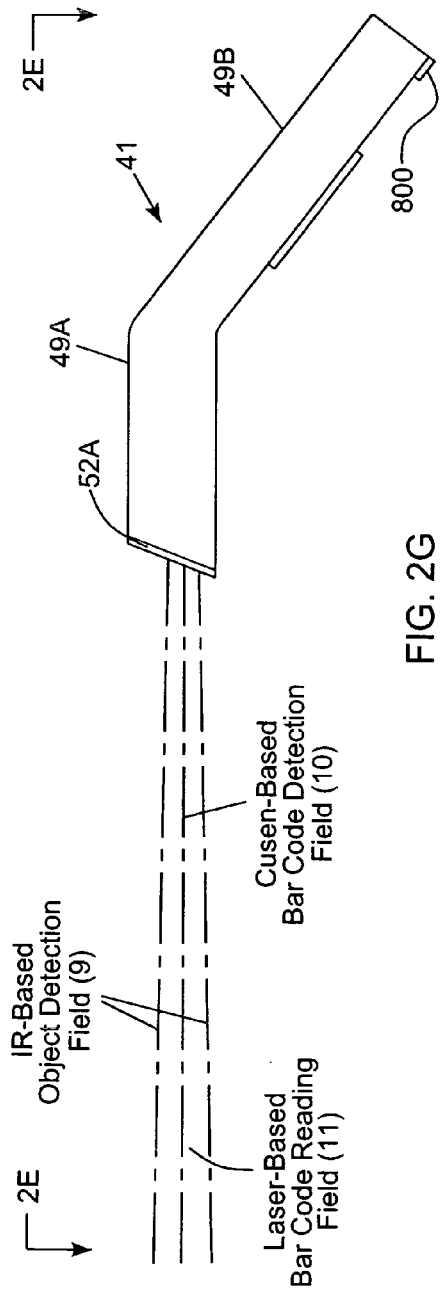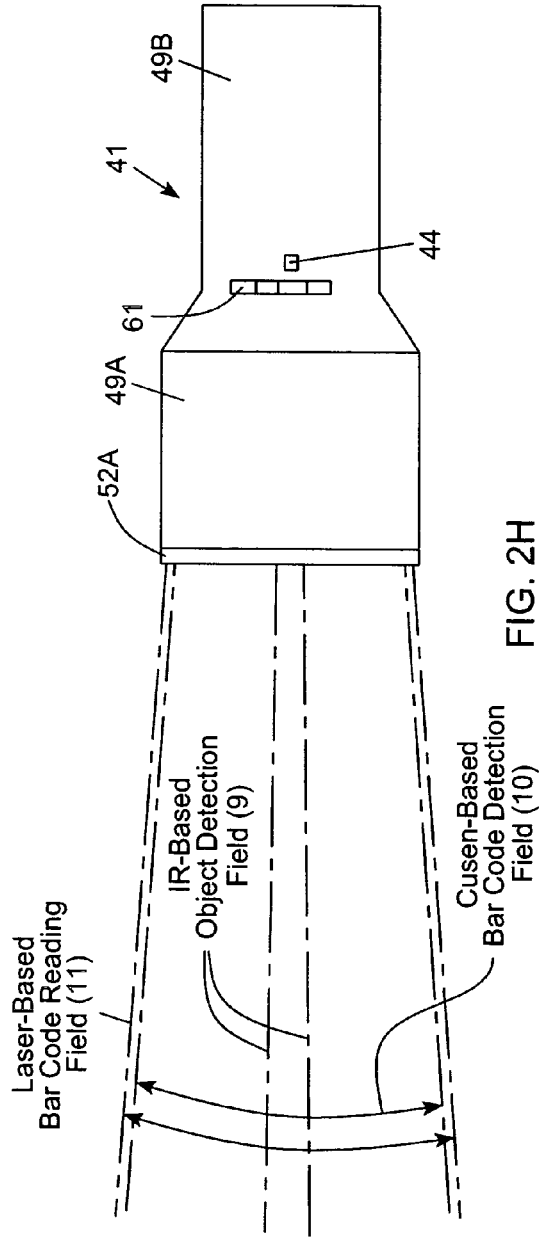

Automatic Bar Code Reading System With
2-Way RF Communication Link

Protracted Configuration

Protracted Configuration

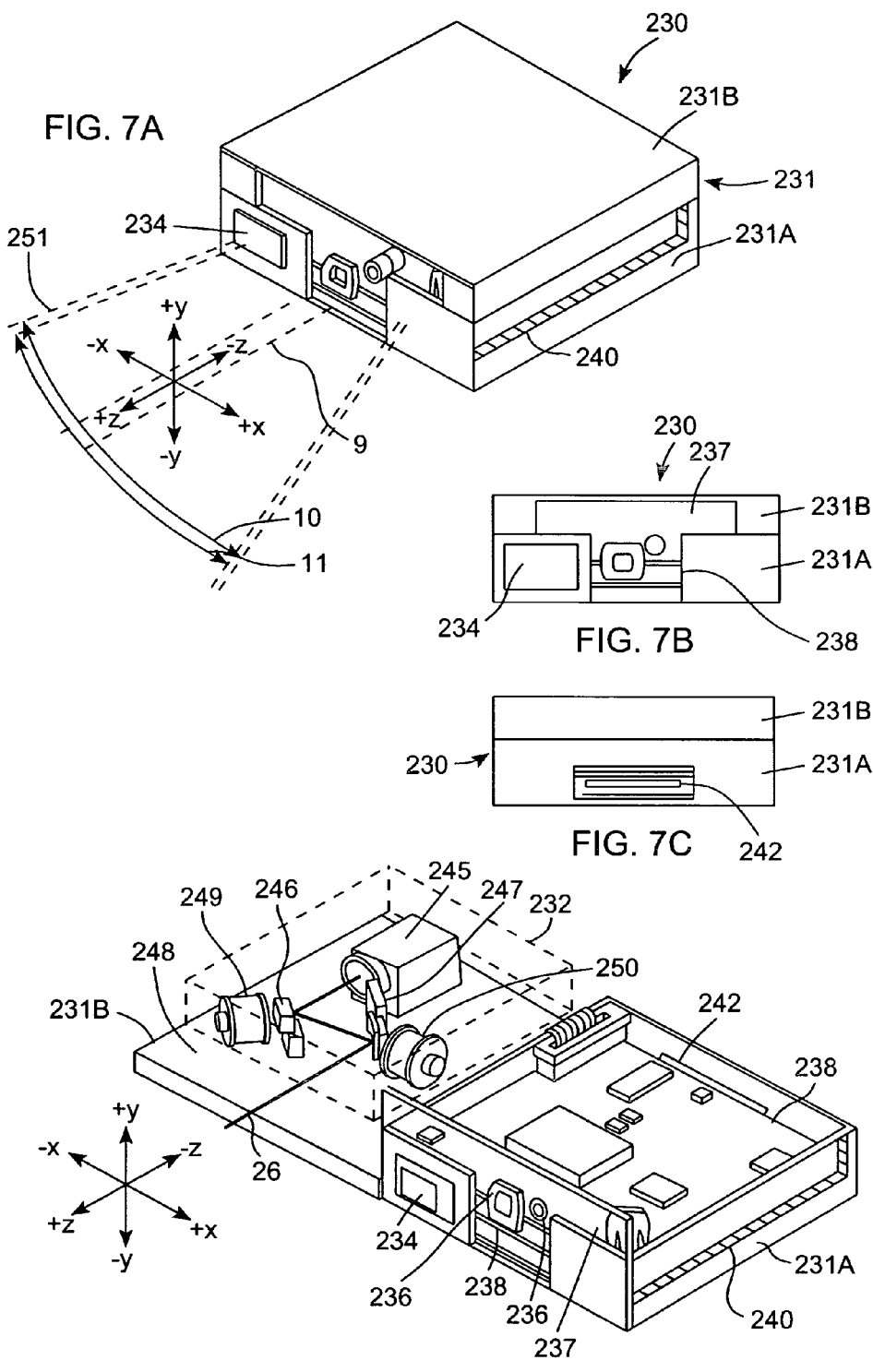

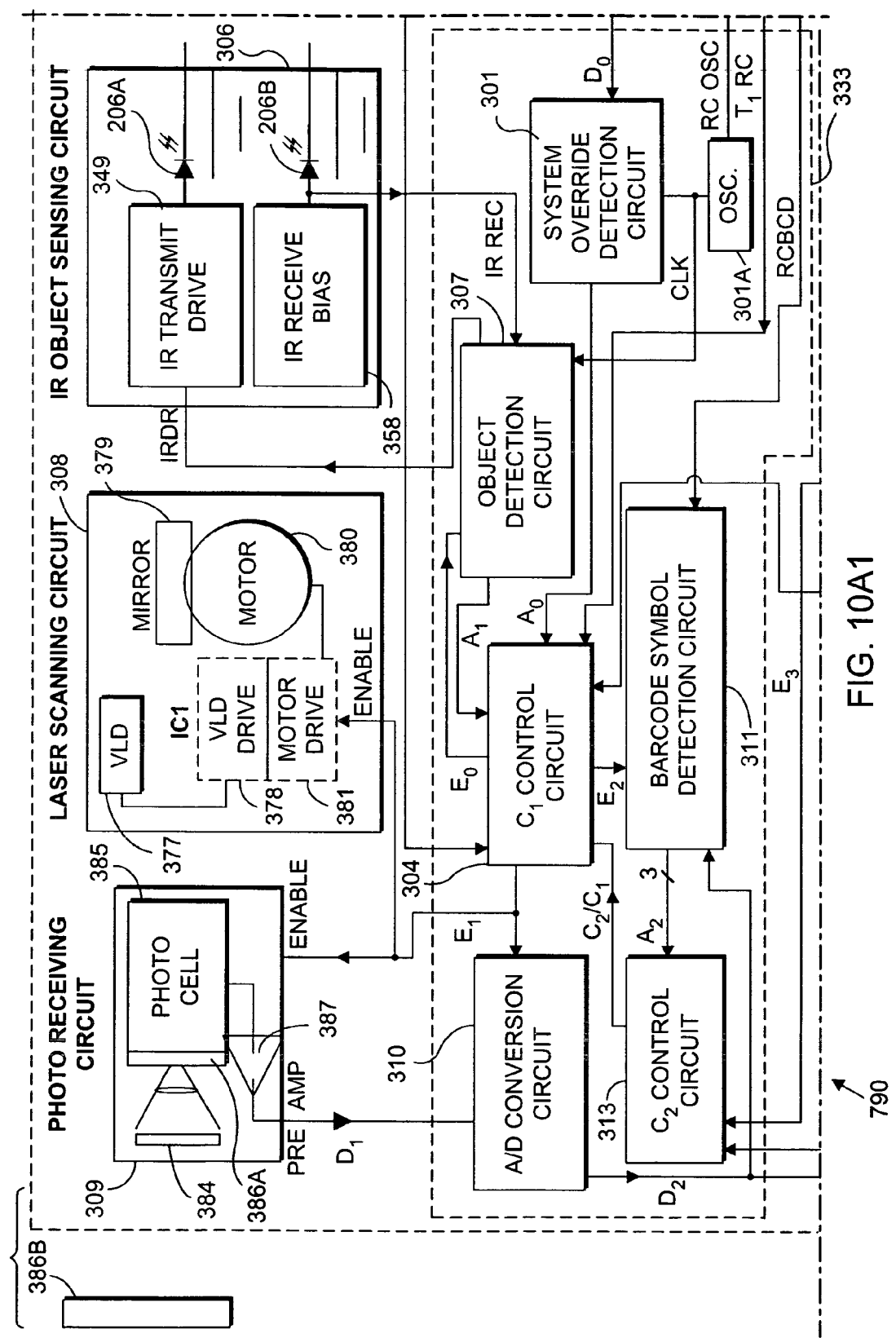
FIG. 10A1

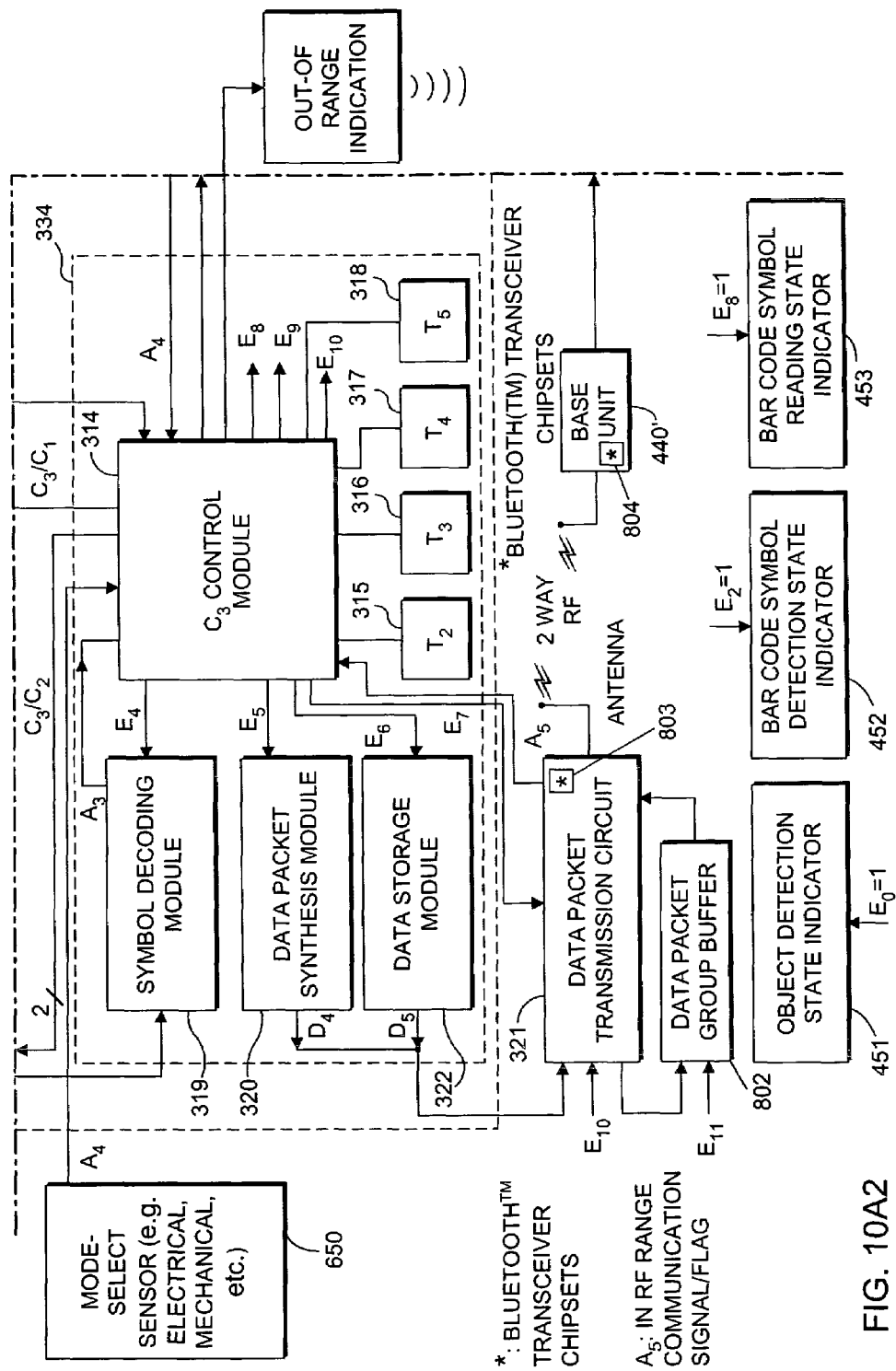
FIG. 10A2

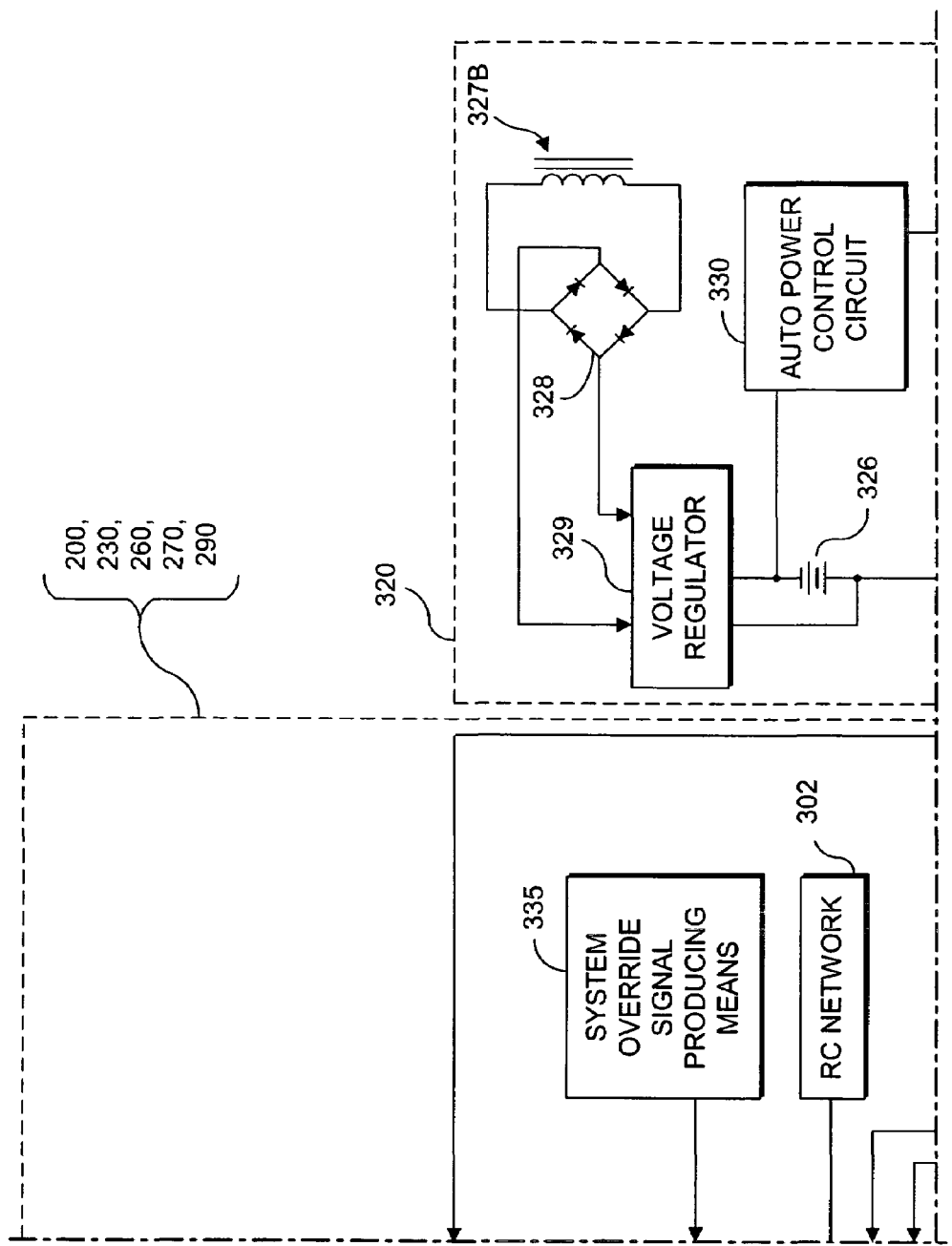
FIG. 10A3

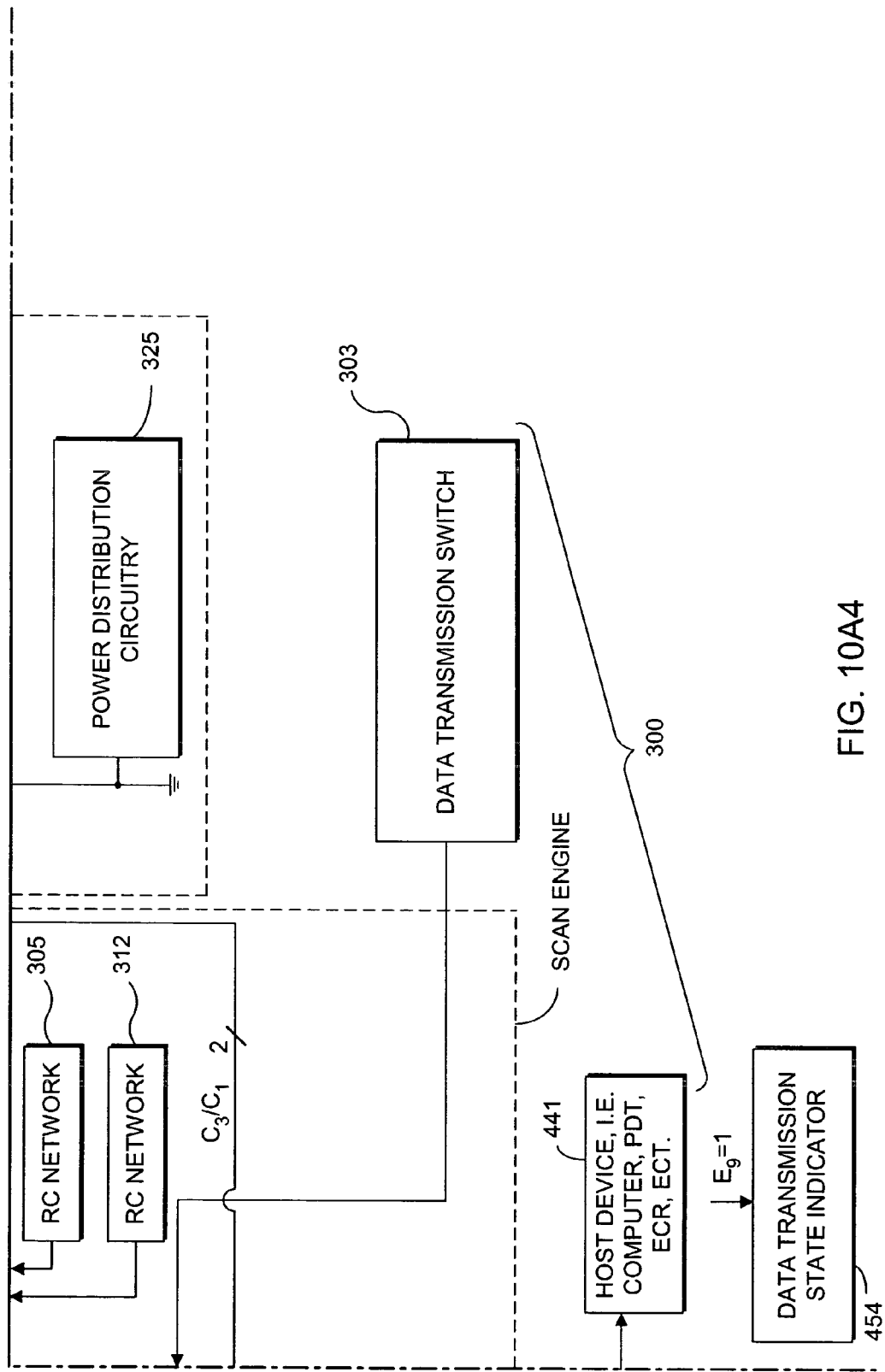
FIG. 10A4

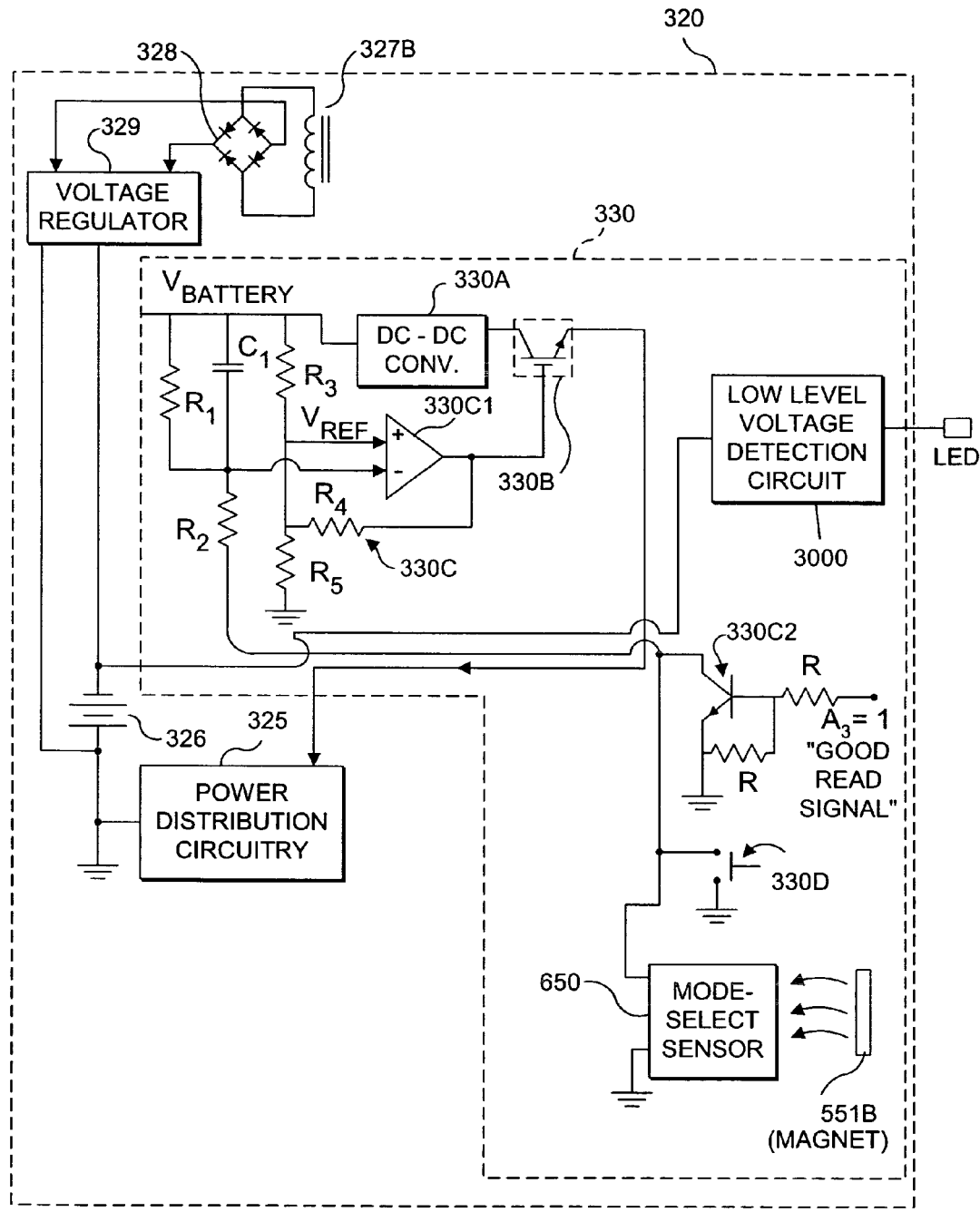
FIG. 10B1

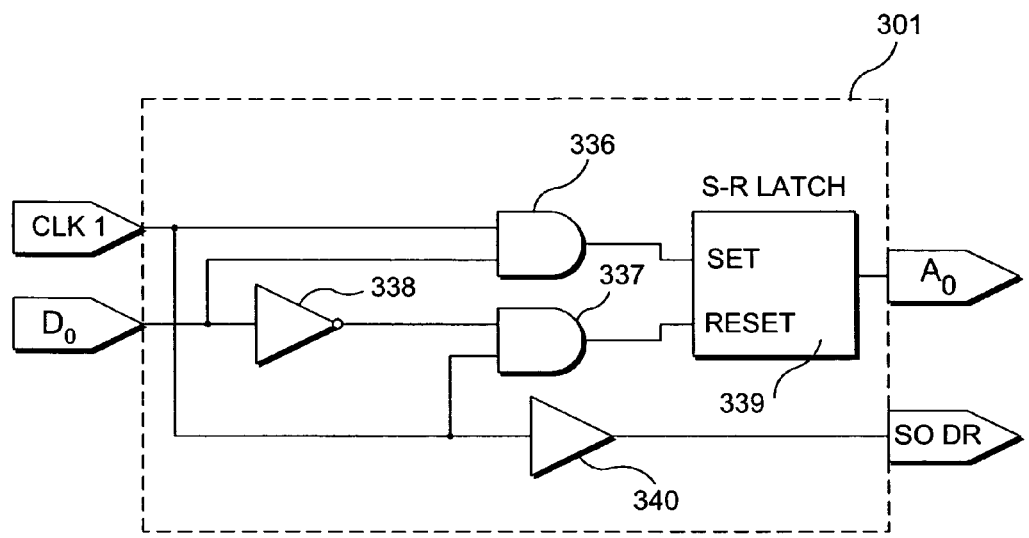
FIG. 10B2
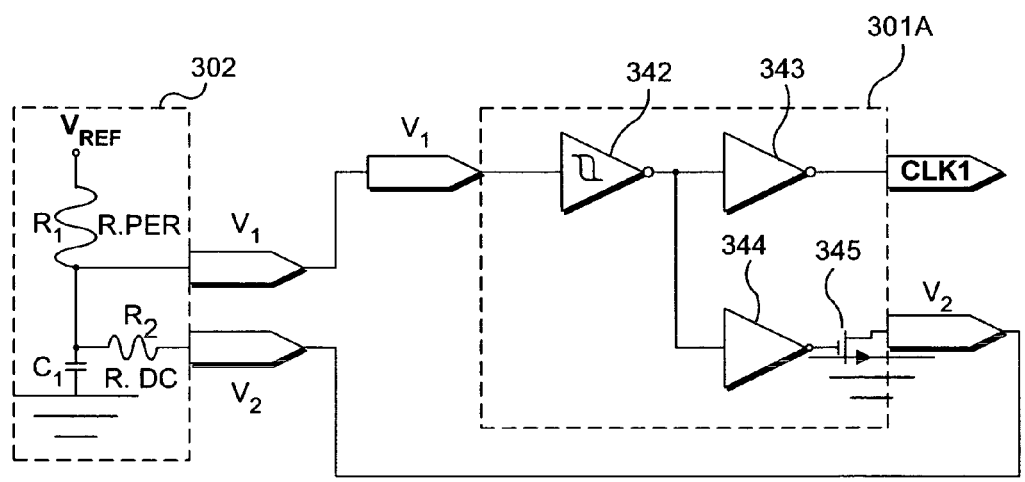
FIG. 10C $$E_0 = \overline{(B1 + A_0)(C_3/C_{1-1})}$$

$$E_1 = (C_3/C_{1-2}) + B1$$

$$E_2 = (C_2/C_1)(T_1)$$

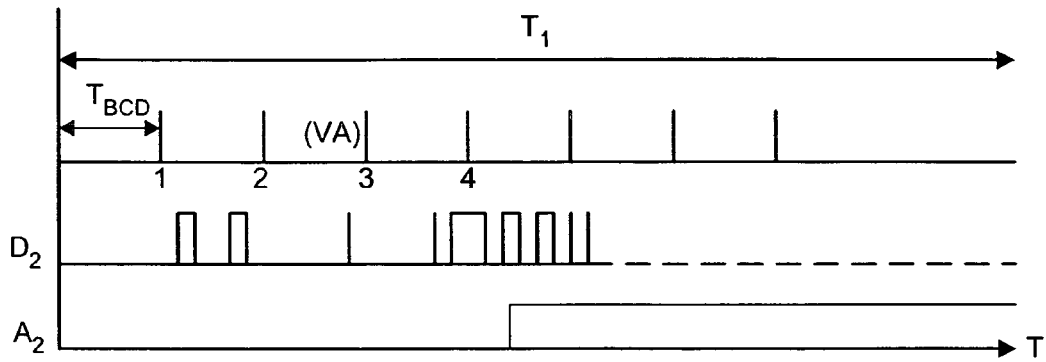
FIG. 10L
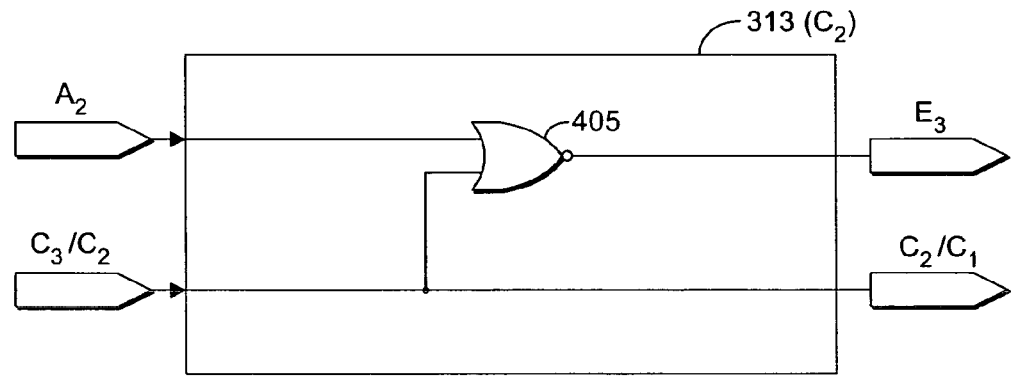
FIG. 10M
| $C_3 / C_2$ | $A_2$ | $E_3$ | $C_2 / C_1$ |
|---|---|---|---|
| 0 | 0 | 0 | 0 |
| 0 | 1 | 1 | 0 |
| 1 | X | 1 | 1 |
X: DON'T CARE (I.E. $C_3 / C_2$ OVERRIDES $A_2$)
FIG. 10N

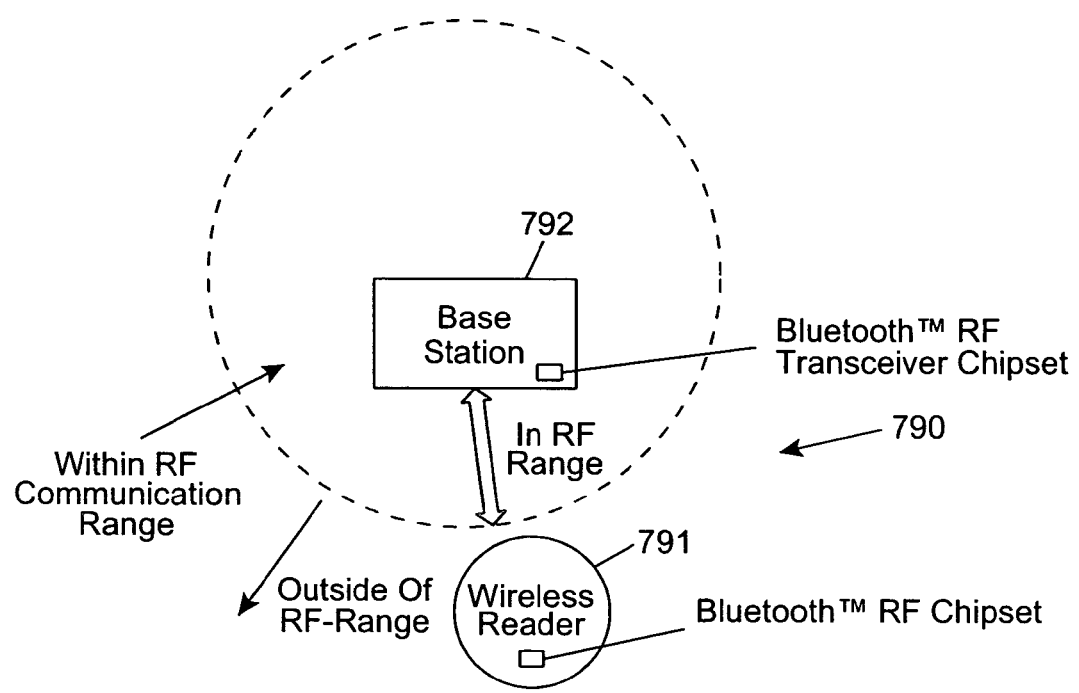
FIG. 13A1
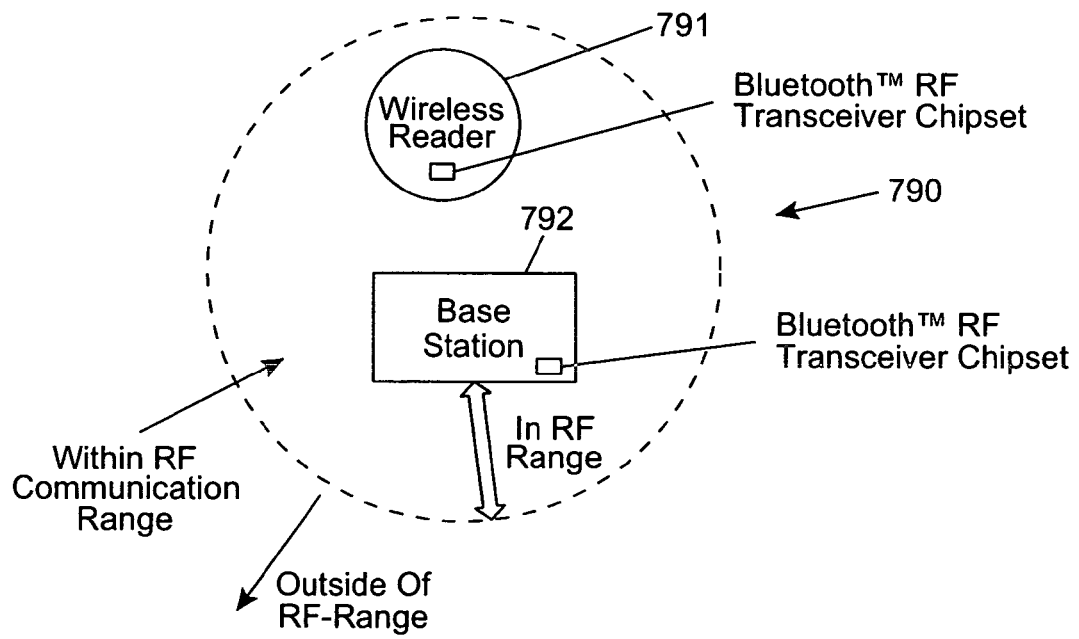
FIG. 13A2

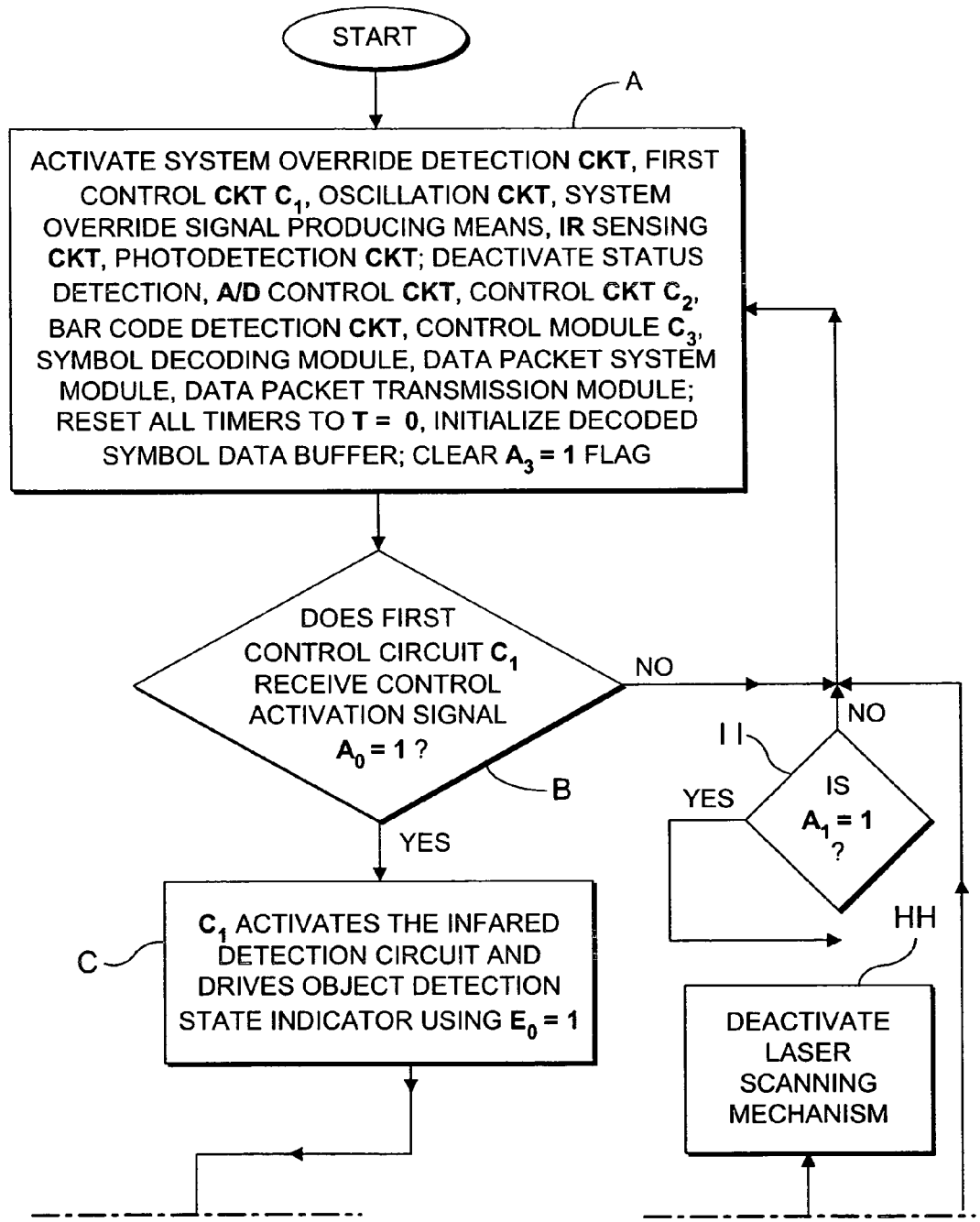
FIG. 14A1

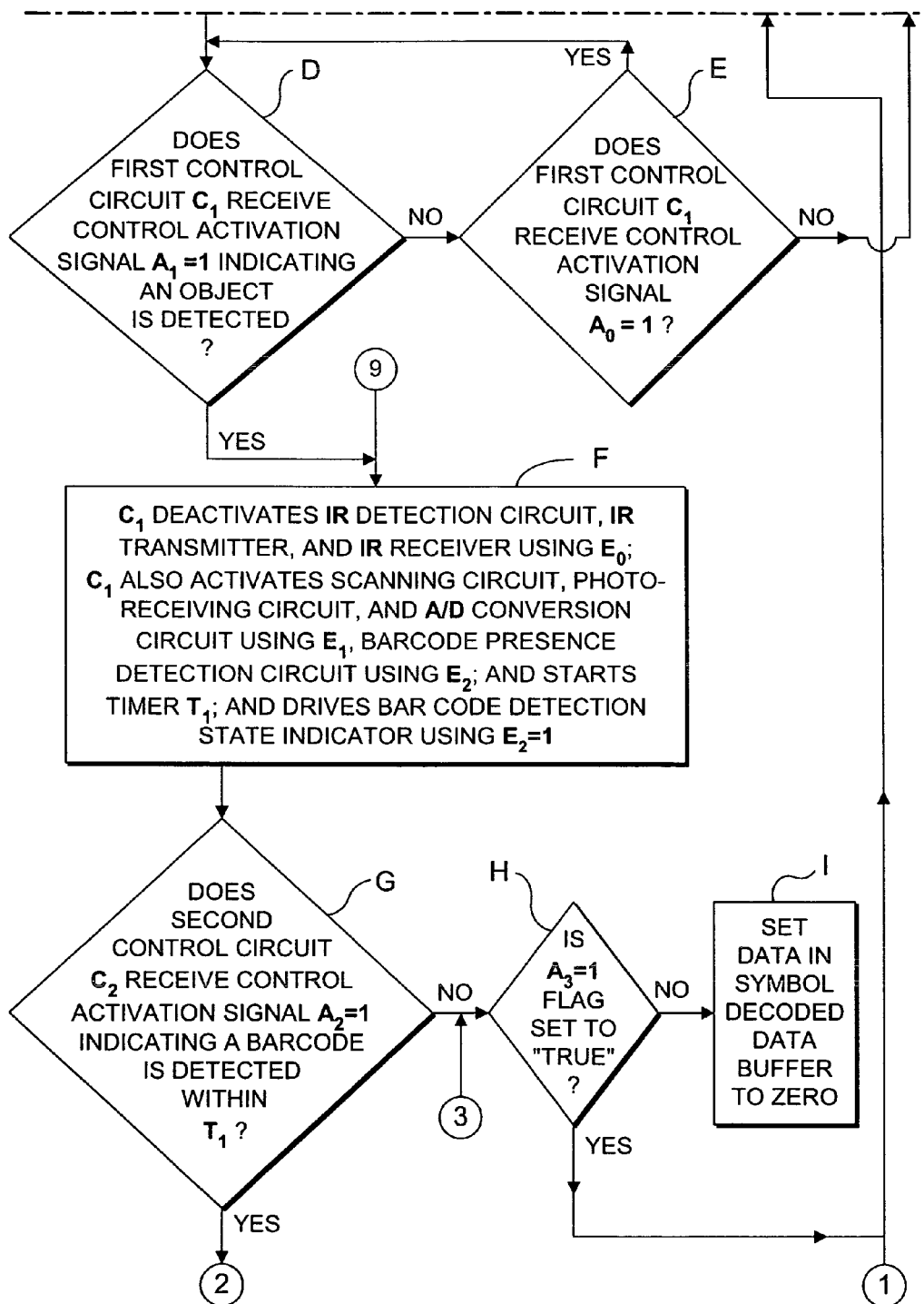
FIG. 14A2

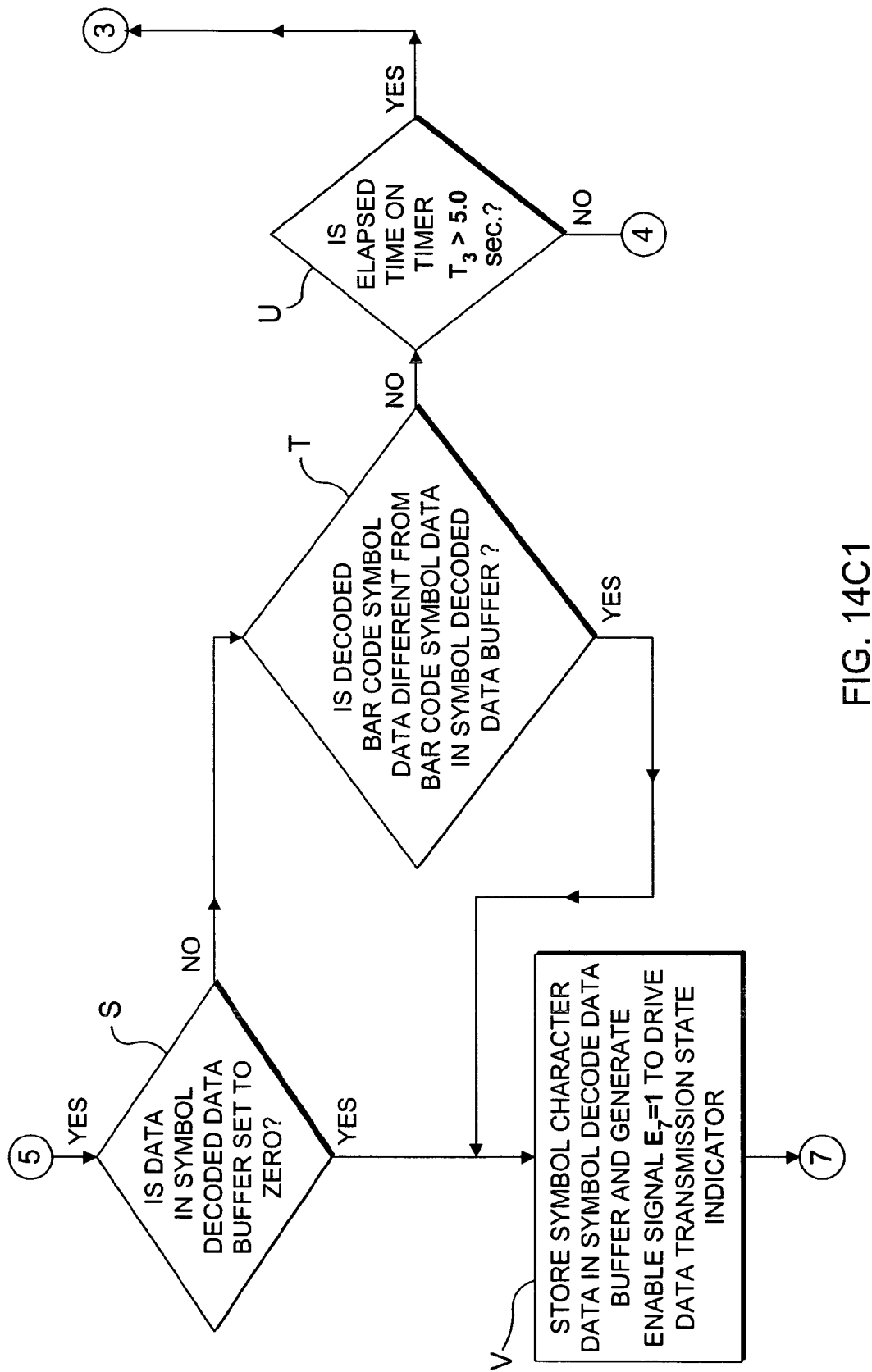
FIG. 14C1

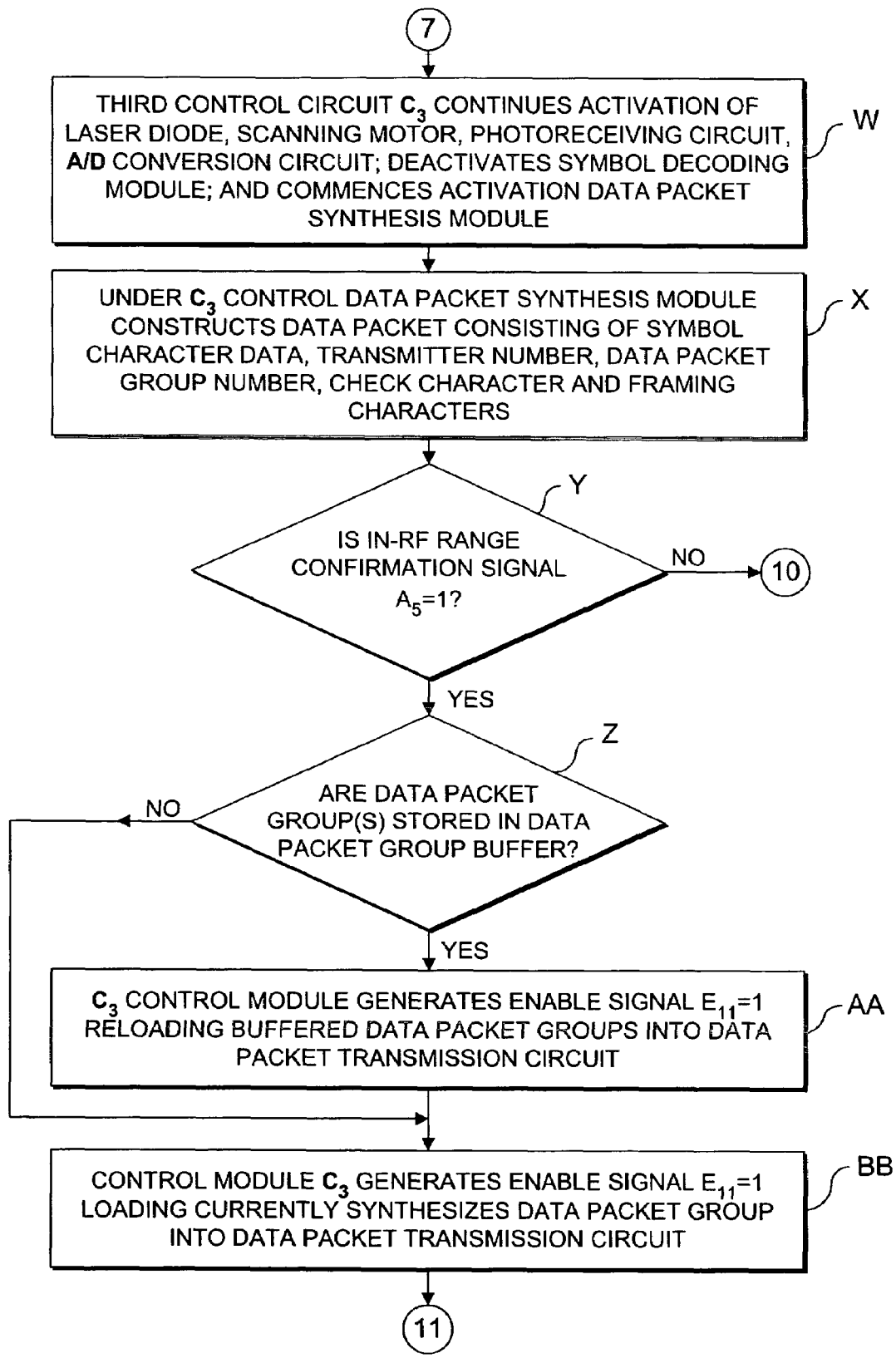
FIG. 14C2

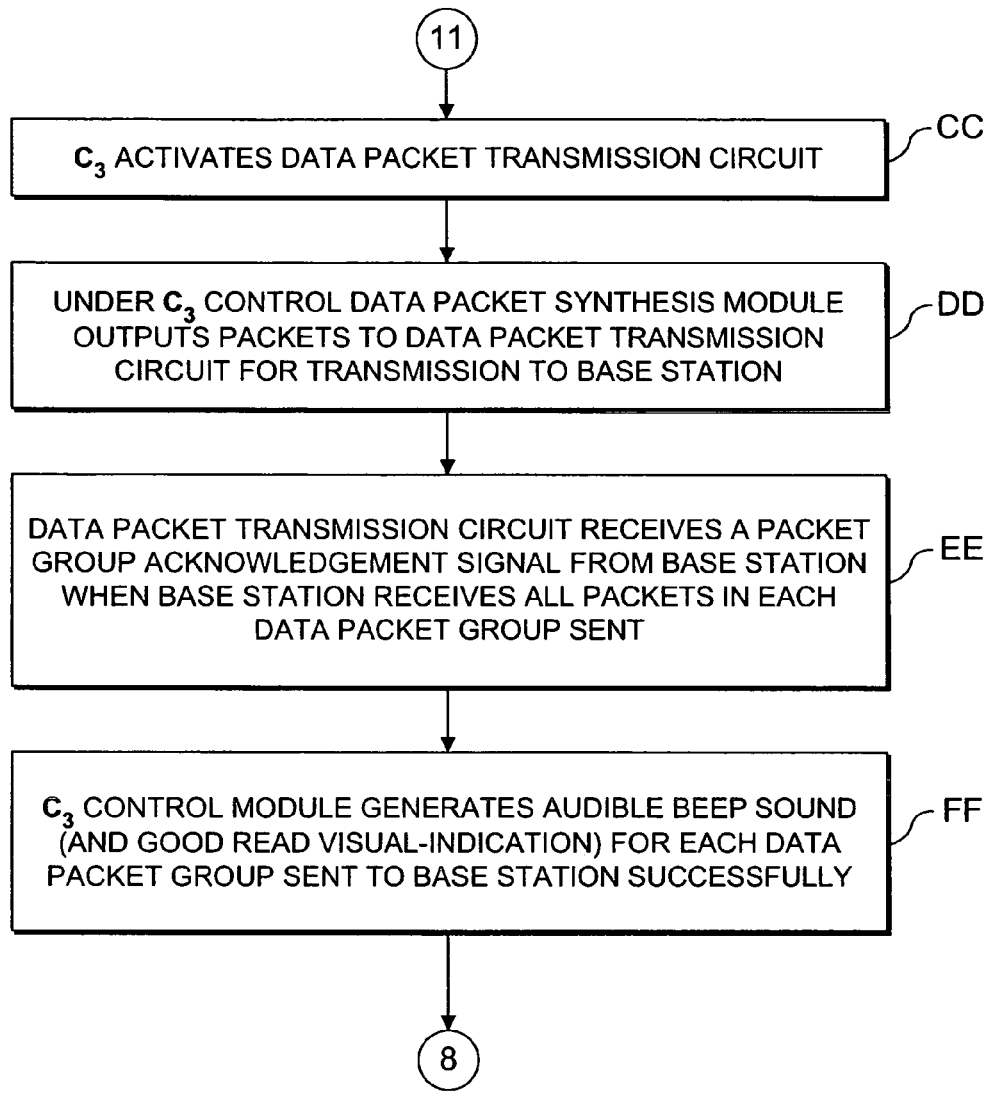
FIG. 14C3

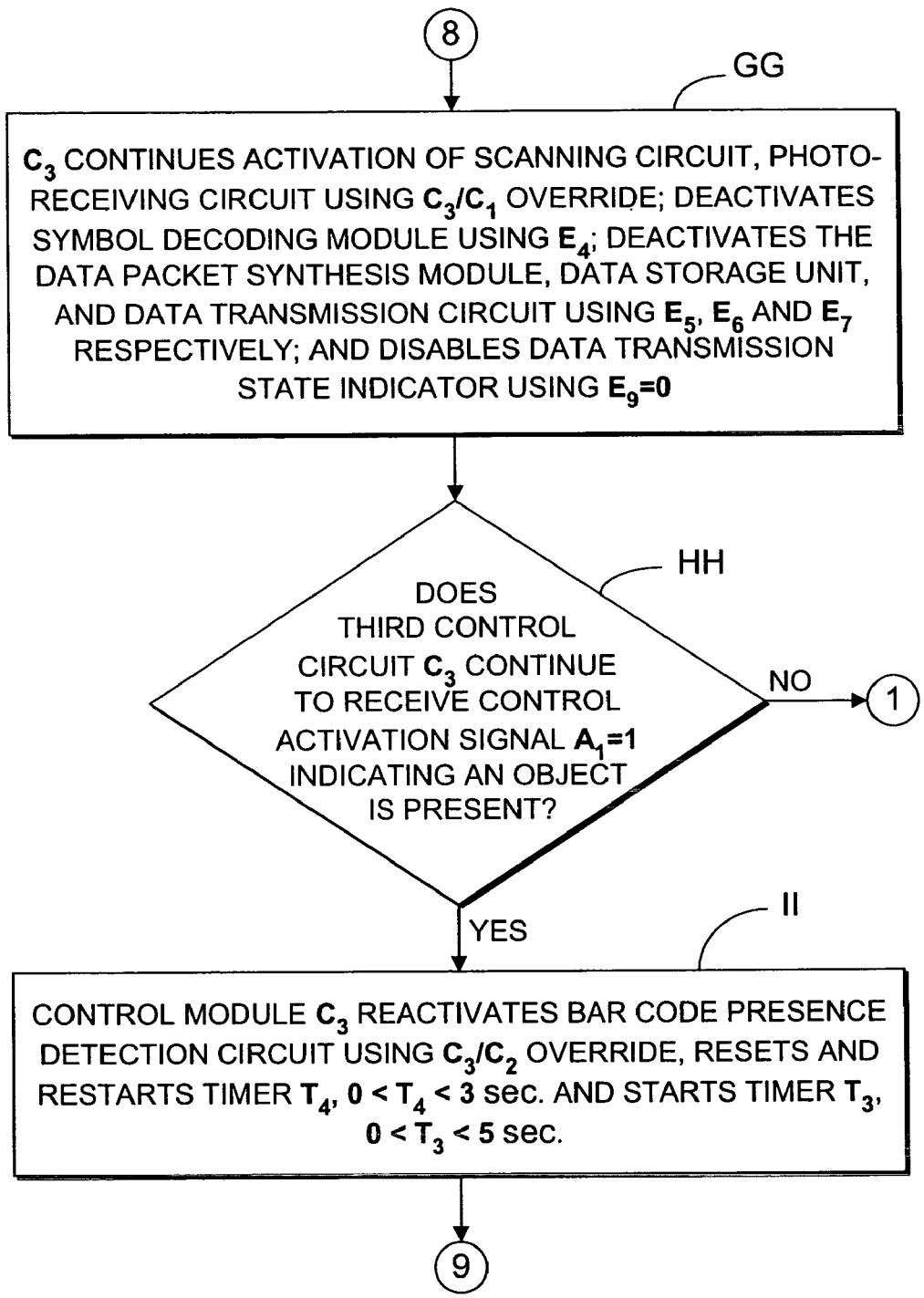
FIG. 14C4

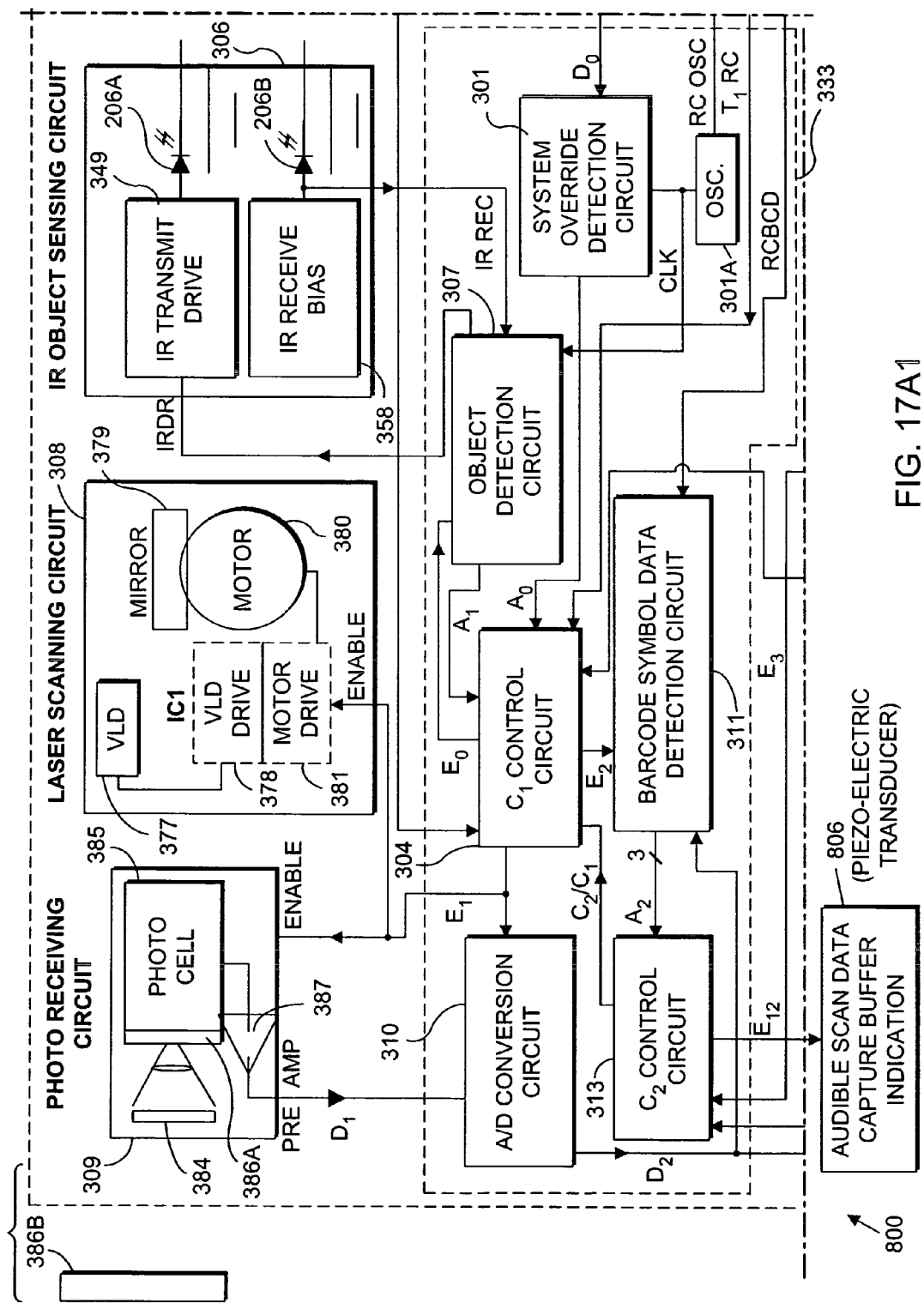
FIG. 17A1

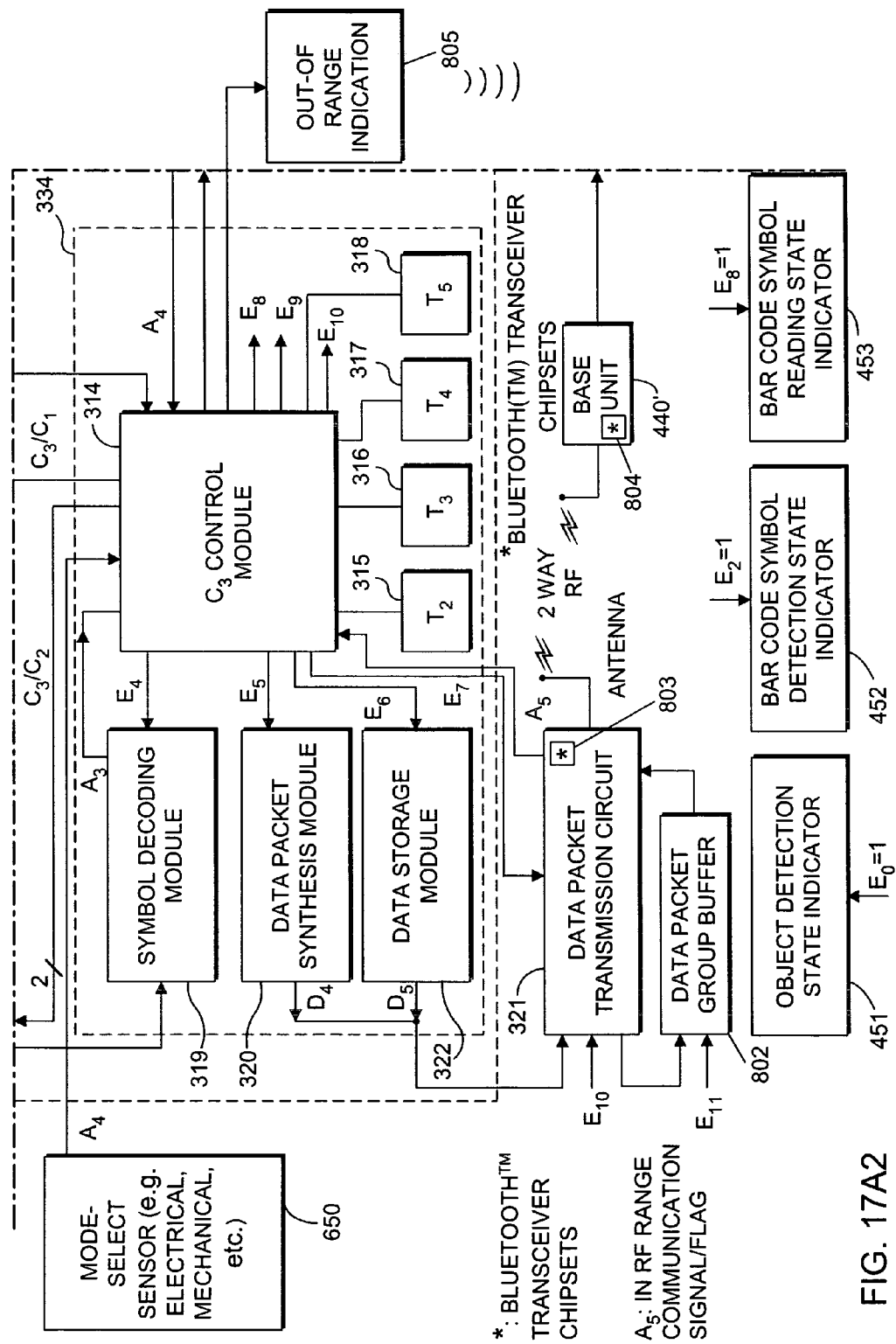
FIG. 17A2

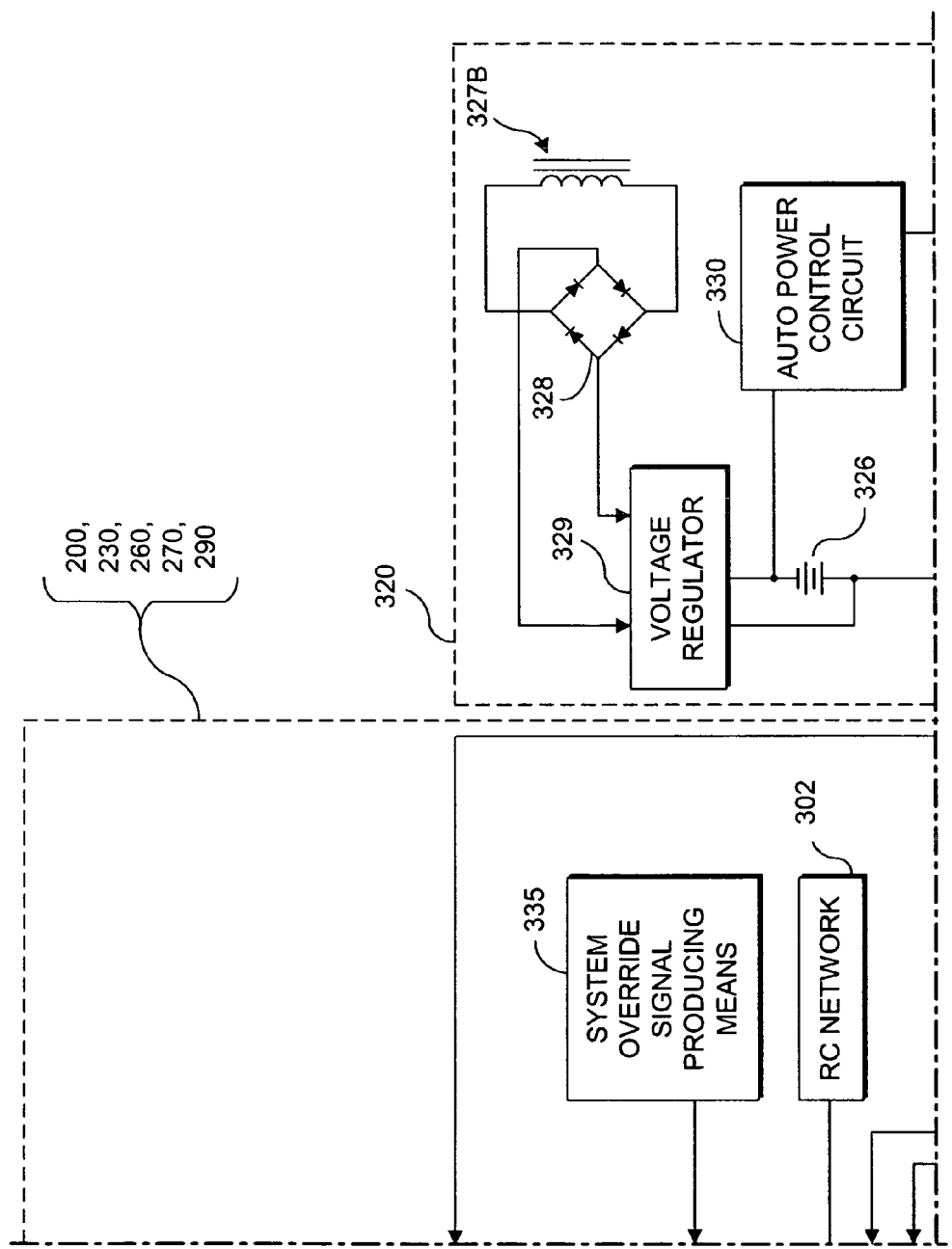
FIG. 17A3

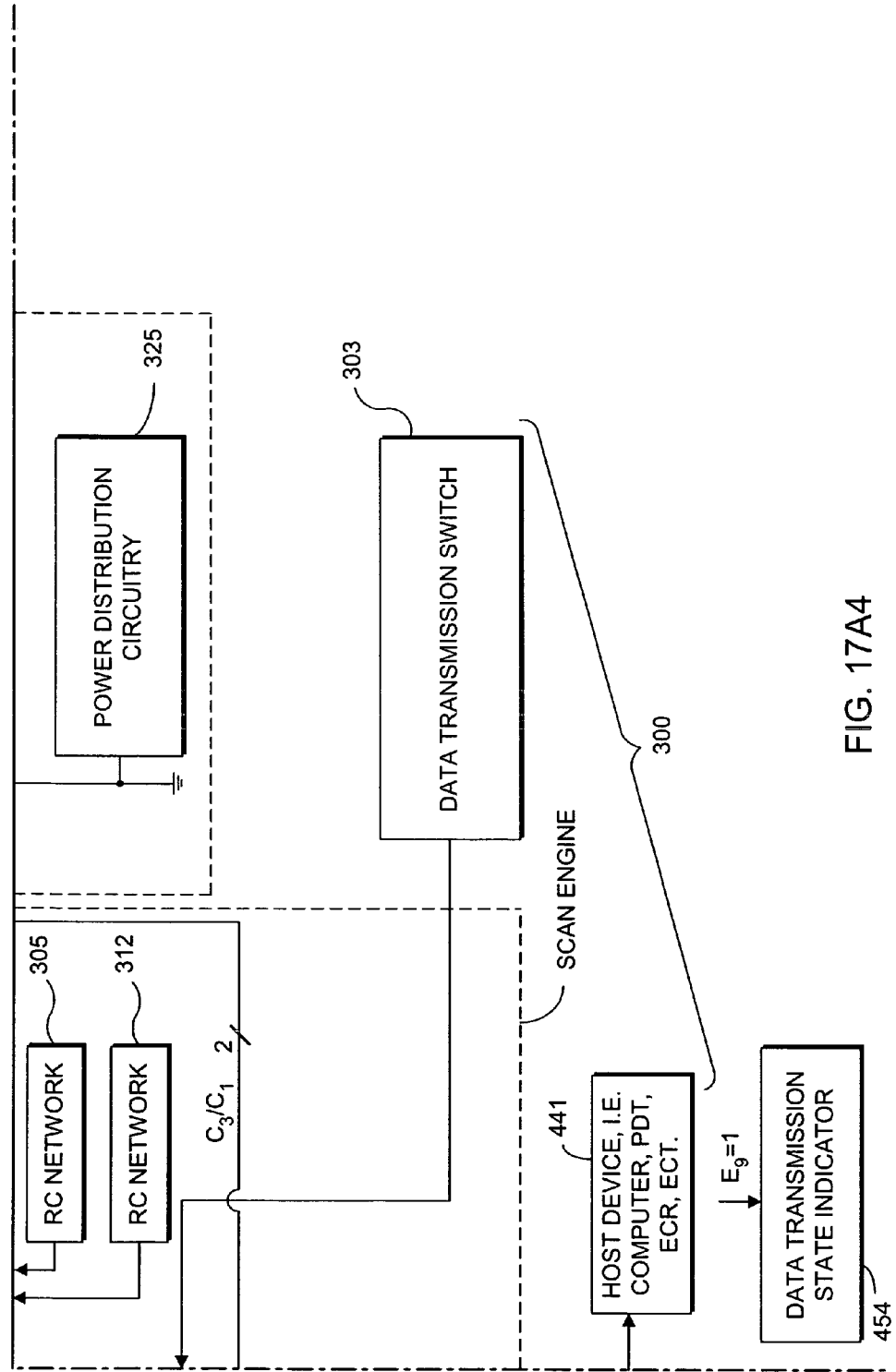

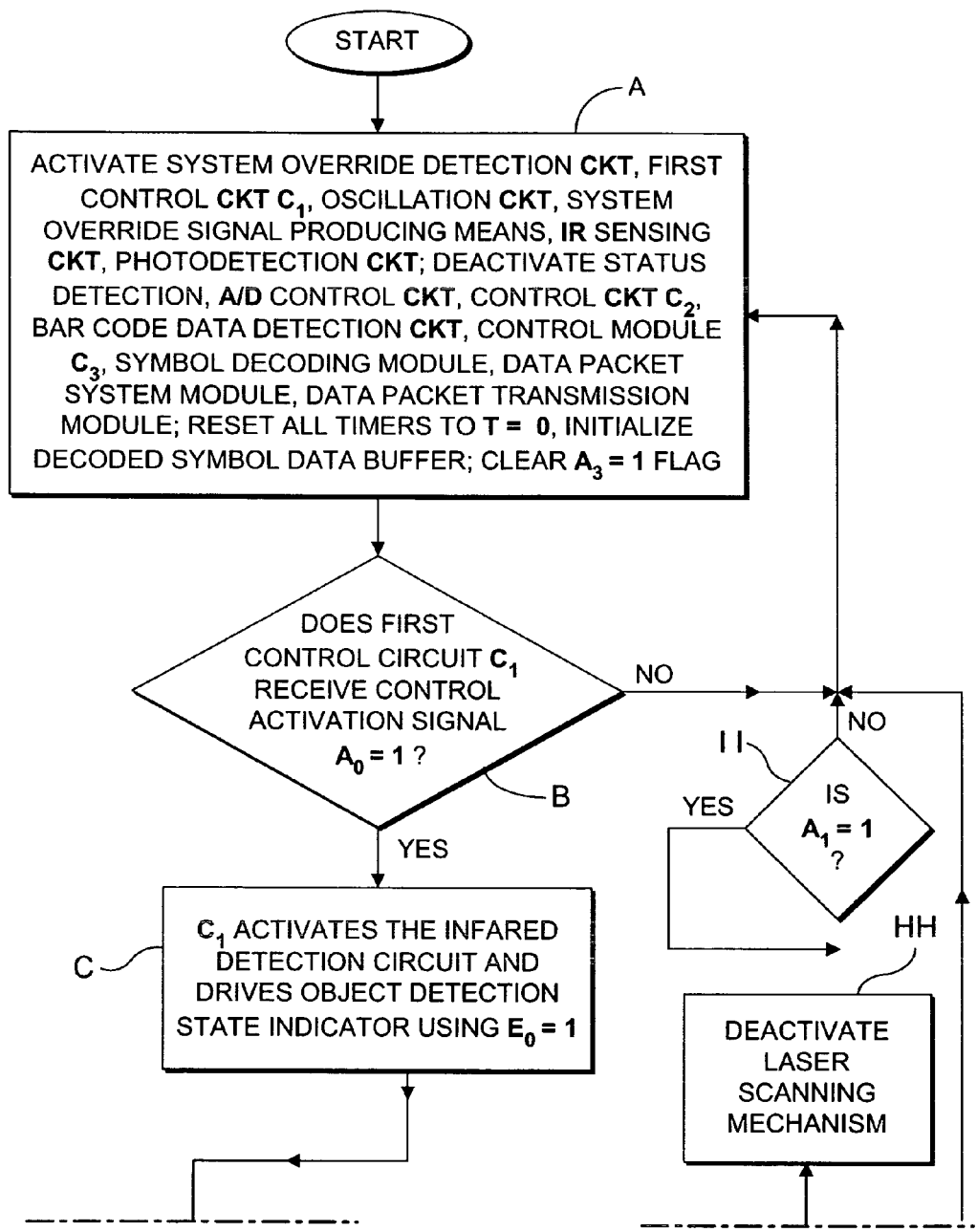
FIG. 18A1

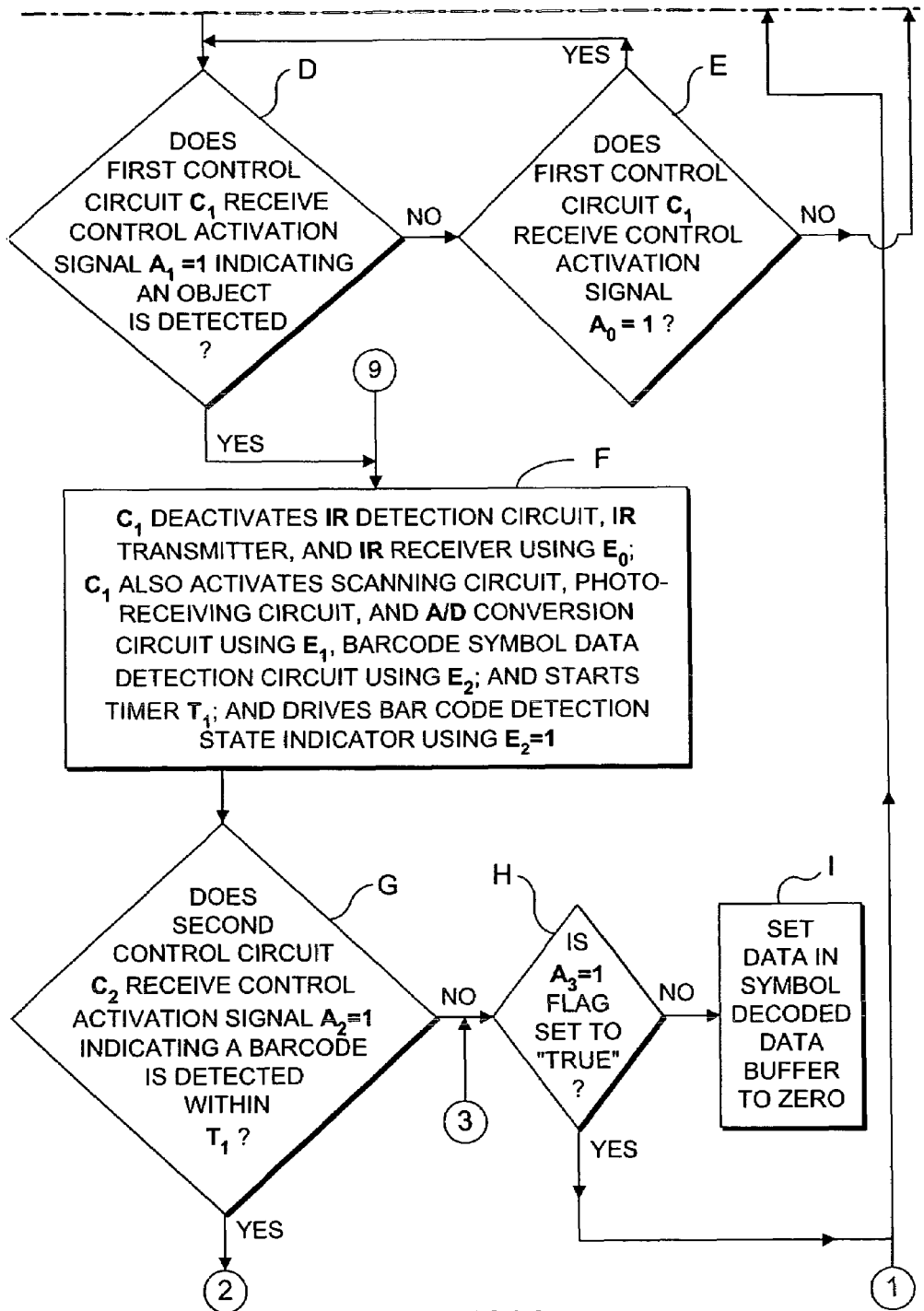
FIG. 18A2

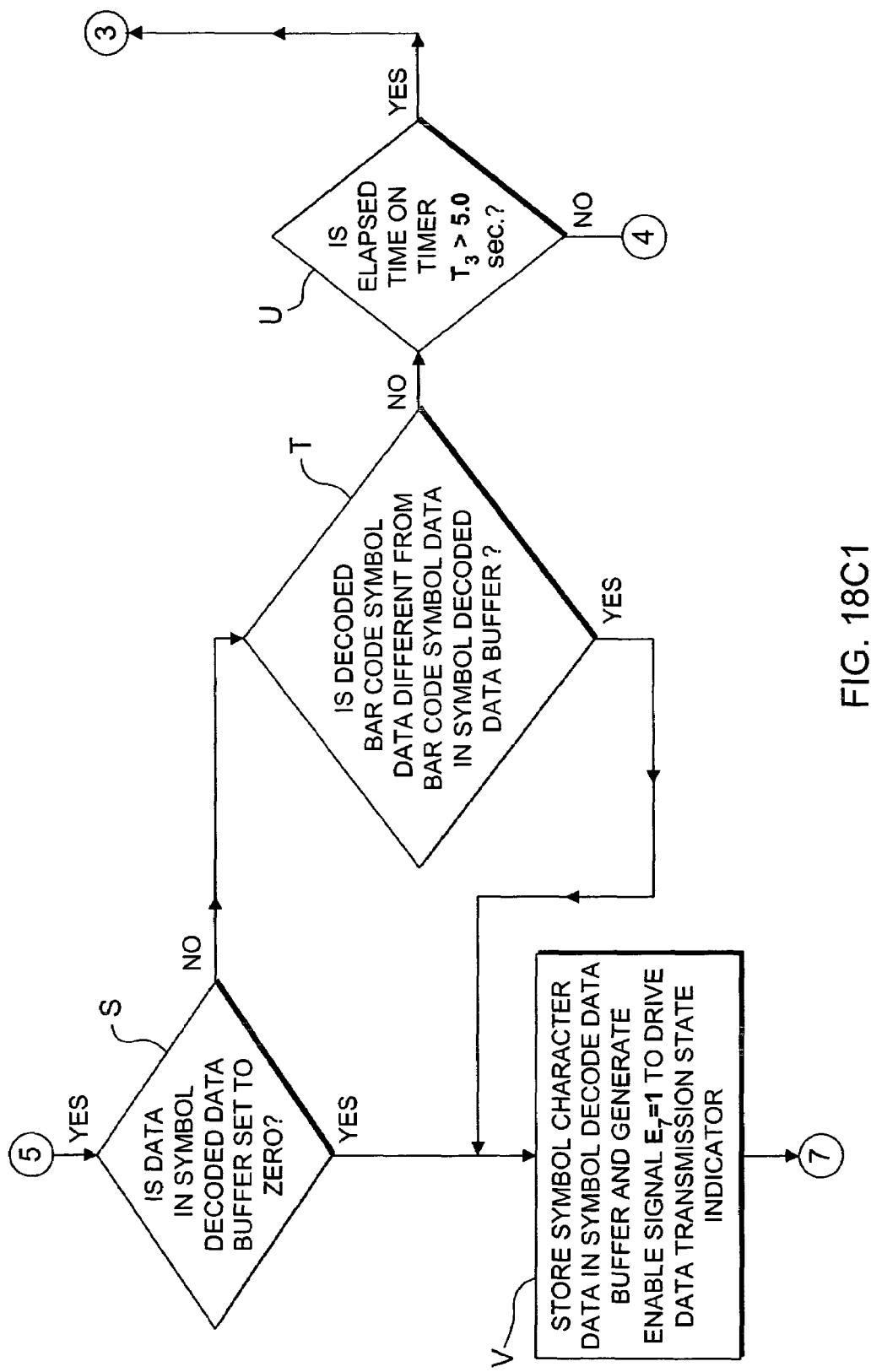
FIG. 18C1

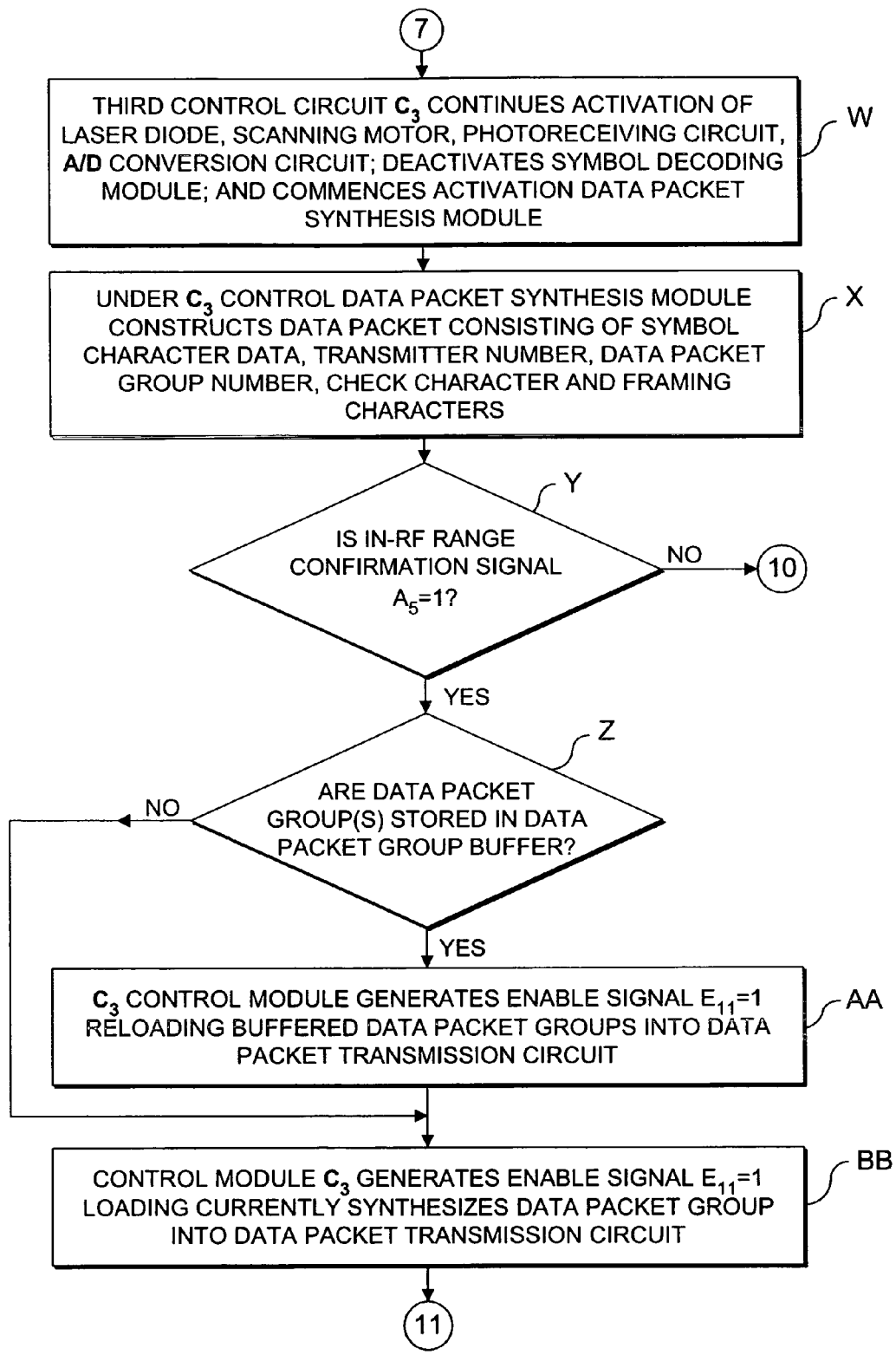
FIG. 18C2

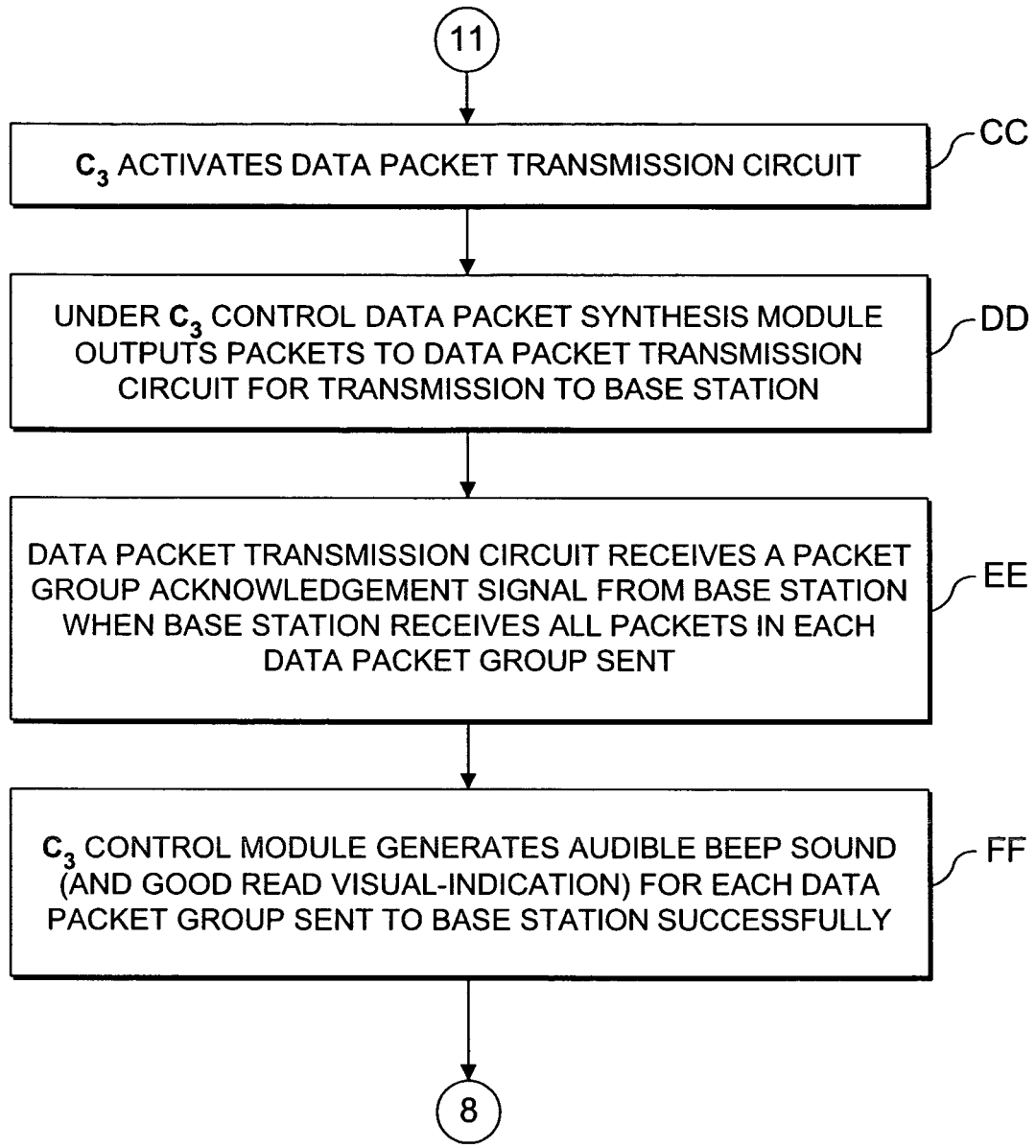
FIG. 18C3

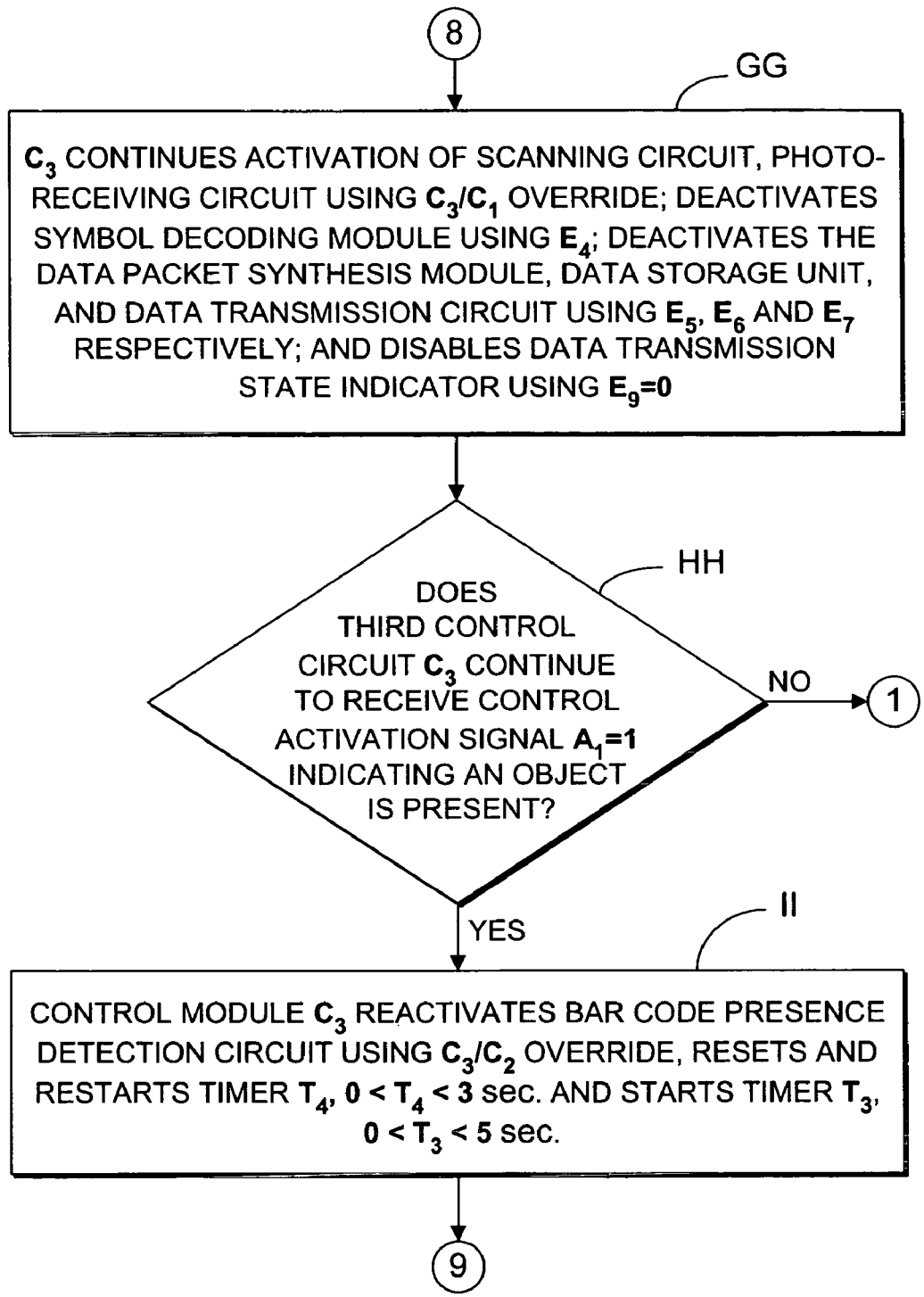
FIG. 18C4

US 7,464,878 B2

AUTOMATICALLY-ACTIVATED WIRELESS HAND-SUPPORTABLE LASER SCANNING BAR CODE SYMBOL READING SYSTEM WITH AUTOMATIC COMMUNICATION RANGE DEPENDENT CONTROL

RELATED CASES

The present application is a Continuation of U.S. application Ser. No. 10/755,869 filed Jan. 12, 2004, now U.S. Pat. No. 7,111,786; which is a continuation-in-part (CIP) of: U.S. application Ser. No. 10/342,433 filed Jan. 12, 2003, now U.S. Pat. No. 7,028,904; U.S. application Ser. No. 10/611,813 filed Jul. 1, 2003, now U.S. Pat. No. 7,137,561; U.S. application Ser. No. 10/630,622 filed Jul. 30, 2003, now U.S. Pat. No. 7,172,126; U.S. application Ser. No. 10/613,774 filed Jul. 3, 2003, now U.S. Pat. No. 7,281,663; U.S. application Ser. No. 10/611,846 filed Jul. 1, 2003 now U.S. Pat. No. 7,325,740; U.S. Application Ser. No. 10/613,527 filed Jul. 3, 2003 now U.S. Pat. No. 7,007,849; U.S. application Ser. No. 10/630,358 filed Jul. 30, 2003, now U.S. Pat. No. 7,278,578; U.S. application Ser. No. 10/613,758 filed Jul. 3, 2003, now U.S. Pat. No. 7,048,192; U.S. application Ser. No. 09/204,176 filed Dec. 3, 1998, now U.S. Pat. No. 6,283,375; U.S. application Ser. No. 09/452,976 filed Dec. 2, 1999, now U.S. Pat. No. 6,595,420; and International Application No. PCT/US99/28530 filed Dec. 2, 1999, published as WIPO Publication No. WO00/33239 on Jun. 8, 2000. Each said patent application is assigned to and commonly owned by Metrologic Instruments, Inc. of Blackwood, N.J., and is incorporated herein by reference in its entirety.

BACKGROUND OF THE INVENTION

1. Field of the Invention

The present invention relates generally to improvements in automatic laser scanning bar code symbol reading systems, wherein laser scanning and bar code symbol reading operations are automatically initiated in response to the automatic detection of objects and/or bar code symbols present thereon.

2. Brief Description of the Prior Art

Bar code symbols have become widely used in many environments such as, for example, point-of-sale (POS) stations in retail stores and supermarkets, inventory management document tracking, and diverse data control applications. To meet the growing demands of this technological innovation, bar code symbol readers of various types have been developed for sending bar code symbols and producing symbol character data for use as input in automated data processing systems.

In general, prior art hand-held bar code symbol readers using laser scanning mechanisms can be classified into two major categories.

The first category of hand-held laser-based bar code symbol readers includes lightweight hand-held laser scanners having manually-activated trigger mechanisms for initiating laser scanning and bar code symbol reading operations. The user positions the hand-held laser scanner at a specified distance from the object bearing the bar code symbol, manually activates the scanner to initiate reading, and then moves the scanner over other objects bearing bar code symbols to be read. Prior art bar code symbol readers illustrative of this first category are disclosed in U.S. Pat. Nos.: 4,575,625; 4,845,349; 4,825,057; 4,903,848; 5,107,100; 5,080,456; 5,047,617; 4,387,297; 4,806,742; 5,021,641; 5,468,949; 5,180,904; 5,206,492; 4,593,186; 5,247,162; 4,897,532; 5,250,792; 5,047,617; 4,835,374; 5,017,765; 5,600,121; 5,149,950; and 4,409,470.

The second category of hand-held laser-based bar code symbol readers includes lightweight hand-held laser scanners having automatically-activated (i.e. triggerless) mechanisms for initiating laser scanning and bar code symbol reading operations. The user positions the hand-held laser scanner at a specified distance from an object bearing a bar code symbol, the presence of the object is automatically detected using an infrared (IR) light beam or a low-power laser light beam, the presence of the bar code symbol on the object is detected using a visible laser light beam, and thereafter the detected bar code symbol is automatically scanned and decoded (i.e. read) to produce symbol character data representative of the read bar code symbol. Prior art illustrative of this second category of laser-based bar code symbol reading systems are disclosed in the following U.S. Pat. Nos. 4,639,606; 4,933,538; 5,828,048; 5,828,049; 5,825,012; 5,808,285; 5,796,091; 5,789,730; 5,789,731; 5,777,315; 5,767,501; 5,736,982; 5,742,043; 5,528,024; 5,525,789; D-385,265; 5,484,992; 5,661,292; 5,637,852; 5,468,951; 5,627,359; 5,424,525; 5,616,908; 5,591,953; 5,340,971; 5,340,973; 5,557,093; 5,260,553; and EP-A-0871138.

Automatically-activated laser scanning bar code symbol readers of the type disclosed in the above-referenced US Letters Patents enable the reading of bar code symbols without the shortcomings and drawbacks of manually-activated hand-held bar code symbol readers. However, automatically-activated bar code symbol readers can at times aggressively read bar code symbols that are not desired to be read by the user as, for example, when attempting to read a particular bar code from a list of bar code symbols closely printed on a bar code menu or like structure. This is caused by the laser scan-line within the scanning field scanning across two or more bar code symbols at the same time, which is likely to occur when the bar code scanner is positioned at a large distance from the object and the laser scanline is large due to the scanning geometry of the scanner. Oftentimes inadvertent bar code symbol reading errors must be corrected at their time of occurrence, wasting valuable time and resources of the user.

Notably, the use of the short-range CCD-emulsion mode taught in U.S. Pat. No. 5,558,024 provides a solution to the problem of inadvertently reading undesired bar code symbols closely printed on bar code menus. However, even when using this short-range CCD emulation mode, it is possible for the automatically-generated laser scanning pattern to inadvertently read an undesired bar code from the bar code menu as the operator moves the head portion of the hand-held reader into position over the bar code symbol to be read. This is due to the width of the laser scanning plane intersecting the object plane bearing the bar code symbol to be read. While it is possible in theory to operate the IR-based object detector in a short-range mode of operation, cost considerations make this difficult to achieve in practice.

Also, in order to enjoy the benefits of the short-range CCD-emulation mode, the laser scanning bar code symbol reader must be induced into this mode of operation either by reading a presignated (function-programming) bar code symbol, or by manually actuating a switch on the exterior of the scanner housing. Then, after reading the bar code symbol from the menu while the device is in its short-range CCD-emulation mode, the user is required to reconfigure the scanner back into its long-range mode of operation so that it can be used to read bar codes within a large depth of field of the reader. Until steps are taken to reconfigure the bar code symbol reader into its long range mode of operation, the user is forced to read bar code symbols in its CCD-emulsion mode which can be inconvenient in many types of scanning applications, thus reducing worker productivity.

When using the above-described system to read bar code symbols on products that have been placed among a set of previously "scanned" products at a check-out counter, there is a high likelihood that previously scanned products will be accidentally re-read, creating an error in check-out operations. Notably, the structure of this problem is quite similar to the bar code menu reading problem described above.

In wireless portable bar code symbol reading apparatus, the above problems are further exacerbated because of the need of the consumer battery power.

Thus, there is a great need in the art for an improved system and method of reading bar code symbols using automatically-activated laser scanning mechanisms while overcoming the above described shortcomings and drawbacks of prior art systems and methods.

OBJECTS AND SUMMARY OF THE PRESENT INVENTION

Accordingly, it is a primary object of the present invention to provide an improved system and method of reading bar code symbols using a wireless automatically-activated laser scanning mechanism while overcoming the above described shortcomings and drawbacks of prior art devices and techniques.

Another object of the present invention is to provide a wireless automatically-activated laser scanning bar code symbol reading system and method which provides the user with a greater degree of control over the disposition of bar code symbol reading processes automatically initiated to read bar code symbols printed on diverse types of objects including, but not limited to, printed bar code symbol menus.

Another object of the present invention is to provide a wireless automatically-activated code symbol reading system comprising a bar code symbol reading mechanism contained within a hand-supportable housing having a manually-activatable data transmission control (activation) switch, and wherein the bar code symbol reading mechanism automatically generates a visible laser scanning pattern for repeatedly reading one or more bar code symbols on an object during a bar code symbol reading cycle, and automatically generating a new symbol character data string in response to each bar code symbol read thereby.

Another object of the present invention is to provide such an automatically-activated code symbol reading system, wherein during a bar code symbol reading cycle, the user visually Maligns the visible laser scanning pattern with a particular bar code symbol on an object (e.g. product, document, bar code menu, etc.) so that the bar code symbol is scanned, detected and decoded in a cyclical manner.

Another object of the present invention is to provide such an automatically-activated code symbol reading system, wherein each time the scanned bar code symbol is successfully read during a bar code symbol reading cycle, a new bar code symbol character string is produced, while an indicator light on the hand-supportable housing is actively driven, and upon activation of the data transmission control switch during the bar code symbol reading cycle, a data transmission control activation signal is produced, enabling a subsequently produced symbol character data string to be selected and transmitted to the host system in an automatic manner.

Another object of the present invention is to provide such an automatically-activated bar code symbol reading system, wherein the objection detection is carried out using either infrared (IR) signal transmission/receiving technology, or low-power non-visible laser beam signaling technology, which automatically generates an object detection field that is spatially-coincident with, or spatially encompasses at least a portion of the bar code symbol detection and reading fields during the object detection state of system operation.

Another object of the present invention is to provide such a wireless automatically-activated bar code symbol reading system, wherein the visible laser scanning beam is scanned along a one-dimensional, two-dimensional or omni-directional scanning pattern within the bar code detection field and bar code reading field of the system.

A further object of the present invention is to provide such a wireless automatically-activated bar code symbol reading system, wherein a wireless data packet transmission and reception scheme is used to transmit symbol character data to a base station interfaced with a host system.

Another object of the present invention is to provide a wireless automatic hand-supportable bar code symbol reading system with automatic range-dependent data transmission control.

Another object of the present invention is to provide a wireless laser scanning bar code symbol reading system employing a 2-way RF-based data communication link between its cradle-providing base station and its wireless hand-supportable code symbol reading device employing a manually-operated data transmission activation switch that is controlled by automatically detecting whether or not the hand-supportable wireless device is located within the RF communication range of the RF-based data communication link.

Another object of the present invention is to provide such a system, wherein the range-dependent condition is detected by detecting the strength of "heartbeat" signals automatically transmitted from the base station to the wireless hand-supportable device.

Another object of the present invention is to provide such as system, wherein if the hand-supportable scanning device is located out-side of the predetermined 2-way RF communication range, then an audible and/or visual indicator is generated and packaged symbol character data is automatically buffered within the memory storage of device until the device moves into its communication range at a later time, during the next requested data transmission to the host computer system.

Another object of the present invention is to provide such as system designed for use in point-of-sale environments or light warehousing applications. This system design offers operators convenience and freedom of mobility.

Another object of the present invention is to provide a wireless laser scanning bar code symbol reading system, wherein wireless reader is programmed to require the user to press the data transmission activation button another time to transmit the barcode after it has just established a new communication link with its base station. This feature would allow user to rescan a different code to overwrite data before it is sent to the host system via the base station.

Another object of the present invention is to provide a wireless laser scanning bar code symbol reading system, wherein its system control process is programmed to enables multiple treads to be stored before data transmission is to occur to the base station after depressing the data transmission activation switch.

Another object of the present invention is to provide a wireless laser scanning bar code symbol reading system, wherein its control system is programmed so that all three LEDs illuminate to indicate that wireless reader is out of range, as well as so that all three LEDs illuminate to indicate that there is stored data in a Data Packet Group Buffer waiting to be transmitted to the base station.

Another object of the present invention is to provide a wireless laser scanning bar code symbol reading system, wherein its control system is programmed so that stored data can be cleared by holding down the data transmission activation switch for programmed duration (i.e. 3 sec.).

Another object of the present invention is to provide a wireless laser scanning bar code symbol reading system, wherein its control system can be programmed so that it tests its wireless data communication link before transmission of data packets buffered in memory to the base station. With this feature, the systems can avoid losing barcode caused by the disconnection of the reader and its base station.

Another object of the present invention is to provide a wireless laser scanning bar code symbol reading system, wherein a mechanical vibrator is provided within the hand-supportable housing of the wireless device so that when data transmission from the reader to the base station is successful, then the reader automatically vibrates. In noisy environments, this feature should provide a clear signal to the operator that the transmission status has been successful.

Another object of the present invention is to provide a wireless laser scanning bar code symbol reading system, wherein a low battery protection circuit is provided within the wireless hand-supportable reader for (i) automatically monitoring battery voltage; and (ii) razzing/vibrating the reader if the battery voltage is low, and turning off laser diode within the device, and causing the system to enter its sleep mode. This circuit can protect the battery from over-discharge and data errors, because the current drawn from the battery will be much higher when its voltage is too low.

Another object of the present invention is to provide a wireless laser scanning bar code symbol reading system, wherein the RF transceiver chip set and including associated baseband microcontrollers aboard the wireless reader and base station are automatically driven into a low power mode when the data communication link between the wireless reader and its base station is disconnected or terminated. When the wireless reader is woken up, these microcontrollers are also woken up at the same time, and the RF transceivers automatically activated and the communication link reestablished.

Another object of the present invention is to provide a wireless laser scanning bar code symbol reading system, wherein a system power switch is located at the rear end of reader's housing, and accessible by way of a small pin hole. With this feature, the operator can disconnect the battery using the power switch at the rear of the reader. This feature provides a simple way to save electrical power and will protect the battery aboard the wireless reader. In addition, this switch can serve as a hardware reset button when something is wrong with the treader.

Another object of the present invention is to provide a wireless laser scanning bar code symbol reading system, wherein the cradle portion of the base station is provided with protractable/retractable support hooks for supporting the hand-held reader in vertical and horizontal orientations alike.

Another object of the present invention is to provide an automatic wireless laser scanning bar code symbol reading system of the present invention employs a 2-way RF-based data communication link between its cradle-providing base station and its wireless hand-supportable code symbol reading device, which has a manually-operated data transmission activation switch that is controlled by automatically detecting whether or not the hand-supportable wireless device is located within the RF communication range of the RF-based data communication link. If the hand-supportable scanning device is located out-side of the predetermined 2-way RF communication range, then an audible and/or visual indicator is generated and packaged symbol character data is automatically buffered within the memory storage of device until the device moves into its communication range at a later time, during the next requested data transmission to the host computer system. This wireless hand-held scanning system is designed for use in point-of-sale environments or light warehousing applications. This system design offers operators convenience and freedom of mobility.

Another object of the present invention is to provide a wireless laser scanning bar code symbol reading system, wherein the firmware of wireless bar code reader's firmware is updated by a host computer.

Another object of the present invention is to provide a wireless laser scanning bar code symbol reading system, capable of reading 2-D bar code symbologies such as PDF 417, and the like.

Another object of the present invention is to provide a portable, fully automatic bar code symbol reading system which is compact, simple to use and versatile.

Yet a further object of the present invention is to provide a novel method of reading bar code symbols using the automatically-activated bar code symbol reading system of the present invention.

A further object of the present invention is to provide an automatically-activated wireless hand-supportable laser scanning bar code symbol reading system with data transmission activation switch and automatic communication range dependent control A further object of the present invention is to provide a wireless laser scanning bar code symbol reading system employing a low-battery protection circuit, vibrational alarm and sleep mode of operation A further object of the present invention is to provide a wireless laser scanning bar code symbol reading system, wherein the RF-based transceiver chipsets within the wireless hand-supportable unit and base station thereof are automatically deactivated and said RF data communication link therebetween terminated when said system enters its power-saving sleep mode, and reactivated and reestablished when re-entering its operational mode A further object of the present invention is to provide a wireless bar code symbol reading system capable of automatically collecting and storing symbol character data when hand-supportable unit is operated outside of its RF data communication range, and automatically transmitting stored symbol character data when the hand-supportable unit is operated within its RF data communication range A further object of the present invention is to provide a automatically-activated laser scanning 2d bar code symbol reading system A further object of the present invention is to provide an automatically-activated hand-supportable 2-d bar code symbol reading system employing a linear laser scanning pattern generator, an automatic bar code symbol data detector, audible data capture feedback generator, and a manually-activated data transmission activation switch.

A further object of the present invention is to provide an automatically-activated wireless laser scanning 2d bar code symbol reading system capable of automatically transmitting stored symbol character data when the hand-supportable unit is operated within its RF data communication range and automatically collecting and storing symbol character data when the hand-supportable unit is operated outside of its RF data communication range A further object of the present invention is to provide a wireless bar code symbol reading system employing a base station with a cradle having a hinged support hooks for enabling vertical and horizontal installations These and further objects of the present invention will become apparent hereinafter and in the Claims to Invention.

BRIEF DESCRIPTION OF THE DRAWINGS

For a fuller understanding of the Objects of the Present Invention, the Detailed Description of the Illustrated Embodiments of the Present Invention should be read in conjunction with the accompanying drawings, wherein:

FIG. 1A1 is a schematic representation of a generalized embodiment of the wireless system of the present invention, wherein its wireless automatic bar code reading device is shown located outside of the predetermined communication range of the system's 2-way RF data communication link, and wherein the heartbeat signal automatically transmitted from RF transceiver chip set in the base station is no being longer received and detected by the RF transceiver chip set in the wireless automatic bar code reading device, automatically causing the data transmission subsystem in the hand-supportable device to generate an "out-of-range activation signal", $A_5=0$, for use by the control subsystem thereof during data packet transmission operations in accordance with the principles of the present invention shown in FIG. 1A3;

FIG. 1A2 is a schematic representation of the generalized embodiment of the wireless system of the present invention, wherein the wireless automatic bar code reading device is shown moved within the predetermined communication range of the system's 2-way RF data Ecommunication link, and wherein the heartbeat signal automatically transmitted from RF transceiver chip set in the base station is being received and detected by the RF transceiver chip set in the wireless automatic bar code reading device, automatically causing the data transmission subsystem in the hand-supportable device to generate an "in-range activation signal", $A_5=1$, for use by the control subsystem thereof during data packet transmission operations in accordance with the principles of the present invention shown in FIG. 1A3;

FIG. 1A3 is a flow-chart type schematic diagram illustrating the steps involved in carrying out the bar code symbol reading method of the present invention when using a wireless automatically-activated bar code symbol reading system, as generally shown in FIGS. 1A1 and 1A2, and the various illustrative embodiments shown and described herein;

FIG. 2G is an elevated side view of the wireless automatically-activated bar code symbol reading device of FIGS. 2A and 2B, illustrating in greater detail the spatial relationship between the IR-based object detection field and the laser-based bar code symbol detection and reading fields of the device shown in FIG. 2A;

FIG. 2H is a plan view of the wireless automatically-activated bar code symbol reading device of FIGS. 2A and 2B;

FIG. 5I shows an elevated side view of the cradle-supporting base station employed in the system of FIGS. 5A through 5D, with its support hook arranged in its retracted configuration;

FIG. 5J shows an elevated side view of the cradle-supporting base station employed in the system of FIGS. 5A through 5D, with its support hook arranged in its protracted configuration;

FIG. 7A is a perspective view of a fourth illustrative embodiment of the automatically-activated laser scanning bar code symbol reading engine of the present invention shown completely assembled, adapted for incorporation into any one of the bar code symbol reading devices of the present invention, and programmed for automatically reading bar code symbols using its IR-based object detection field and its 2-D laser-based scanning (i.e. bar code detecting and reading) field;

FIG. 7B is an elevated front view of the automatically-activated laser scanning bar code symbol reading engine of FIG. 7A, showing the geometrical characteristics of its light transmission window;

FIG. 7C is an elevated rear view of the automatically-activated laser scanning bar code symbol reading engine of FIG. 7A, showing its input/output signal port;

FIG. 7D is a perspective view of the automatically-activated laser scanning bar code symbol reading engine of FIG. 7A, shown with the upper cover portion of the miniature housing removed off from the lower housing portion thereof, revealing the optical layout of the laser beam scanning optics of the device;

FIGS. 10A1 through 10A4, taken together, is a system block functional diagram of the first general operating system design for the wireless automatically-activated laser scanning bar code symbol reading system of the present invention, wherein automatic IR-based object detection is employed during system operation;

FIG. 10B1 is a schematic diagram of the system override signal detection circuit employed in the Application Specific Integrated Circuit (ASIC) chip within the wireless automatically-activated bar code symbol reading system of FIGS. 10A1 through 10A4;

FIG. 10B2 is a functional logic diagram of the system override detection circuit of the present invention;

FIG. 10C is a functional logic diagram of the oscillator circuit in the ASIC chip in the bar code symbol reading system of FIGS. 10A1 through 10A4;

FIG. 10L is a schematic representation of the time window and subintervals maintained by the bar code symbol detection circuit shown in FIGS. 10A1 through 10A4 during the bar code symbol detection process, FIG. 10M is a functional logic diagram of the second control circuit ($C_2$) in the ASIC chip in the automatic bar code symbol reading system of FIGS. 10A1 through 10A4;

FIG. 10N is Boolean logic table defining the functional relationships among the input and output signals into and out from the second control circuit $C_2$ shown in FIG. 10M;

FIG. 13A1 is a schematic representation of the wireless system of the present invention, wherein the wireless automatic bar code reading device is shown located outside of the predetermined communication range of the system's 2-way RF data communication link, and wherein the heartbeat signal automatically transmitted from RF transceiver chip set in the base station is no being longer received and detected by the RF transceiver chip set in the wireless automatic bar code reading device, automatically causing the data transmission subsystem in the hand-supportable device to generate an "out-of-range activation signal", $A_5=0$ for use by the control subsystem thereof during data packet transmission operations;

FIG. 13A2 is a schematic representation of the wireless system of the present invention, wherein the wireless automatic bar code reading device is shown moved within the predetermined communication range of the systems's 2-way RF data communication link, and wherein the heartbeat signal automatically transmitted from RF transceiver chip set in the base station is being received and detected by the RF transceiver chip set in the wireless automatic bar code reading device, automatically causing the data transmission subsystem in the hand-supportable device to generate an "in-range activation signal", $A_5=1$ for use by the control subsystem thereof during data packet transmission operations;

FIGS. 14A1 to 14C4, taken together, show a high level flow chart of the control process carried out by the control subsystem of the bar code symbol reading system of FIGS. 15A1 through 15A4;

FIGS. 17A1 through 17A4, taken together, is a system block functional diagram of the operating system design for the automatically-activated laser scanning bar code symbol reading system shown in FIG. 16, wherein automatic IR-based object detection is employed during system operation.

FIGS. 18A1 through 18C4, taken together, show a high level flow chart of the control process carried out by the control subsystem of the bar code symbol reading system of FIGS. 17A1 through 17A4.

DETAILED DESCRIPTION OF THE ILLUSTRATIVE EMBODIMENTS OF THE PRESENT INVENTION

Figure 1B:
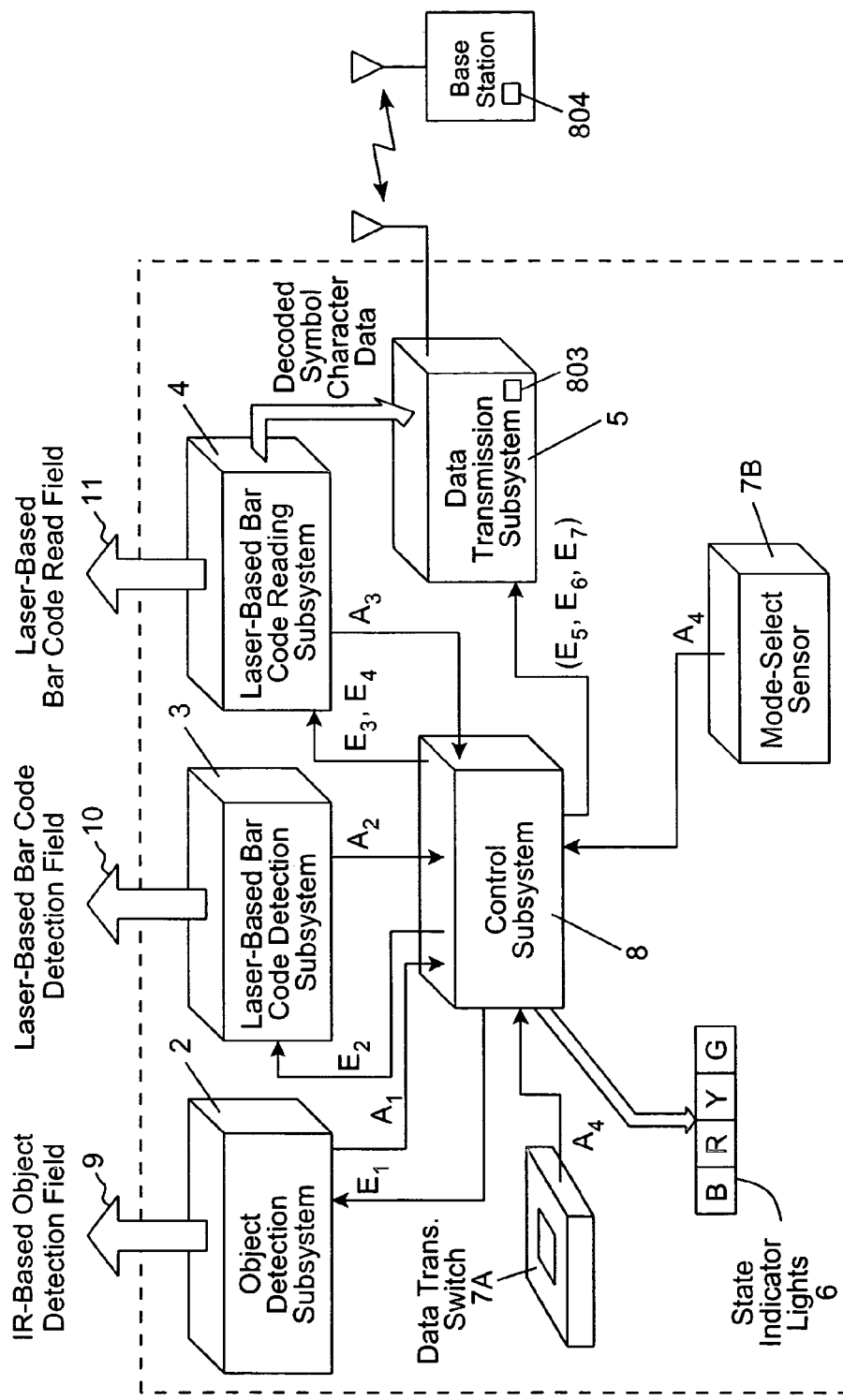
FIG. 1B is a schematic representation of the first illustrative embodiment of the wireless automatically-activated bar code symbol reading device of the present invention, showing the major subsystem components thereof as comprising an IR-based object detection subsystem, a laser-based bar code symbol detection subsystem, a laser-based bar code symbol reading subsystem, a data transmission subsystem, and a system control subsystem.

Referring to the figures in the accompanying Drawings, the various illustrative embodiments of the wireless automatically-activated laser scanning bar code symbol reading system of the present invention will be described in great detail, wherein like elements will be indicated using like reference numerals.

Prior to detailing the various illustrative embodiments of the present invention, it will be helpful to first provide a brief overview of the system and method thereof.

As illustrated in FIGS. 1A1 and 1A2, the wireless automatically-activated bar code symbol reading system 1000 of the present invention generally comprises: a hand-supportable bar code symbol reader 1001 having a bar code symbol reading mechanism and a Bluetooth® RF-based transceiver chipset 803 contained within a hand-supportable housing 1002 having a manually-activatable data transmission switch 1008; and base station 1010 also having Bluetooth® RF-based transceiver chipset 804 contained within a base station housing, and interfaced with the host system to which the base station is connected.

As illustrated in FIGS. 1A1 and 1A2, the wireless hand-supportable bar code symbol reading system of the present invention is programmed for two principally different modes of operation: (1) for automatically detecting when the wireless hand-supportable bar code symbol reader is located inside of a predetermined RF communication range $A_5=1$, and thereupon to automatically enable a (currently or subsequently) produced symbol character data string to be selected and transmitted to its base station, at substantially the same time when its data transmission activation control signal $A_4=1$ is generated by manual actuation of the data transmission switch 1008, as schematically depicted as a directional-arrow structure 1006B; and (2) for automatically detecting when the wireless hand-supportable bar code symbol reader is located outside of said predetermined RF communication range $A_5=0$, and thereupon to automatically collect and store (aboard the device) the symbol character data string produced at substantially the same time when the data transmission control activation signal $A_4=1$ is generated while the wireless hand-supportable bar code symbol reader is located outside of the predetermined RF communication range, $A_5=0$. Also, the wireless automatically-activated bar code symbol reading system of the present invention is programmed so that the wireless bar code reading device automatically transmits collected symbol character data when its automatically detects that it has been moved back within the predetermined RF-based communication range, $A_5=1$.

By virtue of this advanced range-dependent data transmission control method, the wireless bar code symbol reading system of the present invention can now be used in more flexible ways, not restricted by whether or not the device is located within its communication range during bar code symbol reading and data collection operations, while offering the ability to accurately read, in an unprecedented manner, diverse types of bar code symbols on bar code menus, consumer products positioned in crowded POS environments, and other objects requiring automatic identification and/or information access and processing.

Figure 1C:
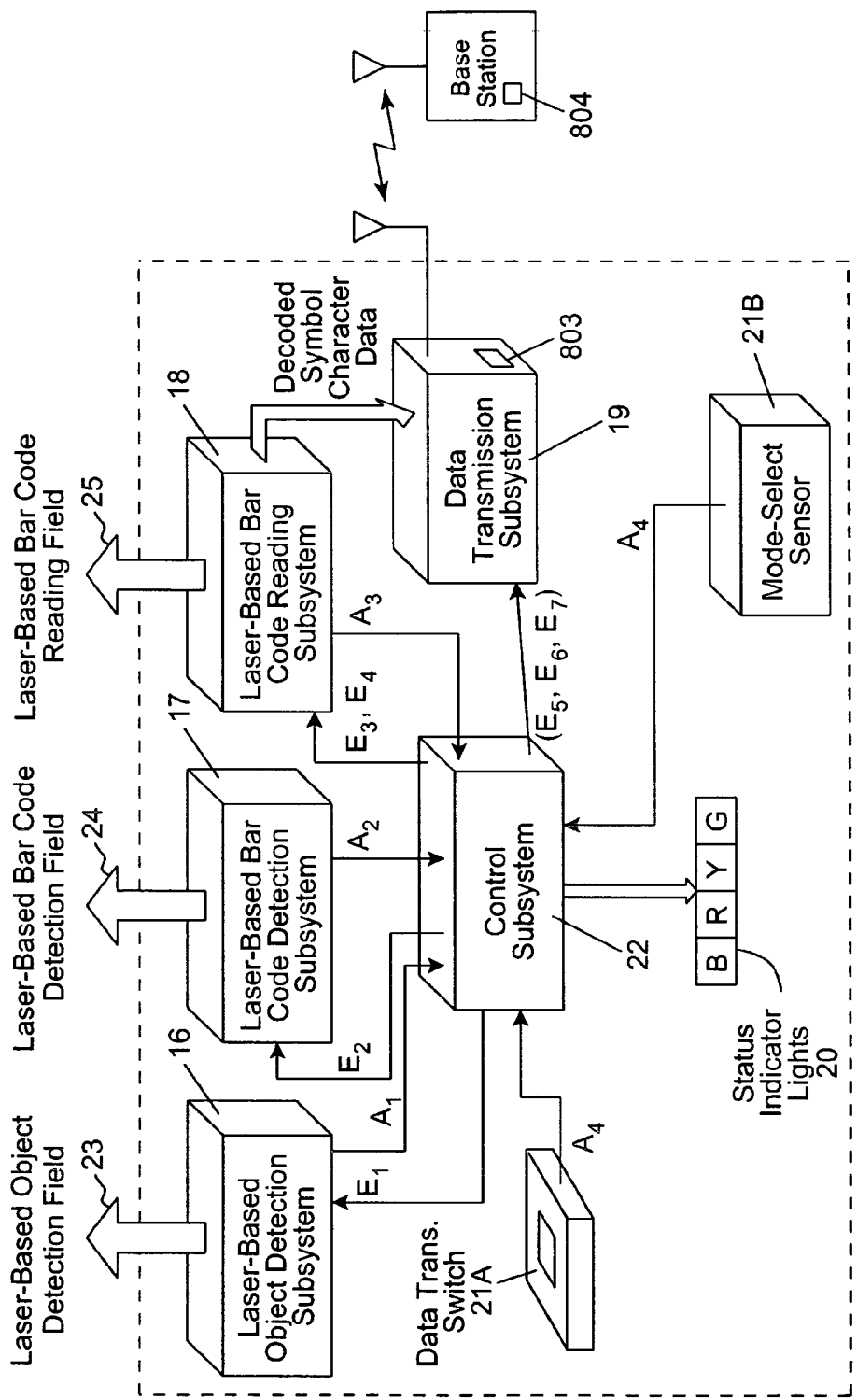
FIG. 1C is a schematic representation of the second illustrative embodiment of the wireless automatically-activated bar code symbol reading device of the present invention, showing the major subsystem components thereof as comprising a laser-based object detection subsystem, a laser-based bar code symbol detection subsystem, a laser-based bar code symbol reading subsystem, a data transmission subsystem, and a system control subsystem.
Figure 1D:
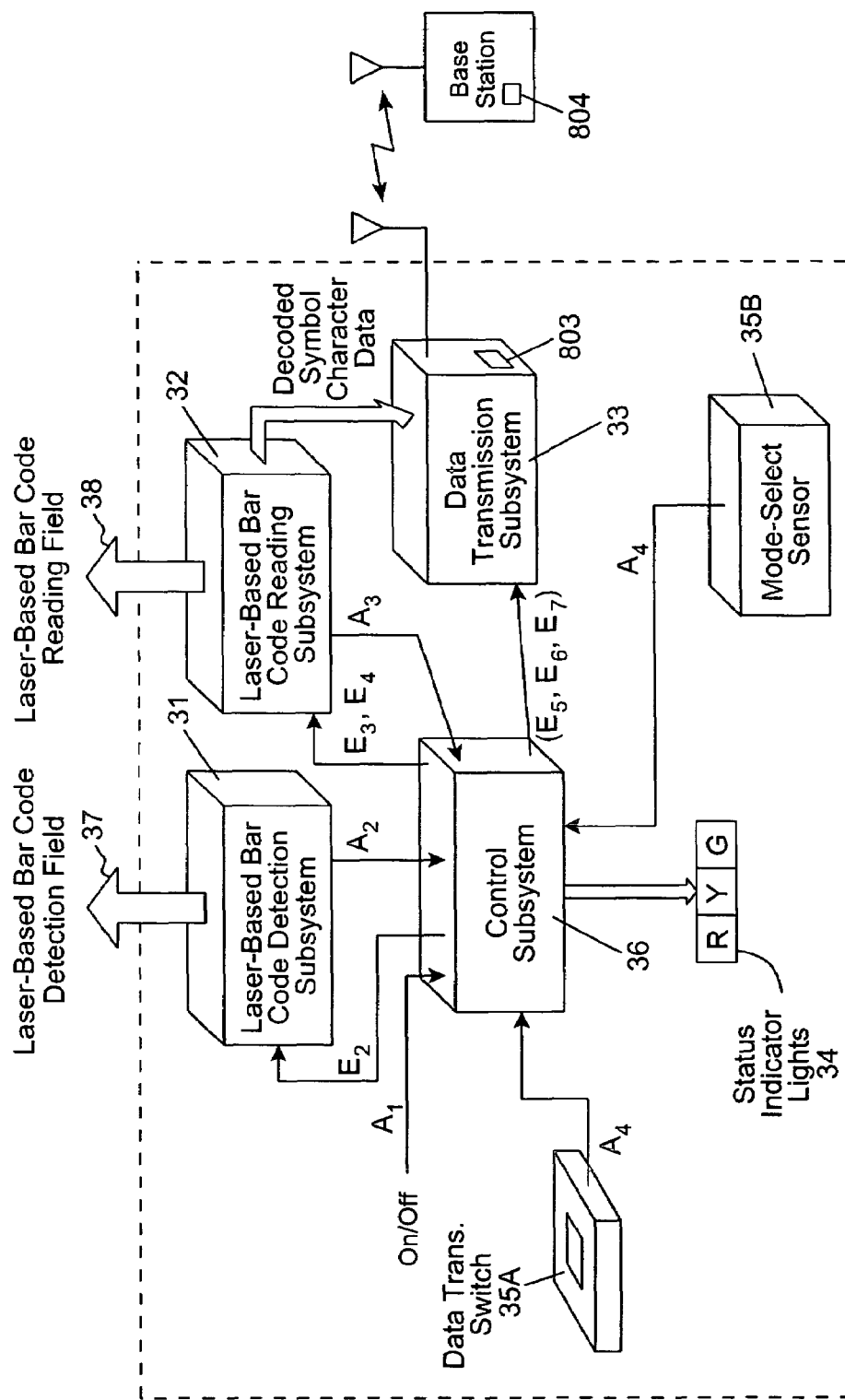
FIG. 1D is a schematic representation of the third illustrative embodiment of the wireless automatically-activated bar code symbol reading device of the present invention, showing the major subsystem components thereof as comprising a laser-based bar code symbol detection subsystem, a laser-based bar code symbol reading subsystem, a data transmission subsystem, and a system control subsystem.

In FIGS. 2A through 5J, many different embodiments of the automatically-activated bar code symbol reading system of the present invention are shown. These different embodiments scan be classified into three different types of generalized system designs, each based on the general manner in which its underlying laser scanning mechanism is automatically-activated and controlled during the bar code symbol reading process of the present invention. These three different system designs are illustrated in FIGS. 1B, 1C and 1D. In each of these generalized system designs, activation of the bar code symbol detection and bar code symbol reading operations is carried out in a fully automatic manner, without the use of a manually-activated trigger or like mechanism, as disclosed, for example, in U.S. Pat. Nos. 5,828,048; 5,828,049; 5,825,012; 5,808,285; 5,796,091; 5,789,730; 5,789,731; 5,777,315; 5,767,501; 5,736,482; 5,661,292; 5,627,359; 5,616,908; 5,591,953; 5,557,093; 5,528,024; 5,525,798; 5,484,992; 5,468,951; 5,425,525; 5,240,971; 5,340,973; 5,260,553; incorporated herein by reference. Prior to describing each of the illustrative embodiments of the present invention in detail, it will be helpful at this juncture to briefly describe each of the three generalized system designs of the present invention.

First Generalized System Design for the Wireless Automatically-Activated Bar Code Symbol Reading Device of the Present Invention with Automatic Range-Dependent Data Transmission Control The first generalized system design for the Wireless Automatically-Activated Bar Code Symbol Reading Device of the present invention is shown in FIG. 1B. Any of the ten different illustrative embodiments shown in FIGS. 2A through 5J can be adapted to realize this first generalized system design. In each such illustrative embodiment of the present invention, the hand-supportable, body-wearable or desktop-supportable bar code symbol reading device (hereinafter referred to as "hand-supportable bar code symbol reading device") includes an automatically-activated bar code symbol scanning engine, embedded within the housing of the device. While hand-held, finger-supported, desktop-supported and body-wearable housings will be disclosed hereinafter for the bar code symbol reading device of the present invention, the term "hand-supportable housing" as used hereinafter and in the Claims to Invention shall be deemed to include all such housing designs, as well as an infinite array of variations on the form factors thereof. In general, any of the automatically-activated laser scanning bar code symbol reading engines shown in FIGS. 6A, 7A through 8A can be embodied within the scanner housing of the bar code symbol reading device. In the illustrative embodiments, particular laser scanning engine designs have been incorporated into the scanner housing of the bar code symbol reading device for illustrative purposes. It is understood, however, that other laser scanning engine designs can be integrated into the scanner housings of such bar code symbol reading devices.

As indicated in FIG. 1B, the automatically-activated bar code symbol scanning device of the first general system design 1 comprises a number of subsystems, namely: an IR-based object detection subsystem 2 as taught in prior U.S. Pat. Nos. 5,260,553 and 5,808,285, incorporated herein by reference; a laser-based bar code symbol detection subsystem 3; a laser-based bar code symbol reading subsystem 4; a data transmission subsystem 5; a state indication subsystem 6; a data transmission activation switch or control device 7A integrated with the scanner housing in part or whole; a mode-selection sensor 7B integrated with the scanner housing in part or whole; and a system control subsystem 8 operably connected to the other subsystems described above. In general, system 1 has a number of preprogrammed operational states, namely: an Object Detection State; a Bar Code Symbol Detection State; a Bar Code Symbol Reading State; and a Data Transmission State.

Within the context of the system design shown in FIG. 1B, the IR-based object detection subsystem 2 performs the following primary functions during the object detection state: (i) automatically and synchronously transmitting and receiving pulse infrared (IR) signals within an IR-based object detection field 9 defined relative to the hand-supportable scanner housing (not shown) (ii) automatically detecting an object in at least a portion of the IR-based object detection field 9 by analysis of the received IR pulse signals; and (iii) in response thereto, automatically generating a first control activation signal $A_1$ indicative of such automatic detection of the object within the object detection field. As shown in FIG. 1A, the first control activation signal $A_1=1$ is provided to the system control subsystem 8 for detection, analysis and programmed response.

As shown in the figures hereof, object detection, bar code detection and bar code reading fields 9, 10 and 11, respectively, have been schematically represented only in terms of their general geometrical boundaries. For purposes of clarity, the geometrical characteristics of these fields have not been shown. Notably, however, such characteristics can be ascertained from the various references relating thereto which are identified and incorporated herein by reference.

Within the context of the system design shown in FIG. 1B, the laser-based bar code symbol detection subsystem 3 performs the following primary functions during the bar code symbol detection state: (i) automatically generating a visible laser scanning pattern of predetermined characteristics within the laser-based bar code (symbol) detection field 10, defined relative to the scanner housing (not shown), to enable scanning of a bar code symbol on the detected object; (ii) automatically processing scan data collected from the bar code symbol detection field 10 and detecting the presence of the bar code symbol thereon; and (iii) automatically generating a control activation signal $A_2=1$ indicative thereof in response to the automatic detection of the bar code symbol. As shown in FIG. 1 B, the second control activation signal $A_2$ is provided to the system control subsystem 8 for detection, analysis and programmed response.

Within the context of the system design shown in FIG. 1B, the laser-based bar code symbol reading subsystem 4 performs the following functions during the bar code symbol reading state: (i) automatically generating a visible laser scanning pattern of predetermined characteristics within the laser-based bar code (symbol) reading field 11 defined relative to the scanner housing, to enable scanning of the detected bar code symbol therein; (ii) automatically decode processing scan data collected from the bar code symbol reading field 11 so as to detect the bar code symbol on the object; (iii) automatically generating a third control activation signal $A_3=1$ indicative of a successful decoding operation, and producing decoded symbol character data representative of the detected and read bar code symbol. As shown in FIG. 1B, the third control activation signal $A_3$ is provided to the system control subsystem 8 for detection, analysis sand programmed response.

Within the context of the system design shown in FIG. 1B, during the Data Transmission State, the data transmission subsystem 5 automatically transmits produced symbol character data string to the base station only when the system control subsystem 36 detects at least the following conditions: (1) generation of third control activation signal $A_3=1$ within a predetermined time period, indicative that the bar code symbol has been read; (ii) generation of data transmission control activation signal $A_4=1$ (e.g. produced from manually-activatable switch 7A) within a predetermined time frame, indicative that user desires the produced bar code symbol character data to be transmitted to the base station; and (iii) generation of the in-range indication signal $A_5=1$ during the predetermined time frame, indicative that the bar code symbol reader is located within the predetermined RF-based communication range of the system. Also, during the Data Transmission State, the data transmission subsystem 5 automatically collects and stores produced symbol character data string (aboard the device) only when the system control subsystem 8 detects at least the following conditions: (1) generation of third control activation signal $A_3=1$ within a predetermined time period, indicative that the bar code symbol has been read; (ii) generation of data transmission control activation signal $A_4=1$ (e.g. produced from manually-activatable switch 7A) within a predetermined time frame, indicative that user desires the produced bar code symbol character data string to be transmitted to the base station; and (iii) generation of the out-of-range indication signal $A_5=0$ during the predetermined time frame, indicative that the bar code symbol reader is located outside of the predetermined RF-based communication range of the system.

Within the context of the system design shown in FIG. 1B, the state-selection sensor 7B has two primary functions: (i) to automatically generate the fourth control activation signal $A_4=1$ whenever the scanner housing has been placed within its support stand, or placed on a countertop or like surface in those instances where it has been designed to do so, so that the system is automatically induced into its automatic hands-free mode of operation; and (ii) to automatically generate the fourth control activation signal $A_4=0$ whenever the scanner housing has been removed from its support stand, or lifted off of a countertop or like surface in those instances where it has been designed to do so, so that the system is automatically induced into its automatic hands-on mode of operation. In the automatic hands-free mode of operation, the mode-select sensor 7B effectively overrides the data transmission switch 7B. In the automatic hands-on mode of operation, the data transmission switch 7A effectively overrides the mode-select sensor 7B.

Within the context of the system design shown in FIG. 1B, the system control subsystem 8 performs the following primary functions: (i) automatically receiving control activation signals $A_1$, $A_2$, $A_3$ and $A_4$; (ii) automatically generating enable signals $E_1$, $E_2$, $E_3$, $E_4$, $E_5$, $E_6$, and $E_7$; and (iii) automatically controlling the operation of the other subsystems in accordance with a system control program carried out by the system control subsystem 8 during the various modes of system operation.

In general, the geometrical and optical characteristics of laser scanning patterns generated by the laser-based bar code symbol detection subsystem 3 and the laser-based bar code symbol reading subsystem 4 will depend on each particular embodiment of the bar code symbol reading system of the present invention. In most applications, the laser scanning patterns generated within the bar code detection and reading fields will be substantially congruent, and if not substantially congruent, then arranged so that the bar code symbol reading field 11 spatially-overlaps the bar code symbol detection field 10 to improve the scanning efficiency of the system. Also, the IR-based object detection field 9 will be arranged relative to the bar code detection field 10 so that it spatially-encompasses the same along the operative scanning range of the system defined by the geometrical characteristics of the bar code reading field 11 thereof.

In general, detected energy reflected from an object during object detection can be optical radiation or acoustical energy, either sensible or non-sensible by the user, and may be either generated from the automatic bar code reading device or an external ambient source. However, the provision of such energy is preferably achieved by transmitting a wide beam of pulsed infrared (IR) light away from transmission aperture of the scanner, as taught herein. In the preferred embodiment, the object detection field 9, from which such reflected energy is collected, is designed to have a narrowly diverging pencil-like geometry of three-dimensional volumetric expanse, which is spatially coincident with at least a portion of the transmitted infrared light beam. This feature of the present invention ensures that an object residing within the object detection field 9 will be illuminated by the infrared light beam, and that infrared light reflected therefrom will be directed generally towards the transmission aperture of the housing where it can be automatically detected to indicate the presence of the object within the object detection field 9.

Initially, system control subsystem 8 provides enable signal $E_1=1$ to the IR-based object detection subsystem 2. When an object is presented within the IR-based object detection field 9, the object is automatically detected by the IR-based object detection subsystem 2. In response thereto, the IR-based object detection system automatically generates a control activation signal $A_1=1$. When control activation signal $A_1=1$ is detected by the system control subsystem 8, it automatically activates the laser-based bar code symbol detection subsystem 3 by producing enable signal $E_2$. This causes the laser-based bar code detection subsystem 3 to generate a laser scanning pattern of predetermined characteristics within the laser-based bar code detection field 10. When the laser scanning pattern scans a bar code symbol on the detected object, scan data signals are produced therefrom, collected, detected and processed to determine whether a bar code symbol has been scanned within the bar code symbol detection field 10. If the scanned bar code symbol is detected, then the system control subsystem 8 automatically generates enable signal $E_3$ and $E_4$ so as to activate the bar code symbol reading subsystem 4. In response thereto, the laser-based bar code reading subsystem 4 automatically generates a laser scanning pattern within the laser-based bar code reading field 11, scans the detected bar code symbol disposed therewithin, collects scan data therefrom, decodes the detected bar code symbol, generates symbol character data representative of the decoded bar code symbol, and buffers the symbol character data in memory.

If the detected bar code symbol is read within a predetermined period of time, the manually-actuated data transmission switch 7A is depressed within a predetermined time frame established by the system control subsystem 8, and Bluetooth® RF transceiver chipset 803 detects that the bar code symbol reader is located inside the predetermined RF data communication range of the system ($A_5=1$), then the system control subsystem 8 automatically activates the data transmission subsystem 5 and transmits the buffered symbol character data string, produced at substantially the same time as the manual activation of the data transmission switch, to the base station. In the illustrative embodiment, this range-dependent condition is detected by detecting the strength of "heartbeat" signals transmitted from the base station to the wireless hand-supportable device.

If, however, the detected bar code symbol is read within a predetermined period of time, the manually-actuated data transmission switch 7A is depressed within a predetermined time frame established by the system control subsystem 8, and Bluetooth® RF transceiver chipset 803 detects that the bar code symbol reader is located outside of the predetermined RF data communication range of the system ($A_5=0$), then the system control subsystem 8 automatically activates the data transmission subsystem 33, generates an audible and/or visual indicator, and transmits the packaged symbol character data string to a data storage buffer aboard the bar code symbol reader (or a portable data collection device connected thereto).

Then when the bar code symbol reader is moved within the predetermined RF-based data communication range of the system, the Bluetooth® RF-based transceiver chipset automatically detects this condition, and then buffered/packaged symbol character data is automatically transmitted to the base station by the RF-based data communication link of the system. This wireless hand-held scanning system design offers operators convenience and freedom of mobility, ideal for use in point-of-sale (POS) environments and/or light warehousing applications.

By virtue of the novel system control architecture, the user is permitted to read bar code symbols in a highly intuitive manner, wherein object detection, bar code detection, and bar code symbol reading are carried out in an automatic manner, and decoded symbol character data produced at substantially the same time when manual-activation of a switch is activated, is (i) automatically transmitted to the base station only when the bar code symbol reader is located within the predetermined data communication range of the system, and (ii) automatically collected and stored within bar code symbol reader only when the device is located within the predetermined data communication range of the system.

The structure and functionalities of the first general system design of FIG. 1B described above are shown in greater detail in the system embodiment of FIGS. 10A1 through 15. As will be described in greater detail hereinafter, this system embodiment requires a complex control subsystem architecture, but offers a significant improvement in power conservation which can be very important in portable and mobile data acquisition applications.

Second Generalized System Design for the Wireless Automatically-Activated Bar Code Symbol Reading Device of the Present Invention with Automatic Range-Dependent Data Transmission Control The second generalized system design of the wireless automatically-activated bar code symbol reading system of the present invention is shown in FIG. 1C. Any of the ten different illustrative embodiments shown in FIGS. 2A through 5J can be adapted to realize this second generalized system design. In each such illustrative embodiment of the present invention, the hand-supportable, body-wearable or desktop-supportable bar code symbol reading device includes an automatically-activated bar code symbol scanning engine, embedded within the scanner housing. In general, any of the automatically-activated laser scanning bar code symbol reading engines shown in FIGS. 6C, 7E and 8B can be embodied within the scanner housing of the bar code symbol reading device.

As indicated in FIG. 1C, the automatically-activated bar code symbol scanning engine of the second general system design 15 comprises a number of subsystems, namely: a laser-based object detection subsystem 16 as taught in prior U.S. Pat. No. 4,933,538 to Heiman, et al., incorporated herein by reference; a laser-based bar code symbol detection subsystem 17; a laser-based bar code symbol reading subsystem 18; a data transmission subsystem 19; a state indication subsystem 20; and a data transmission activation switch or control device 21A integrated with the scanner housing in part or whole; a mode-selection sensor 21B integrated with the scanner housing it part or whole; and a system control subsystem 22 operably connected to the other subsystems described above. In general, system 15 has a number of preprogrammed states of operation, namely: an Object Detection State; a Bar code Symbol Detection State; a Bar code Symbol Reading State; and a Data Transmission State.

Within the context of the system design shown in FIG. 1C, the laser-based object detection subsystem 16 performs the following primary functions: (i) automatically generates and scans a low-power pulsed (invisible) laser scanning beam across an object within a laser-based object detection field 23 defined relative to the hand-supportable scanner housing (not shown); (ii) automatically detects an object in at least a portion of the laser-based object detection field by analysis of collected scan data; and (iii) in response thereto, automatically generating a first control activation signal $A_1$ indicative of such automatic detection of the object within the object detection field 23. As shown in FIG. 1C, the first control activation signal $A_1$ is provided to the system control subsystem 22 for detection, analysis and programmed response.

Within the context of the system design shown in FIG. 1C, the laser-based bar code symbol detection subsystem 17 performs the following primary functions during the Bar Code Symbol Detection State: (i) automatically generating a laser scanning pattern of predetermined characteristics within the laser-based bar code (symbol) detection field 24, defined relative to the scanner housing, to enable scanning of a bar code symbol on the detected object; (ii) automatically processing scan data collected from the bar code symbol detection field 24 and detecting the presence of the bar code symbol thereon; and (iii) automatically generating a control activation signal $A_2$ indicative thereof in response to the automatic detection of the bar code symbol. As shown in FIG. 1C, the second control activation signal $A_2$ is provided to the system control subsystem 22 for detection, analysis and programmed response.

Within the context of the system design shown in FIG. 1C, the laser-based bar code symbol reading subsystem 18 performs the following functions during the Bar Code Symbol State: (i) automatically generating a visible laser scanning pattern of predetermined characteristics within the laser-based bar code (symbol) reading field 25 defined relative to the scanner housing, to enable scanning of the detected bar code symbol therein; (ii) automatically decode processing scan data collected from the bar code symbol reading field 25 so as to detect the bar code symbol on the detected object; (iii) automatically generating a third control activation signal $A_3=1$ indicative of a successfull decoding operation, and producing decoded symbol character data representative of the detected and read bar code symbol. As shown in FIG. 1C, the third control activation signal $A_3$ is provided to the system control subsystem 22 for detection, analysis and programmed response.

As shown in the figures hereof, object detection, bar code detection and bar code reading fields 23, 24 and 25, respectively, have been schematically represented only in terms of their general geometrical boundaries. For purposes of clarity, the geometrical characteristics of these fields have not been shown. Notably, however, such characteristics can be ascertained from the various references relating thereto which are identified and incorporated herein by reference.

Within the context of the system design shown in FIG. 1C, during the Data Transmission State, the data transmission subsystem 19 automatically transmits produced symbol character data string to the base station only when the system control subsystem 22 detects at least the following conditions: (1) generation of third control activation signal $A_3=1$ within a predetermined time period, indicative that the bar code symbol has been read; (ii) generation of data transmission control activation signal $A_4=1$ (e.g. produced from manually-activatable switch 21A) within a predetermined time frame, indicative that user desires the produced bar code symbol character data string to be transmitted to the base station; and (iii) generation of the in-range indication signal $A_5=1$ during the predetermined time frame, indicative that the bar code symbol reader is located within the predetermined RF-based communication range of the system. Also, during the Data Transmission State, the data transmission subsystem 19 automatically collects and stores/buffers produced symbol character data strings(aboard memory storage within the device) only when the system control subsystem 22 detects at least the following conditions: (1) generation of third control activation signal $A_3=1$ within a predetermined time period, indicative that the bar code symbol has been read; (ii) generation of data transmission control activation signal $A_4=1$ (e.g. produced from manually-activatable switch 21A) within a predetermined time frame, indicative that user desires the produced bar code symbol character data string to be transmitted to the base station; and (iii) generation of the out-of-range indication signal $A_5=0$ during the predetermined time frame, indicative that the bar code symbol reader is located outside of the predetermined RF-based communication range of the system.

Within the context of the system design shown in FIG. 1C, the state-selection sensor 21B has two primary functions: (i) to automatically generate the fourth control activation signal $A_4=1$ whenever the scanner housing has been placed within its support stand, or placed on a countertop or like surface in those instances where it has been designed to do so, so that the system is automatically induced into its automatic hands-free mode of operation; and (ii) to automatically generate the fourth control activation signal $A_4=0$ whenever the scanner housing has been removed from its support stand, or lifted off of a countertop or like surface in those instances where it has been designed to do so, so that the system is automatically induced into its automatic hands-on mode of operation. In the automatic hands-free mode of operation, the mode-select sensor 21B effectively overrides the data transmission switch 21A. In the automatic hands-on mode of operation, the data transmission switch 21A effectively overrides the mode-select sensor 21B.

Within the context of the system design shown in FIG. 1C, the system control subsystem 22 performs the following primary functions: (i) automatically receiving control activation signals $A_1$, $A_2$, $A_3$ and $A_4$; (ii) automatically generating enable signals $E_1$, $E_2$, $E_3$, $E_4$, $E_5$, $E_6$, and $E_7$; and (iii) automatically controlling the operation of the other subsystems in accordance with a system control program carried out by the system control subsystem 22 during the various modes of system operation.

In general, the geometrical and optical characteristics of laser scanning patterns generated by the laser-based bar code symbol detection subsystem 17 and the laser-based bar code symbol reading subsystem 18 will depend on each particular embodiment of the bar code symbol reading system of the present invention. In most applications, the laser scanning patterns generated within the bar code detection and reading fields will be substantially congruent, and if not substantially congruent, then arranged so that the bar code symbol reading field spatially-overlaps the bar code symbol detection field to improve the scanning efficiency of the system. Also, the laser-based object detection field will be arranged relative to the bar code detection field so that it spatially-encompasses the same along the operative scanning range of the system defined by the geometrical characteristics of the bar code reading field thereof.

Initially, system control subsystem 22 provides enable signal $E_1=1$ to the laser-based object detection subsystem 16. When an object is presented within the laser-based object detection field 23, the object is automatically detected by the laser-based object detection 1 subsystem 16. In response thereto, the laser-based object detection system 16 automatically generates a control activation signal $A_1=1$. When control activation signal $A_1=1$ is detected by the control system subsystem 22, the system control subsystem automatically activates the laser-based bar code symbol detection subsystem 17 by producing enable signal $E_2$. This causes the laser-based bar code detection subsystem 17 to generate a visible laser scanning pattern of predetermined characteristics within the laser-based bar code detection field 24. When the laser scanning pattern scans a bar code symbol on the detected object, scan data signals are produced therefrom, collected, detected and processed to determine whether a bar code symbol has been detected within the bar code symbol detection field 24. If the scanned bar code symbol is detected, then the system control subsystem 22 automatically generates enable signal $E_3$ and $E_4$ so as to activate the bar code symbol reading subsystem 18. In response thereto, the laser-based bar code reading subsystem 18 automatically generates a visible laser scanning pattern within the laser-based bar code reading field 25, scans the detected bar code symbol disposed therewithin, collects scan data therefrom, decodes the detected bar code symbol, generates symbol character data representative of the decoded bar code symbol, and buffers the symbol character data in memory.

If the detected bar code symbol is read within a predetermined period of time, the manually-actuated data transmission switch 21A is depressed within a predetermined time frame established by the system control subsystem 22, and Bluetooth® RF transceiver chipset 803 detects that the bar code symbol reader is located inside the predetermined RF data communication range of the system ($A_5=1$), then the system control subsystem 22 automatically activates the data transmission subsystem 19 and transmits the buffered symbol character data string, produced at substantially the same time as the manual activation of the data transmission switch, to the base station. In the illustrative embodiment, this range-dependent condition is detected by detecting the strength of "heartbeat" signals transmitted from the base station to the wireless hand-supportable device.

If, however, the detected bar code symbol is read within a predetermined period of time, the manually-actuated data transmission switch 21A is depressed within a predetermined time frame established by the system control subsystem 22, and Bluetooth® RF transceiver chipset 803 detects that the bar code symbol reader is located outside of the predetermined RF data communication range of the system ($A_5=0$), then the system control subsystem 22 automatically activates the data transmission subsystem 19, generates an audible and/or visual indicator, and transmits the packaged symbol character data string to a data storage buffer aboard the bar code symbol reader (or a portable data collection device connected thereto).

Then when the bar code symbol reader is moved within the predetermined RF-based data communication range of the system ($A_5=1$), the Bluetooth® RF-based transceiver chipset automatically detects this condition, and then buffered/packaged symbol character data is automatically transmitted to the base station by the RF-based data communication link of the system. This wireless hand-held scanning system design offers operators convenience and freedom of mobility, ideal for use in point-of-sale (POS) environments and/or light warehousing applications.

In the second general system design of FIG. 1C, a lower-power laser-based object detection subsystem is provided for automatic detection of objects within the object detection field of the system. Likewise, the laser-based bar code symbol detection subsystem 17 is a realized from various electro-optical and electro-mechanical components assembled together so as to enable automatic detection of bar code symbols on detected objects within the laser-based bar code detection field of the system. Also, the laser-based bar code symbol reading subsystem 18 is realized from various electro-optical and electromechanical components assembled together, so as to enable automatic reading of detected bar code symbols within the laser-based bar code reading field of the system. As will be described in greater detail hereinafter, this system design requires a less complex control subsystem architecture, but does not enjoy the power conservation advantages of system designs employing IR-based object detection techniques.

Third Generalized System Design for the Wireless Automatically-Activated Bar Code Symbol Reading Device of the Present Invention The third generalized system design of the Wireless Automatically-Activated Bar Code Symbol Reading Device of the present invention is shown in FIG. 1D. Any of the ten different illustrative embodiments shown in FIGS. 2A through 5J can be adapted to realize this first generalized system design. In each such illustrative embodiment of the present invention, the hand-supportable, body-wearable or desktop-supportable bar code symbol reading device includes an automatically-activated bar code symbol scanning engine, embedded within the scanner housing. In general, any of the automatically-activated laser scanning bar code symbol reading engines shown in FIGS. 6D, 7F, and 8C can be embodied within the scanner housing of the bar code symbol reading device.

As indicated in FIG. 1D, the automatically-activated bar code symbol scanning engine of the third general system design 30 comprises a number of subsystems, namely: a laser-based bar code symbol detection subsystem 31; a laser-based bar code symbol reading subsystem 32; a data transmission subsystem 33; a state indication subsystem 34; a data transmission activation switch or control device 35A integrated with the scanner housing (not shown) in part or whole; a mode-selection sensor 35B integrated with the scanner housing it part or whole; and a system control subsystem 36 operably connected to the other subsystems described above. In general, the system 30 has a number of preprogrammed states of operation, namely: a Bar Code Symbol Detection State; a Bar code Symbol Reading State; and a Data Transmission State.

Within the context of the system design shown in FIG. 1D, the laser-based bar code symbol detection subsystem 31 performs the following primary functions during the Bar Code Symbol Detection State: (i) automatically generates a pulsed visible laser scanning pattern of predetermined characteristics within a laser-based bar code (symbol) detection field 37, defined relative to the scanner housing, to enable scanning of a bar code symbol on the detected object; (ii) automatically processes scan data collected from the bar code symbol detection field 37 and detects the presence of the bar code symbol thereon; and (iii) automatically generates a control activation signal $A_2=1$ indicative thereof in response to the automatic detection of the bar code symbol. As shown in FIG. 1D, the second control activation signal $A_2$ is provided to the system control subsystem 36 for detection, analysis and programmed response.

Within the context of the system design shown in FIG. 1D, the laser-based bar code symbol reading subsystem 32 performs the following functions during the Bar Code Symbol Reading State: (i) automatically generates a visible laser scanning pattern of predetermined characteristics within a laser-based bar code (symbol) reading field 38 defined relative to the scanner housing, to enable scanning of the detected bar code symbol therein; (ii) automatically decode-processes scan data collected from the bar code symbol reading field 38 so as to detect the bar code symbol on the detected object; (iii) automatically generates a third control activation signal $A_3=1$ indicative of a successful decoding operation, and produces decoded symbol character data representative of the detected and read bar code symbol. As shown in FIG. 1D, the third control activation signal $A_3$ is provided to the system control subsystem 36 for detection, analysis and programmed response.

Within the context of the system design shown in FIG. 1D, during the Data Transmission State, the data transmission subsystem 33 automatically transmits produced symbol character data to the base station only when the system control subsystem 36 detects the following conditions: (1) generation of third control activation signal $A_3=1$ within a predetermined time period, indicative that the bar code symbol has been read; (ii) generation of data transmission control activation signal $A_4=1$ (e.g. produced from manually-activatable switch 35A) within a predetermined time frame, indicative that user desires the produced bar code symbol character data string to be transmitted to the base station; and (iii) generation of the in-range indication signal $A_5=1$ during the predetermined time frame, indicative that the bar code symbol reading device is located within the predetermined RF-based communication range of the system. Also, the data transmission subsystem 33 during the Data Transmission State, automatically produces an audible/visible indication and collects and stores produced symbol character data string (aboard the device) when the system control subsystem detects the following conditions: (1) generation of third control activation signal $A_3=1$ within a predetermined time period, indicative that the bar code symbol has been read; (ii) generation of data transmission control activation signal $A_4=1$ (e.g. produced from manually-activatable switch 35A) within a predetermined time frame, indicative that user desires the produced bar code symbol character data string to be transmitted to the base station; and (iii) generation of the out-of-range indication signal $A_5=0$ during the predetermined time frame, indicative that the bar code symbol reader is located outside of the predetermined RF-based communication range of the system.

Within the context of the system design shown in FIG. 1D, the state-selection sensor 35B has two primary functions: (i) to automatically generate the fourth control activation signal $A_4=1$ whenever the scanner housing has been placed within its support stand, or placed on a countertop or like surface in those instances where it has been designed to do so, so that the system is automatically induced into its automatic hands-free mode of operation; and (ii) to automatically generate the fourth control activation signal $A_4=0$ whenever the scanner housing has been removed from its support stand, or lifted off of a countertop or like surface in those instances where it has been designed to do so, so that the system is automatically induced into its automatic hands-on mode of operation. In the automatic hands-free mode of operation, the mode-select sensor 35B effectively overrides the data transmission switch 35A. In the automatic hands-on mode of operation, the data transmission switch 35A effectively overrides the mode-select sensor 35B.

Within the context of the system design shown in FIG. 1D, the system control subsystem 36 performs the following primary functions: (i) automatically receiving control activation signals $A_1$, $A_2$, $A_3$ and $A_4$; (ii) automatically generating enable signals $E_2$, $E_3$, $E_4$, $E_5$, $E_6$, and $E_7$; and (iii) automatically controlling the operation of the other subsystems in accordance with a system control program carried out by the system control subsystem 36 during the various modes of system operation.

In general, the geometrical and optical characteristics of laser scanning patterns generated by the laser-based bar code symbol detection subsystem 31 and the laser-based bar code symbol reading subsystem 32 will depend on each particular embodiment of the bar code symbol reading system of the present invention. In most applications, the laser scanning patterns generated within the bar code detection and reading fields will be substantially congruent, and if not substantially congruent, then arranged so that the bar code symbol reading field spatially-overlaps the bar code symbol detection field to improve the scanning efficiency of the system.

Initially, system control subsystem 36 provides enable signal $E_2=1$ to the laser-based bar code detection subsystem 31. This causes the laser-based bar code detection subsystem 31 to generate a pulsed laser scanning pattern of predetermined characteristics within the laser-based bar code detection field 37. As shown in FIG. 26, the pulse-on duration of the laser signal is about 50%, while the pulse-off duration is also about 50%. When the laser scanning pattern scans a bar code symbol on the detected object, scan data signals are produced therefrom, collected, detected and processed to determine whether a bar code symbol has been detected within the bar code symbol detection field 37. If the scanned bar code symbol is detected, then the system control subsystem 36 automatically generates enable signal $E_4=1$ so as to activate the bar code symbol reading subsystem 32. In response thereto, the laser-based bar code reading subsystem 32 automatically generates a visible laser scanning pattern within the laser-based bar code reading field 38, scans the detected bar code symbol disposed therewithin, collects scan data therefrom, decodes the detected bar code symbol, generates symbol character data representative of the decoded bar code symbol, and buffers the symbol character data in memory.

If the detected bar code symbol is read within a predetermined period of time, the manually-actuated data transmission switch 35A is depressed within a predetermined time frame established by the system control subsystem 36, and Bluetooth® RF transceiver chipset 803 detects that the bar code symbol reader is located inside the predetermined RF data communication range of the system ($A_5=1$), then the system control subsystem 36 automatically activates the data transmission subsystem 33 and transmits the buffered symbol character data string, produced at substantially the same time as the manual activation of the data transmission switch, to the base station. In the illustrative embodiment, this range-dependent condition is detected by detecting the strength of "heartbeat" signals transmitted from the base station to the wireless hand-supportable device.

If, however, the detected bar code symbol is read within a predetermined period of time, the manually-actuated data transmission switch 35A is depressed within a predetermined time frame established by the system control subsystem 36, and Bluetooth® RF transceiver chipset 803 detects that the bar code symbol reader is located outside of the predetermined RF data communication range of the system ($A_5=0$), then the system control subsystem 36 automatically activates the data transmission subsystem 33, generates an audible and/or visual indicator, and transmitts the packaged symbol character data string to a data storage buffer aboard the bar code symbol reader (or a portable data collection device connected thereto).

Then when the bar code symbol reader is moved within the predetermined RF-based data communication range of the system, the Bluetooth® RF-based transceiver chipset automatically detects this condition, and then buffered/packaged symbol character data is automatically transmitted to the base station by the RF-based data communication link of the system. This wireless hand-held scanning system design offers operators convenience and freedom of mobility, ideal for use in point-of-sale (POS) environments and/or light warehousing applications.

In the third general system design of FIG. 1D, there is no provision for automatic object detection within the system, but simply a continuously-operating bar code symbol presence detection subsystem is provided for automatic detection of bar codes within the scanning field of the system. The laser-based bar code symbol detection subsystem 31 is realized from various electro-optical and electromechanical components assembled together, so as to enable automatic detection of bar code symbols on detected objects within the laser-based bar code detection field of the system, and transmission of symbol character data to the base station when the bar code reader is located within its predetermined data communication range, and storage of the produced symbol character data when the bar code reading device is located outside the range thereof (and automatic transmission of the buffered data when the bar code symbol reading device is moved back within the data communication range of the system. Also, the laser-based bar code symbol reading subsystem is realized from various electro-optical and electro-mechanical components assembled together, so as to enable automatic reading of detected bar code symbols within the laser-based bar code reading field of the system. As will be described in greater detail hereinafter, this system design requires an even simpler control subsystem architecture than system designs employing automatic object detection. However, this system design requires that a low-power (non-visible) laser beam be continuously or periodically generated within the bar code symbol detection field during system operation, thus consuming electrical power which can be significant in portable and mobile scanning applications where battery power is used.

While each of the three generalized bar code symbol reading systems described hereinabove can be connected to its base unit, host computer, data processor, data storage device, or like device by way of wires wrapped in a flexible cord-like structure, it will be preferred in many embodiments to connect the bar code symbol reading system of the present invention, via its base unit, to a host computer, data processor or data storage device or like device by way of either a wired or wireless data communication link supporting various different types of data communication interfaces disclosed, for example in U.S. Pat. Nos. 4,460,120; 5,321,246 and 5,142,550, and WIPO Publication No. WO 03/024190 published Mar. 27, 2003, each incorporated herein by reference in its entirety.

First Illustrative Embodiment of Automatically-Activated Bar Code Symbol Reading System of the Present Invention As shown in FIGS. 2A to 2H, the wireless bar code symbol reading system of the first illustrative embodiment 40 comprises an automatically-activated portable bar code symbol reading device 41 operably associated with a base unit 42 having a scanner support stand 43. Bar code symbol reading device 41 is operably connected with its the base unit 42 by way of a one-way or two-way electromagnetic link established between bar code symbol reading device 41 and its mated base unit 42. After each successful reading of a bar code symbol by the bar code symbol reading device 41, symbol character data (representative of the read bar code symbol) is generated, and if timely activated, then subsequently produces symbol character data collected from the same read bar code symbol which is automatically transmitted to the base station 42 in accordance with the wireless RF-based data communication method of the present invention, and ultimately to a host system 45 to which the base station is interfaced. The wireless RF-based data communication method of the present invention will be described in greater detail hereinafter with reference to FIGS. 13A1 and 13A2. In the illustrative embodiments, operable interconnection between the base unit 42 and the host system (e.g. electronic cash register system, data collection device, etc.) 45 is achieved using a flexible multiwire communications cable 46 extending from the base unit and plugged directly into the data-input communications port of the host computer system 45.

In the illustrative embodiment, electrical power from a low voltage direct current (DC) power supply (not shown) is provided to the base unit by way of a flexible power cable 47. Notably, this DC power supply can be realized in host computer system 45 or as a separate DC power supply adapter pluggable into a conventional 3-prong electrical socket. As will be described in greater detail hereinafter, a rechargeable battery power supply unit 55 is contained within bar code symbol reading device 41 in order to energize the electrical and electro-optical components within the device.

Figure 2A:
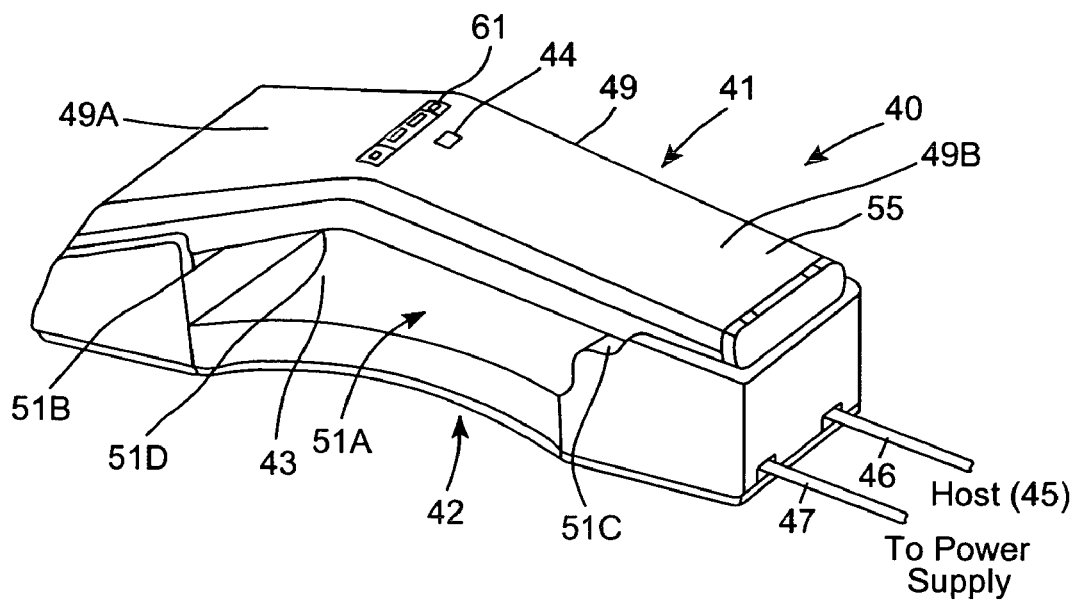
FIG. 2A is a perspective view of the first illustrative embodiment of the wireless automatically-activated bar code symbol reading device of the present invention, shown supported within the scanner support stand portion of its matching base unit, for automatic hands-free operation at a POS-station.
Figure 2B:
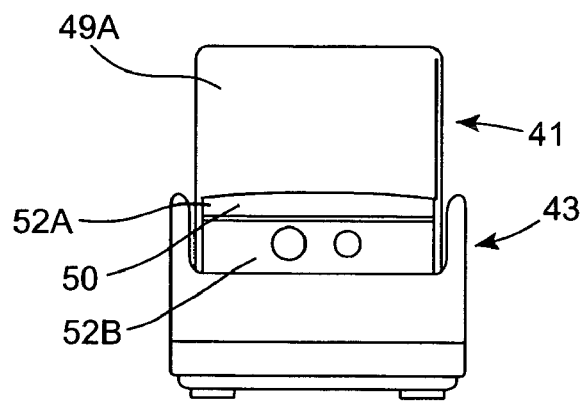
FIG. 2B is an elevated front view of the wireless automatically-activated bar code symbol reading device of FIG. 2A, shown supported within the scanner support stand portion of its base unit for automatic hands-free operation.
Figure 2C:
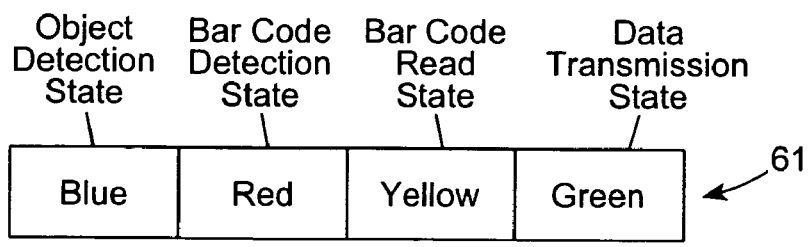
FIG. 2C is a schematic diagram of the color-coded state indicating light sources provided on the exterior of the housing of the wireless automatically-activated bar code symbol reading device of FIGS. 2A and 2B, as well as all other automatically-activated bar code symbol reading devices of the present invention.
Figure 2D:
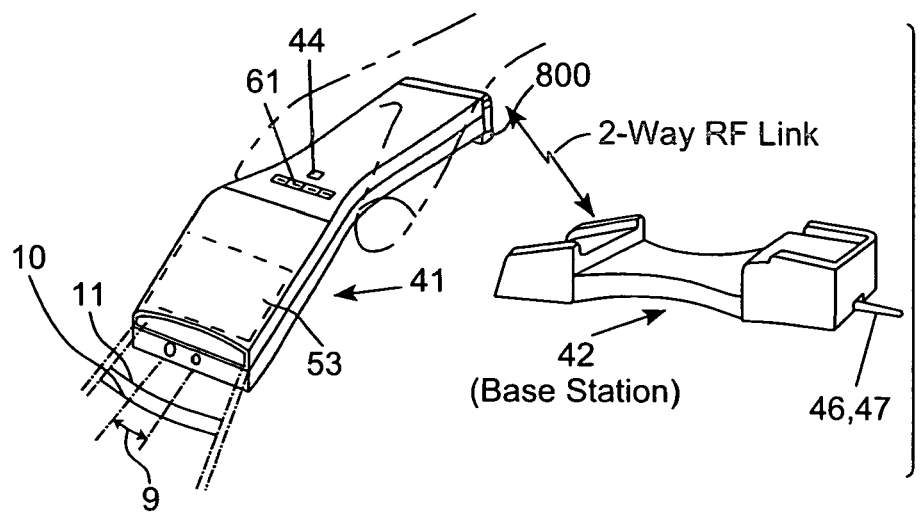
FIG. 2D is a perspective view of the wireless automatically-activated bar code symbol reading device of FIG. 1A, shown being used in the automatic hands-on mode of operation.

As illustrated in FIG. 2A and 2B, scanner support stand 43 is particularly adapted for receiving and supporting portable bar code symbol reading device 41 in a selected position without user support, thus providing a stationary, automatic hands-free mode of operation. In general, portable bar code reading device 41 includes an ultra-light weight hand-supportable housing 49 having a contoured head portion 49A and a handle portion 49B. As will be described in greater detail hereinafter, head portion 49A encloses electro-optical components which are used to generate and project a visible laser beam through light transmissive window 50 in housing head portion 49A, and to repeatedly scan the projected laser beam across its bar code detecting scanning field 10 and bar code reading field 11, both defined external to the hand-supportable housing.

As illustrated in FIGS. 2A and 2B, the scanner support stand portion 43 includes a * support frame which comprises a base portion 51A, a head portion support structure 51B, handle portion support structure 51C and a finger accommodating recess 51D. As shown, base portion 51 A has a longitudinal extent and is adapted for selective positioning with respect to a support surface, e.g. countertop surface, counter wall surface, etc. An aperture 51A1 is formed in the base portion 51A to allow a piezo-electric transducer 559 to generate acoustical acknowledgement signals therethrough upon successful data transmission to the base unit.

Figure 2E:
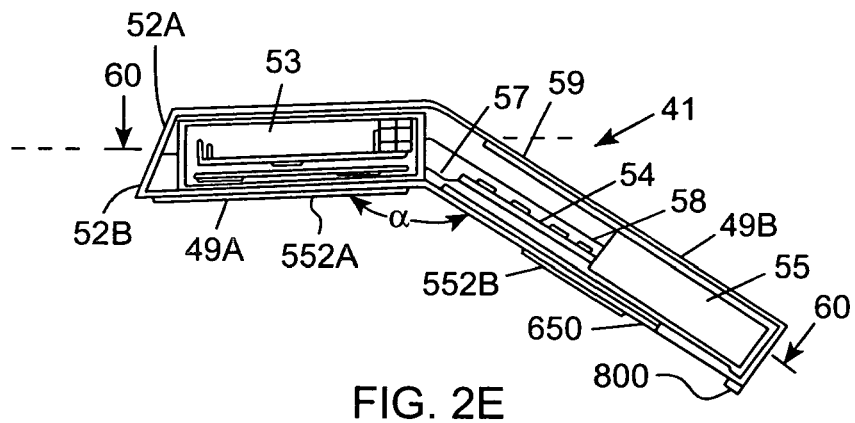
FIG. 2E is an elevated, cross-sectional side view taken along the longitudinal extent of the wireless automatically-activated bar code symbol reading device of FIGS. 2A and 2B, showing the various components contained therein.

Head portion support structure 51B is connected to base portion 51A, for receiving and supporting the head portion of bar code symbol reading device 41. Similarly, handle portion support structure 51C is connected to base portion 51A, for receiving and supporting the handle portion of the code symbol reading device. In order that the user's hand can completely grasp the handle portion of the hand-supportable bar code reading device, (i.e. prior to removing it off and away from the scanner support stand), finger-accommodating recess 51D is disposed between head and handle portion support structures 51B and 51C and base portion 51A of the support frame. In this way, finger-accommodating recess 51D is laterally accessible so that when the head and handle portions 49A and 49B are received within and supported by head portion support structure 51B and handle portion support structure 51C, respectively, the fingers of a user's hand can be easily inserted through finger accommodating recess 51D and completely encircle the handle portion of the hand-supportable device. sensor As shown in FIG. 2E, bar code symbol reading device 41 includes a mode-selector 800 (e.g. electronic of electrical/mechanical sensor) located on the end portion of the hand-supportable housing. When the housing is placed in its stand, the mode select sensor 800 automatically senses the stand (or countertop surface) and generates a data transmission control activation signal $A_4=1$, which overrides the data transmission activation switch 44 on the housing during the hands-free mode of operation when the bar code symbol reading device is picked up out of the housing, the mode-select sensor 800 generates $A_4=0$, which is overridden by the date transmission activation switch 44 in the hands-on mode of operation.

As illustrated in FIGS. 2A through 2D, the head portion of housing 49A has a light transmission aperture 50 formed in upper portion of the front panel 52A, to permit visible laser light to exit and enter the housing, as will be described in greater detail hereinafter. The lower portion of front panel 52B is optically opaque, as are all other surfaces of the hand supportable housing.

Figure 2F:
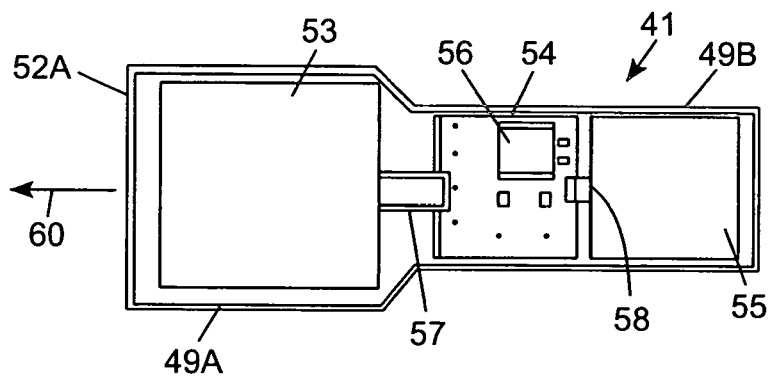
FIG. 2F is a cross-sectional plan view of the wireless automatically-activated bar code symbol reading device of FIGS. 2A and 2B taken along line 2F-2F of FIG. 2E, showing the various components contained therein.

As best shown in FIGS. 2E and 2F, an automatically-activated laser-scanning bar code symbol reading engine 53 is securely mounted within the head portion of hand-supportable housing 49A, while a printed circuit (PC) board 54 and a rechargeable battery supply unit 55 are mounted within the handle portion of the hand-supportable housing 49B. A data packet transmission circuit 56 is realized on PC board 54 in housing 49B and is operably connected to bar code symbol reading engine 53 contained therein by way of a first flexible wire harness 57. Electrical power is supplied from rechargeable battery 55 to the data packet transmission circuit 56 and the bar code symbol reading engine 53 by way of a second flexible wire harness 58. As shown, a transmitting antenna 59 is operably connected to the data packet transmission circuit 56 on PC board 54 and is mounted within hand-supportable housing portion 49B for transmission of a data packet modulated RF carrier signal to the base unit associated with the wireless automatic bar code symbol reading system.

Figure 5A:
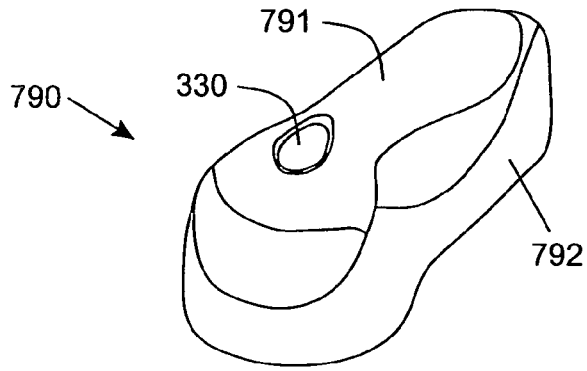
FIGS. 5A through 5D are perspective views of the tenth embodiment of the wireless automatic wireless laser scanning bar code symbol reading system of the present invention employing a 2-way RF-based data communication link between its cradle-providing base station and its hand-supportable code symbol reading device employing a manually-operated data transmission activation switch, wherein the operation of the data transmission activation switch is controlled by the automatic detection that the hand-supportable wireless device is located within the RF communication range of the RF-based data communication link by way of detecting the strength of "heartbeat" signals transmitted from the base station to the wireless hand-supportable device.
Figure 5B:
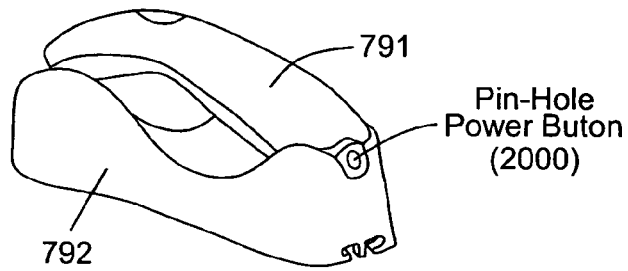
Figure 5C:
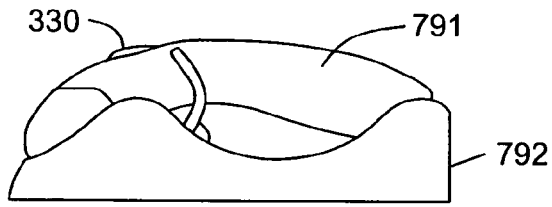
Figure 5D:
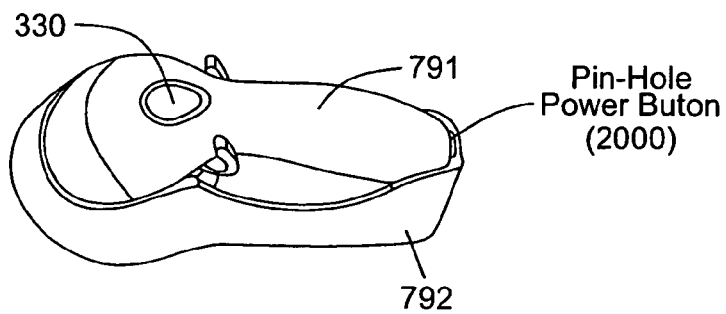
Figure 5E:
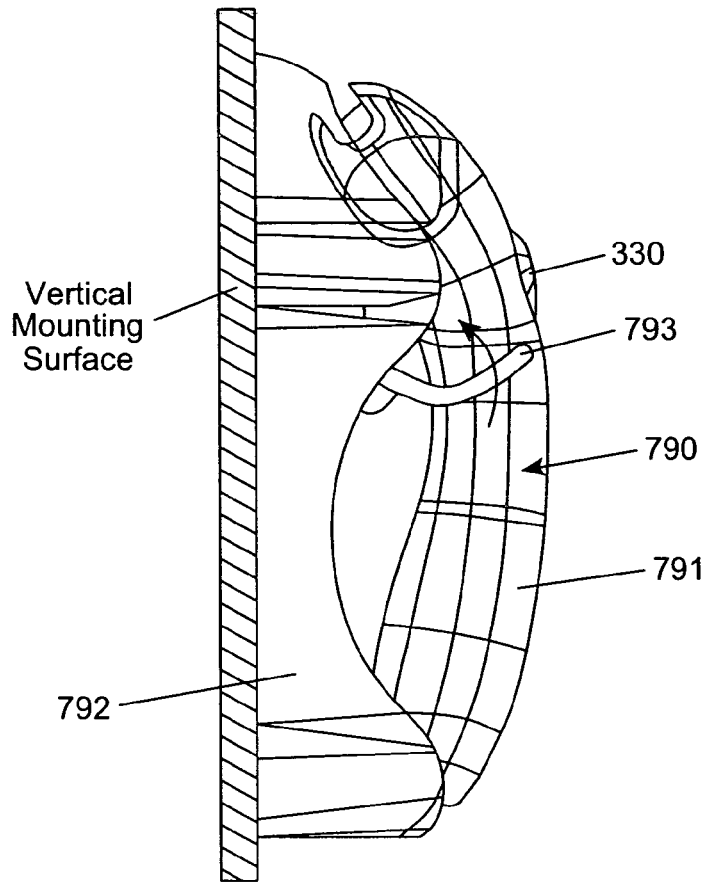
FIGS. 5E through 5J show in greater detail the retractable/protractable support hook integrated within the cradle-providing base station for (i) supporting the automatic hand-supportable wireless laser scanning bar code symbol reading device in a vertical position when the hinged support hook is arranged in its protracted configuration as shown in FIGS. 5E1 and 5F, and (ii) supporting the automatic hand-supportable wireless laser scanning bar code symbol reading device in a horizontal position when the hinged support hook is arranged in its retracted configuration as shown in FIGS. 5G and 5H.
Figure 5F:
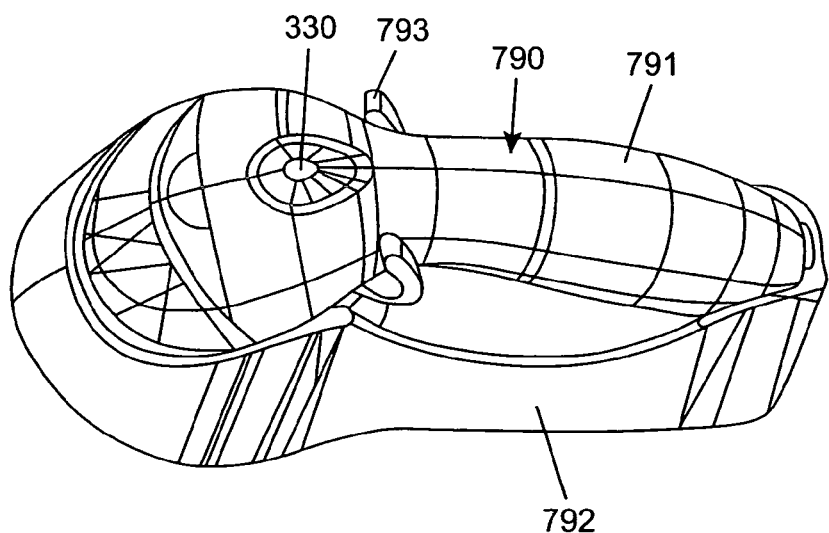
Figure 5G:
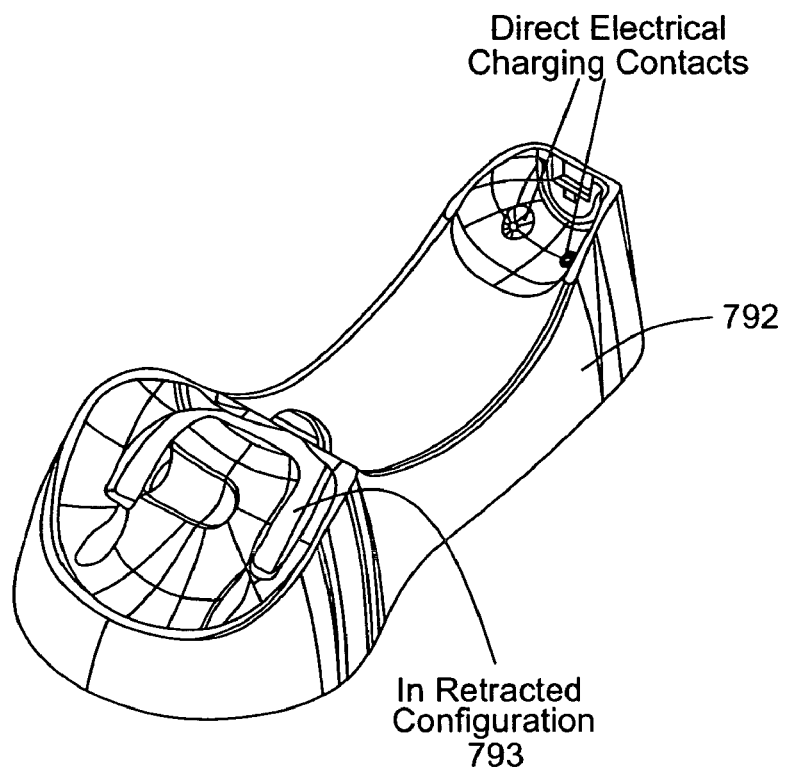
Figure 5H:
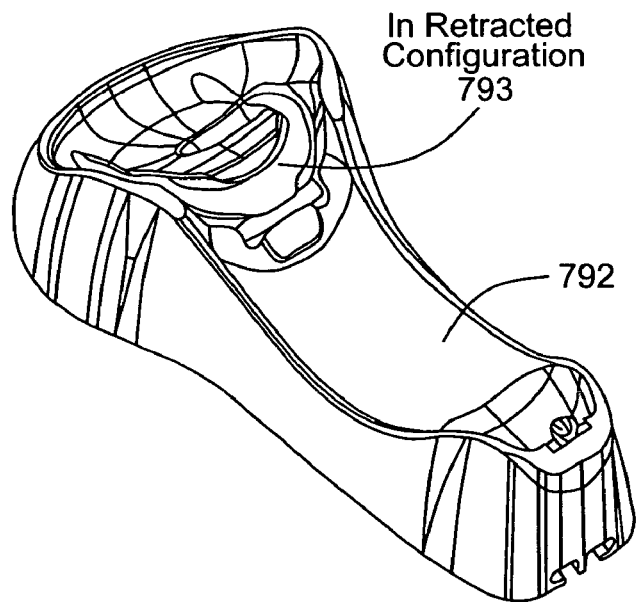
Figure 5I:
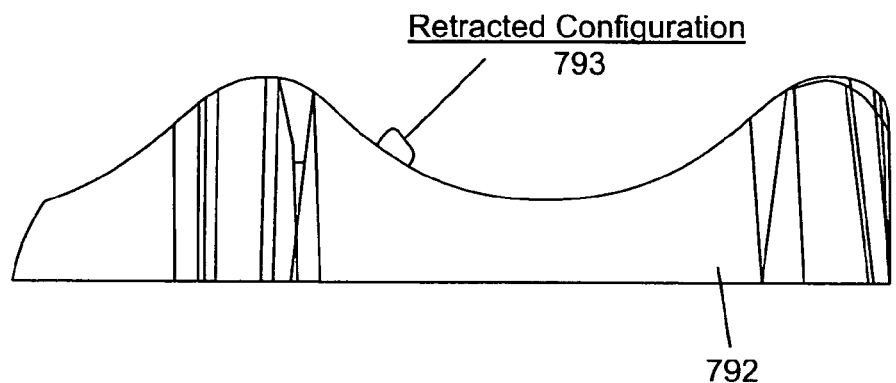
Figure 5J:
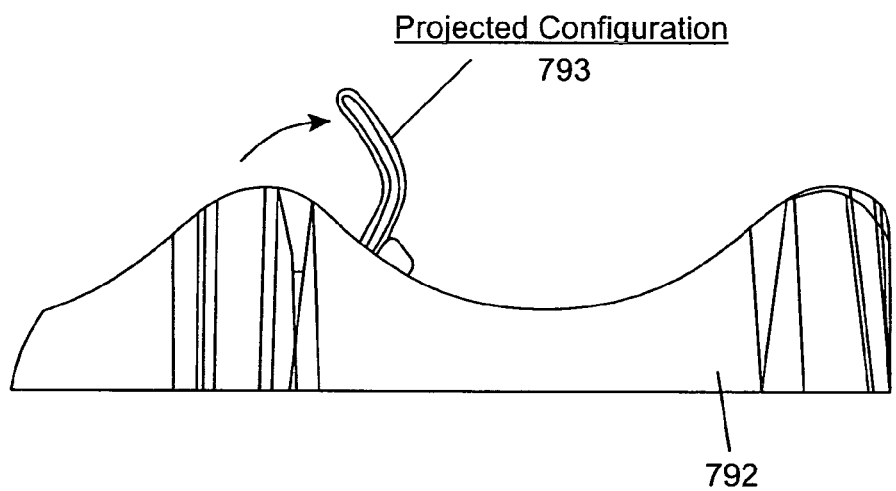
Figure 6A:
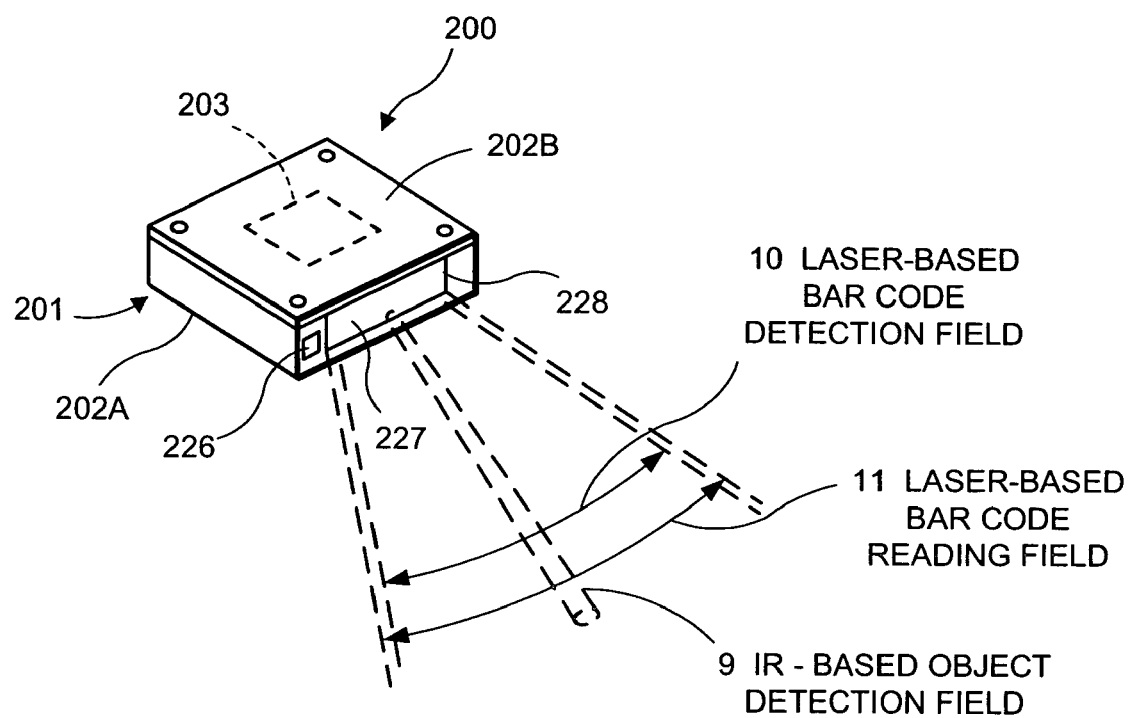
FIG. 6A is a perspective view of a first illustrative embodiment of the automatically-activated laser scanning bar code symbol reading engine of the present invention shown completely assembled, adapted for incorporation into any one of the bar code symbol reading devices of the present invention, and programmed for automatically reading bar code symbols using its IR-based object detection field and its 1-D laser-based scanning (i.e. bar code detection and reading) field.
Figure 7E:
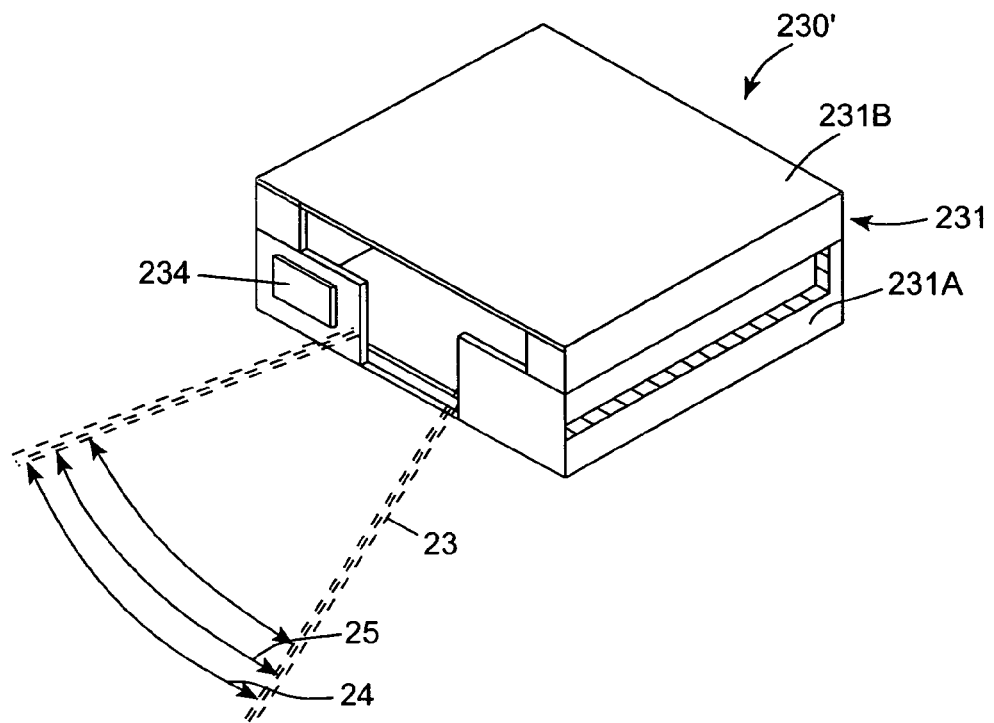
FIG. 7E is a perspective view of a fifth illustrative embodiment of the automatically-activated laser scanning bar code symbol reading engine of the present invention shown completely assembled, adapted for incorporation into any one of the bar code symbol reading devices of the present invention, and programmed for automatically reading bar code symbols using its laser-based object detection field and its 2-D laser-based scanning (i.e. bar code detecting and reading) field in an automatic manner.
Figure 7F:
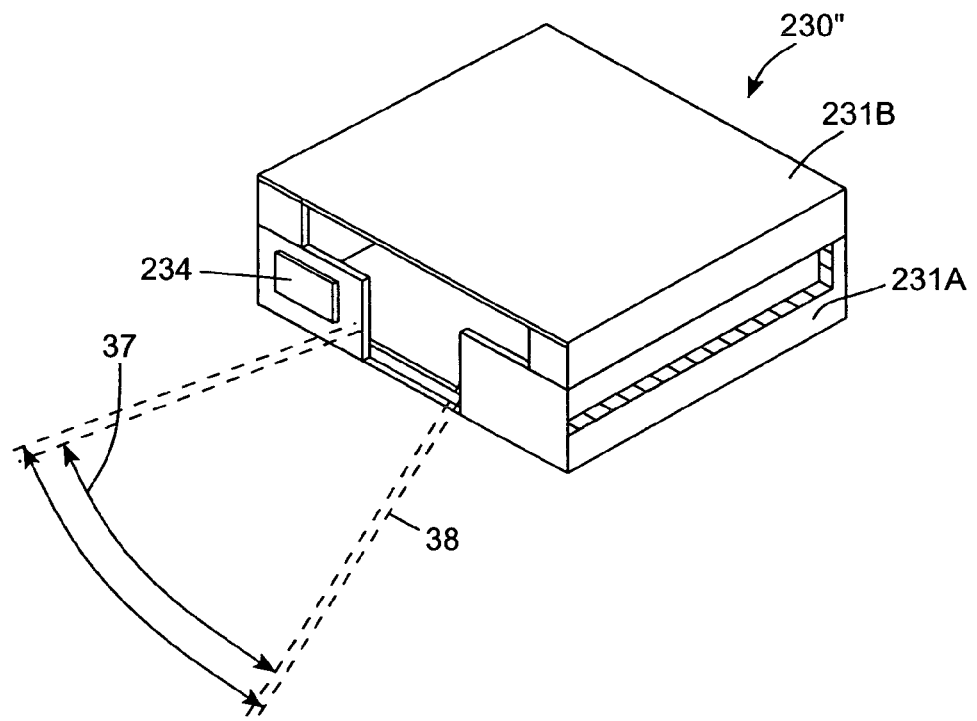
FIG. 7F is a perspective view of a sixth illustrative embodiment of the automatically-activated laser scanning bar code symbol reading engine of the present invention, shown completely assembled, adapted for incorporation into any one of the bar code symbol reading devices of the present invention, and programmed for automatically reading bar code symbols using its 2-D laser-based scanning (i.e. bar code detecting and scanning) field, without automatic object detection.
Figure 8A:
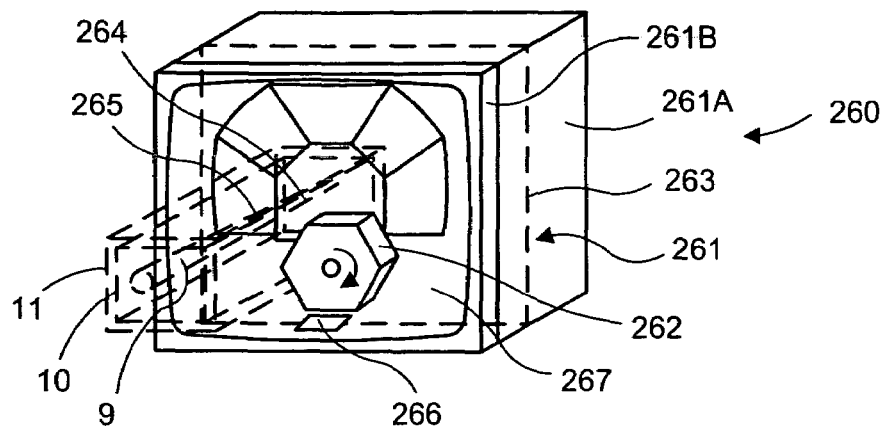
FIG. 8A is a perspective view of a seventh illustrative embodiment of the automatically-activated laser scanning bar code symbol reading engine of the present invention shown completely assembled and adapted for incorporation into any one of the wireless bar code symbol reading devices of the present invention, and programmed for automatically reading bar code symbols using its IR-based object detection field, and its 2-D omnidirectional-type laser scanning (i.e. bar code detecting and reading) field in an automatic manner.

In general, any of the bar code symbol reading engines disclosed in FIGS. 6A, 7A and 8A can be incorporated within the hand-supportable housing of the wireless bar code symbol reading system 40 shown in FIGS. 2A through 2H, with little or no modifications to the form factor thereof. When incorporated into the hand-supportable housing 49 as shown, each of these laser scanning engines, indicated by reference numeral 53 in FIGS. 2A through 2H, will enable the automatic generation of: an IR-based object detection field 9 projected along the longitudinal scanning axis 60 of the device housing in response to the powering-up of the engine; a laser-based bar code symbol detection field 10, in response to automatic detection of objects within the IR-based object detection field 9; and a laser-based bar code symbol reading field 11 in response to automatic detection of bar code symbols within the laser-based bar code symbol detection field 10 consistent with the structure and functions depicted in the schematic diagram of FIG. 1B. During system operations, the system states are visually indicated by the state indicator light strip 61 mounted on the exterior of the scanner housing, as shown in FIGS. 2A and 2H. As will be described in greater detail hereinafter, laser scanning bar code symbol reading engine 53 has a similar system architecture schematically illustrated in FIGS. 10A1 through 10O. The system control process underlying this generalized system design is illustrated in the flow chart set forth in FIGS. 14A1 through 14C4. The states of operation of this generalized system design are described in the state transition diagram of FIG. 15.

Figure 2I:
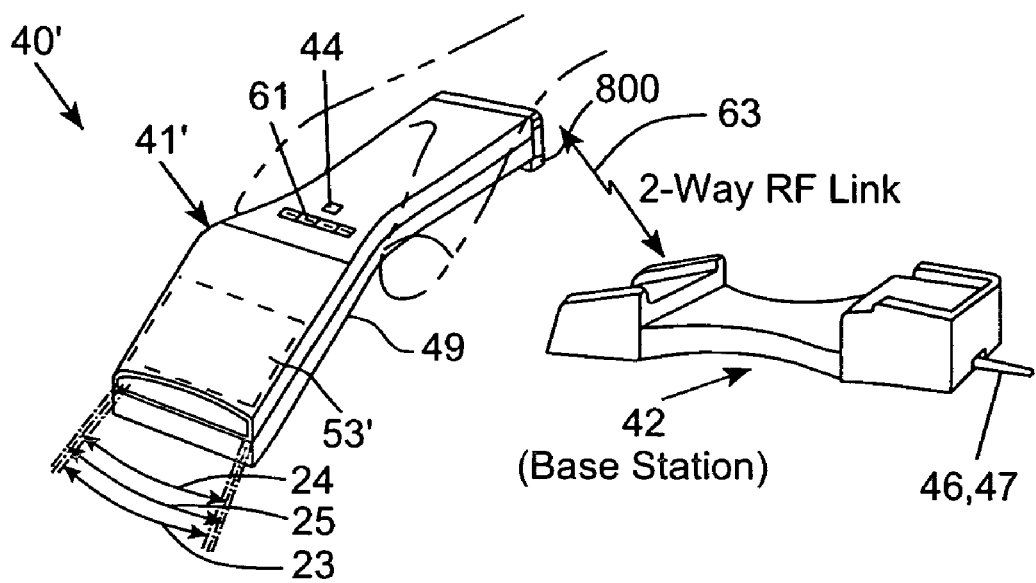
FIG. 2I is a perspective view of the second illustrative embodiment of the wireless automatically-activated bar code symbol reading device of the present invention, wherein a laser-based object detection field and laser-based bar code symbol detection and reading field are provided for automatically detecting objects and reading bar code symbols, respectively while the device is operated in its hands-on and hands-free modes of operation.

Second Illustrative Embodiment of Wireless Automatically-Activated Bar Code Symbol Reading System of the Present Invention In FIG. 2I, the second illustrative embodiment of the wireless automatically-activated bar code symbol reading system hereof 40' is shown comprising a hand-supportable automatically-activated bar code symbol reading device 41' and a base unit 42 in communication therewith achieved using a one-way or two way data communication link 63. As shown, this automatically-activated bar code symbol reading system 40' is similar to bar code symbol reading system 40 shown in FIGS. 2A through 2H, in all but a few respects. In particular, the bar code symbol reading device of FIG. 2I may incorporate within its hand-supportable housing 49, any of the laser scanning engines disclosed in FIGS. 6C, 7E and 8B, with little or no modifications to the form factor thereof. When incorporated into hand-supportable housing 49 as shown in FIG. 2I, each of these laser scanning engines indicated by reference numeral 53', will enable automatic generation of: a low-power laser-based object detection field 23 in response to the powering-up of the laser scanning engine; a laser-based bar code symbol detection field 24 generated in response to automatic object detection within the laser-based object detection field 23; and a laser-based bar code symbol reading field 25 generated in response to automatic bar code symbol detection within the laser-based bar code symbol detection field 24 consistent with the structure and functions depicted in the schematic diagram of FIG. 1B. Each of these laser scanning bar code symbol reading engines have a general system architecture as described in WO Publication No WO 00/33239 published Jun. 8, 2000, with primary differences relating to the use of the laser source to realize a laser-based object detection field, as well as bar code symbol detection and reading fields.

Figure 2J:
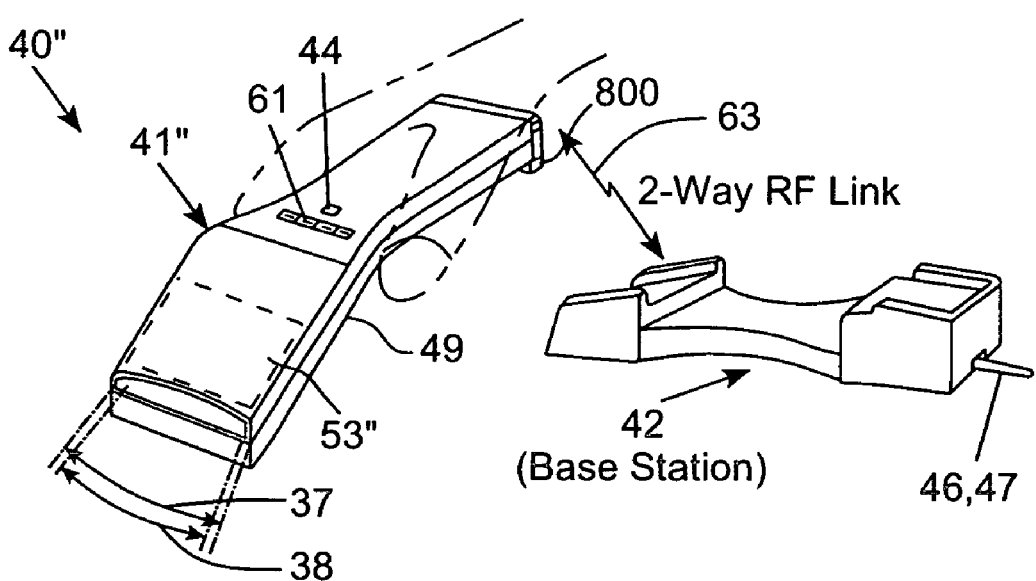
FIG. 2J is a perspective view of the third illustrative embodiment of the wireless automatically-activated bar code symbol reading device of the present invention, wherein a laser-based bar code detection field and laser-based bar code symbol detection and reading field are provided for automatically detecting and reading bar code symbols while the device is operated in its hands-on and hands-free modes of operation.

Third Illustrative Embodiment of Wireless Automatically-Activated Bar Code Symbol Reading System of the Present Invention In FIG. 2J, the third illustrative embodiment of the wireless automatically-activated bar code symbol reading system hereof 40" is shown comprising a hand-supportable automatically-activated bar code symbol reading device 41" and a base unit in communication therewith achieved using two way RF-based data communication link 63 using Bluetooth® RF transceiver chipset technology. As shown, this automatically-activated bar code symbol reading system 40" is similar to the bar code symbol reading system 40 shown in FIGS. 2A through 2H in WO Publication No. WO 00/33239, in all but a few respects. In particular, any of the laser scanning engines disclosed in FIGS. 6D, 7F and 8F can be incorporated into the bar code symbol reading device of FIG. 2J, with little or no modifications to the form factor thereof. Each of these laser scanning bar code symbol reading engines have a general system architecture as described in WO Publication No. WO 00/33239, with primary differences relating to the use of the laser source to realize bar code symbol detection and reading fields, while no object detection field of any sort is provided therein.

When incorporated into hand-supportable housing 49, each of these laser scanning engines indicated by 53" in FIG. 2J will enable automatic generation of: a laser-based bar code symbol detection field 37 in response to the powering-up of the laser scanning engine, and a laser-based bar code symbol reading field 38 in response to automatic bar code symbol detection within the laser-based bar code symbol detection field 37, consistent with the structures and functions depicted in the schematic diagram of FIG. 1C. As will be described in greater detail hereinafter, each of these laser scanning bar code symbol reading engines have the same general system architecture schematically illustrated in FIGS. 25A through 26 in WO Publication No. WO 00/33239. The system control process underlying this generalized system design is illustrated in the flow chart set forth in FIGS. 27A through 27C of WO Publication No. WO 00/33239. The states of operation of this generalized system design are described in the state transition diagram of FIG. 28 in WO Publication No. WO 00/33239.

Figure 3A:
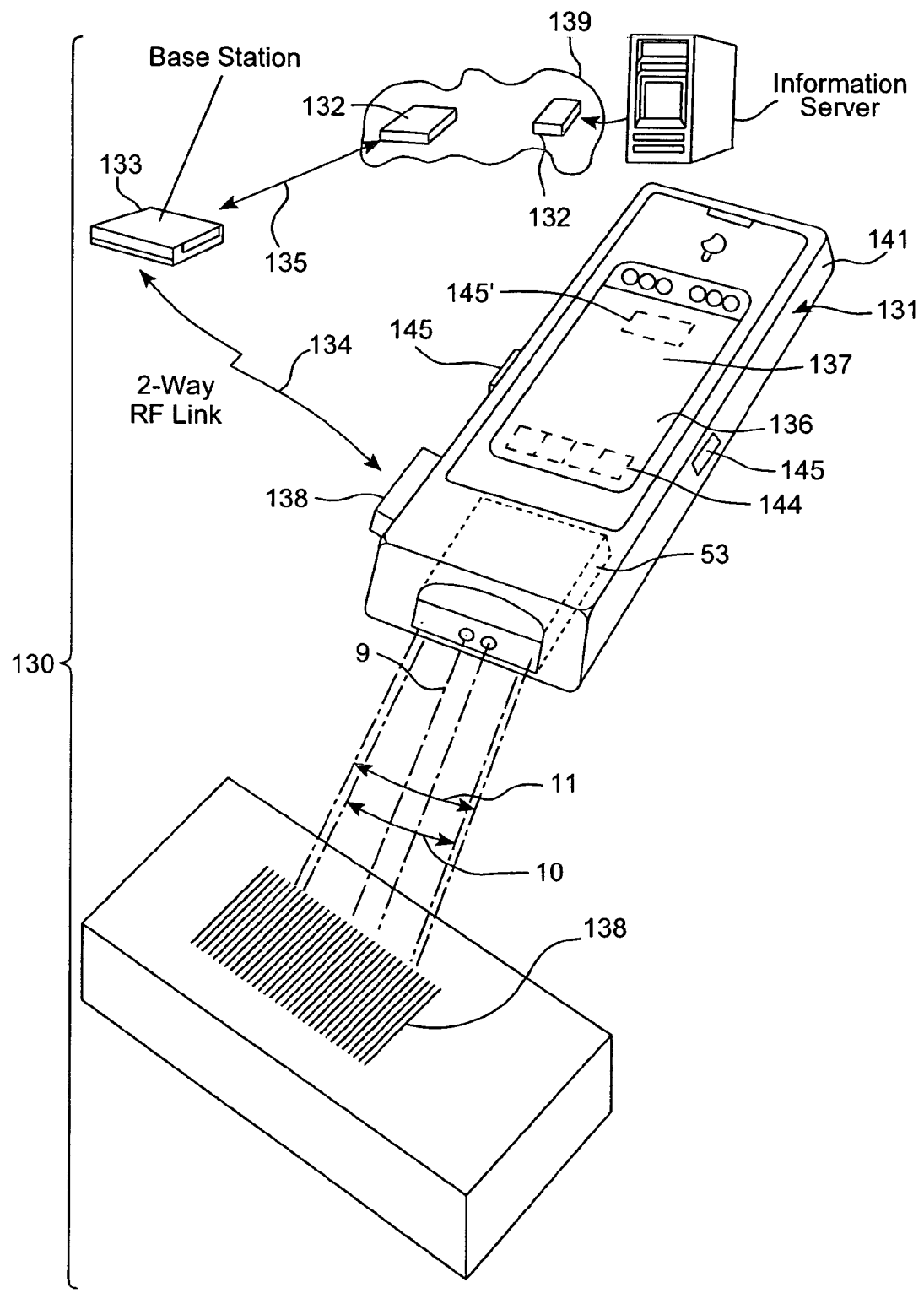
FIG. 3A is a perspective view of the fourth illustrative embodiment of the wireless automatically-activated bar code symbol reading device of the present invention, comprising an integrated WWW browser program for client-side HTTP support, a touch-screen LCD panel for manual data entry and visual data display, an integrated laser scanning bar code symbol reading engine for producing an IR-based object detection field and 1-D or 2-D laser-based bar code symbol detection and reading fields, and a wireless communication link established with an Internet Service Provider (ISP) connected with the Internet, for mobile usage within diverse application environments.
Figure 3B:
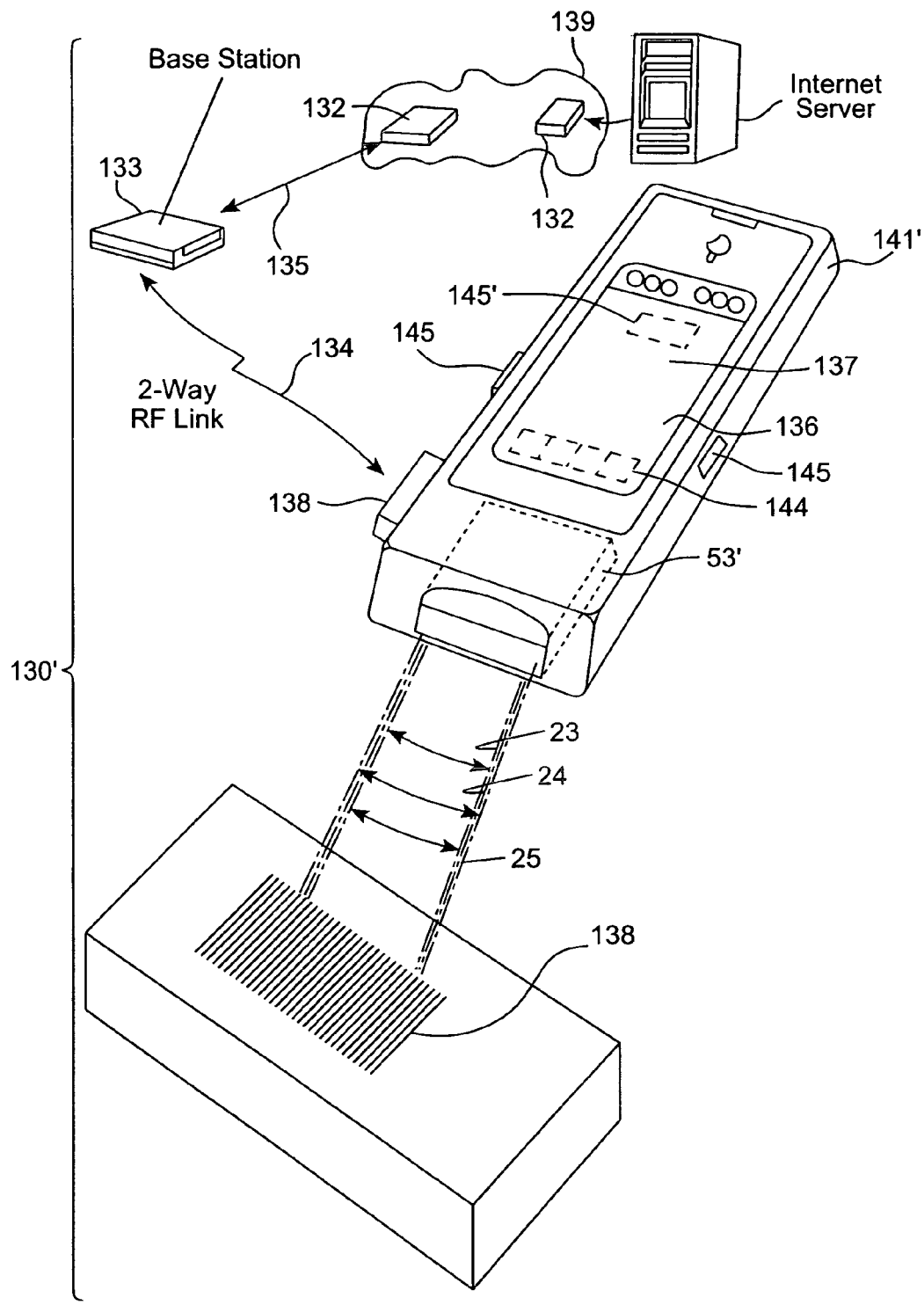
FIG. 3B is a perspective view of the fifth illustrative embodiment of the wireless automatically-activated bar code symbol reading device of the present invention, comprising, an r integrated WWW browser program for client-side HTTP support, a touch-screen LCD panel for manual data entry and visual data display, an integrated laser scanning bar code symbol reading engine for producing a laser-based object detection field and 1 or 2-D laser-based bar code symbol detection and reading fields, and a wireless communication link established with an Internet Service Provider (ISP) connected with the Internet, for mobile usage within diverse application environments.
Figure 3C:
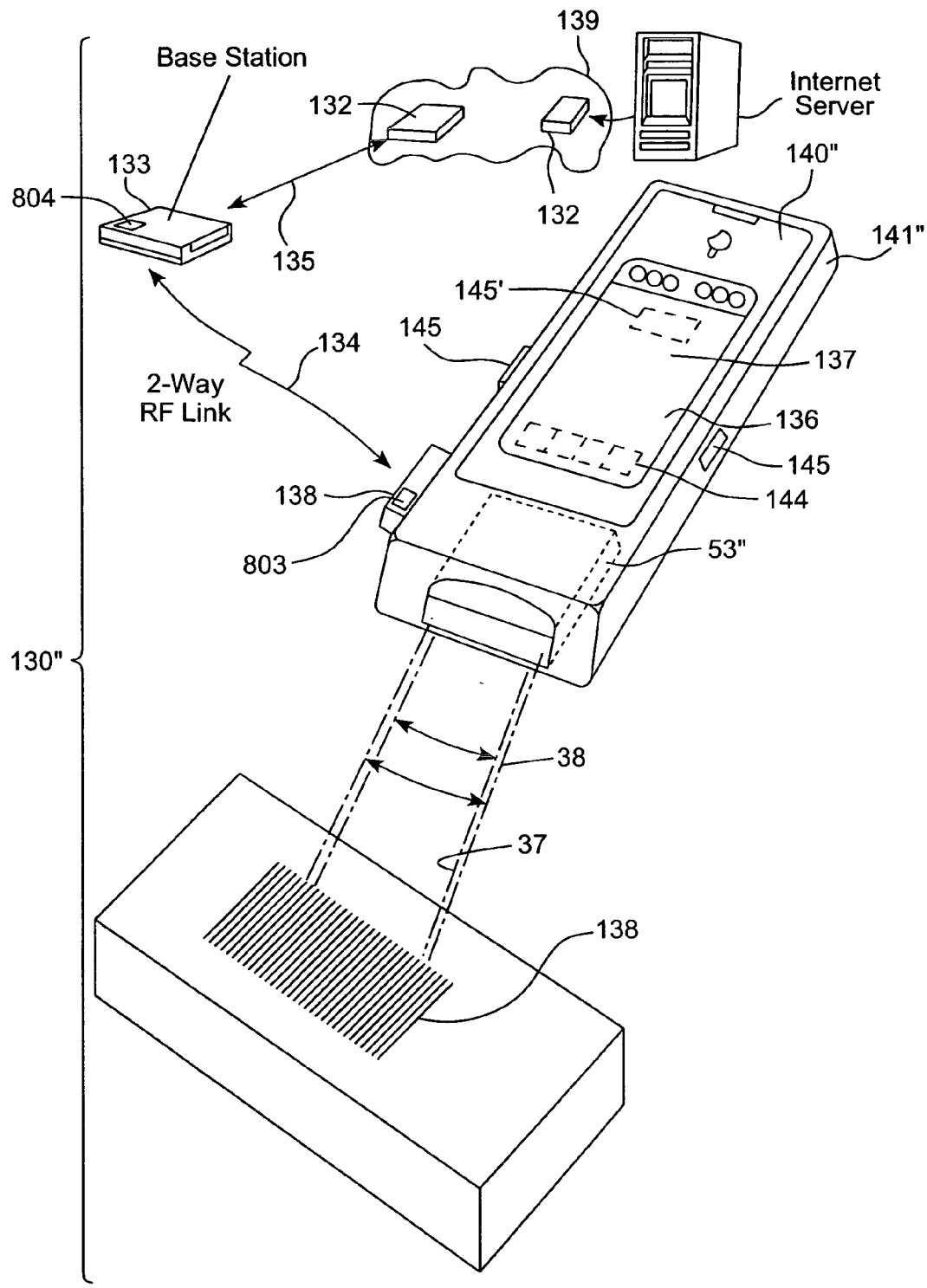
FIG. 3C is a perspective view of the sixth illustrative embodiment of the wireless automatically-activated bar code symbol reading device of the present invention, comprising an integrated WWW browser program for client-side HTTP support, a touch-screen LCD panel for manual data entry and visual data display, an integrated laser scanning bar code symbol reading engine for producing a laser-based bar code detection field and 1 or 2-D laser-based bar code symbol detection and reading fields, and a wireless communication link established with an Internet Service Provider (ISP) connected with the Internet, for mobile usage within diverse application environments.

Fourth Illustrative Embodiment of Wireless Automatically-Activated Bar Code Symbol Reading System of the Present Invention In FIGS. 3A to 3C, the fourth illustrative embodiment of the wireless bar code symbol reading system hereof 130 is shown in the form of a hand-held integrated bar code symbol scanning terminal ("Integrated Scanning Terminal") 131 embodying any one or more of the generalized Internet access methods described in U.S. Pat. Nos. 6,076,733, 5,922,752, and 5,905,248, each being incorporated herein by reference. As shown in FIG. 6A, the Integrated Scanning Terminal 131 is connected to an ISP 132 by way of a radio-based station 133 and wireless links 134 and 135. The hand-held Internet Scanning Terminal 131 has an integrated GUI-based web browser program, display panel 136, touch-screen type keypad 137, and programmed automatic laser scanning bar code symbol reading engine 53. The function of bar code symbol reading engine 53 is to read a 1-D or 2-D bar code symbol 138 that is encoded with information of a specified data type. Such information can represent: (i) the URL of a Web page to be accessed by the Terminal 131; (ii) the identity of a product or object; or (iii) any type of information that serves to identify an object, specify a process, or specify the location of an object, on an information network or in a system.

In the illustrative embodiment, the Internet Scanning Terminal 131 is realized as a transportable computer, such as the Palm Pilot® portable data terminal from Palm, Inc., or like device. In the illustrative embodiment, the Internet-Scanning Terminal is provided with Internet Access Software which supports the TCP/IP networking protocol, as well as HTTP within the operating system. The Terminal 131 is also equipped with a PCMCIA-based modem card 138 having a Bluetooth® RF transceiver chipset, to be described in greater detail hereinafter, for establishing (as illustrated in FIGS. 13A1 and 13A2) a 2-way RF-based wireless digital communication link with base station 133 also having a Bluetooth® RF transceiver chipset. While it is understood that, in some instances, it may be desired to connect a pen or wand device to the serial port of the Terminal 131 to provide bar code symbol reading capabilities thereto, it is preferred that automatic laser scanning engine 53 be interfaced with the serial communications port of the Terminal 131 so as to realize the Internet-based Transaction-Enabling System of the illustrative embodiment hereof.

As shown in FIG. 3A, the entire Terminal 131, bar code symbol reading engine 53 (or other scanning engine) and auxiliary battery supply are intensified and completely housed within a rubberized shock-proof housing 141, in order to provide a hand-supportable unitary device. Once the object (e.g. transaction card) 142 is detected by the object detection field 9, a laser beam is automatically projected within the bar code symbol detection field 10, and swept across the bar code symbol 138 present therewithin, and upon detection, the laser beam is automatically swept across the bar code symbol reading field 11 in order to collect scan data therefrom, and decode the same and produce symbol character data representative of the read bar code symbol. Thereupon, the Internet Scanning Terminal 131 automatically produces a bar code symbol read indication signal (e.g. in the form of a graphical icon or message 144 on the LCD panel 136) for the user to perceive. If and when the user manually-actuates in a timely manner the data transmission activation switch 145 provided on the side of the rubber housing 141, or emulated on the display surface of the LCD panel 136 in the form of a graphical icon 145', then the Internet Scanning Terminal 131 automatically transmits subsequently produced symbol character data for the same bar code symbol to the intended host system (e.g. located at an IP address on the Internet 139), or to on-board data storage memory located within the Internet Scanning Terminal, or to another storage device in communication with the terminal 131.

As shown in FIG. 3A, the bar code symbol reading engines shown in FIGS. 6A, 7A and 8A, for example, can be easily installed within the head portion of the bar code symbol reading device 130 without requiring any modification thereto. When incorporated into hand-supportable housing 141 as shown, each of these laser scanning engines indicated by reference to numeral 53 in FIG. 3A, will enable the automatic generation of: an IR-based object detection field 9 for automatically detecting objects presented therewithin; a laser-based bar code symbol detection field 10 in response to automatic detection of objects within the IR-based object detection field 9; and a laser-based bar code symbol reading field 11 in response to automatic detection of bar code symbols within the laser-based bar code symbol detection field 10, consistent with the structure and functions depicted in the schematic diagram of FIG. 1A. As will be described in greater detail hereinafter, each of these laser scanning bar code symbol reading engines have the same general system architecture schematically illustrated in FIGS. 10A1 through 12. The system control process underlying this generalized system design is illustrated in the flow chart set forth in FIGS. 14A1 through 14C4. The states of operation of this generalized system design are described in the state transition diagram of FIG. 15.

Fifth Illustrative Embodiment of Wireless Automatically-Activated Bar Code Symbol Reading System of the Present Invention In FIG. 3B, the fifth illustrative embodiment of the wireless automatically-activated bar code symbol reading system hereof 130' is shown comprising: a hand-supportable laser scanning bar code symbol reading device 140' adapted for support within a user's hand; and a base station 133 in data communication with the hand-supportable bar code reading device 140' using the two-way RF-based data communication link 134 of the present invention (illustrated in FIGS. 13A1 and 13A2), and in communication with the Internet Information Server maintained by the ISP 132 using a two-way data communication link 135. As shown, this automatically-activated bar code symbol reading system 130' is similar to the bar code symbol reading system 130 shown in FIG. 3A, in all but a few respects. The bar code symbol reading device of FIG. 3B may incorporate within its hand-supportable housing 141', any of the laser scanning engines disclosed in FIGS. 6C, 7E and 8C, with little or no modifications to the form factor thereof.

Sixth Illustrative Embodiment of Wireless Automatically-Activated Bar Code Symbol Reading System of the Present Invention In FIG. 3C, the sixth illustrative embodiment of the wireless automatically-activated bar code symbol reading system hereof 130" is shown comprising: a hand-supportable laser scanning bar code symbol reading device 140" adapted for support within a user's hand; and a base station 133 in data communication with the hand-supportable bar code reading device 140" using a two-way data communication link 134 of the type disclosed in U.S. Pat. Nos. 4,460,120; and 5,321,246, incorporated herein by reference, and in communication with the Internet Information Server maintained by the ISP 132 using a two-way RF-based data communication link 135. As shown, this automatically-activated bar code symbol reading system is similar to the bar code symbol reading system 130 shown in FIG. 3A, in all but a few ways. The bar code symbol reading device of FIG. 3C can incorporate within its hand-supportable housing, any of the laser scanning engines disclosed in FIGS. 6D, 7F, and 8C, with little or no modification to the form factor thereof.

Figure 4A:
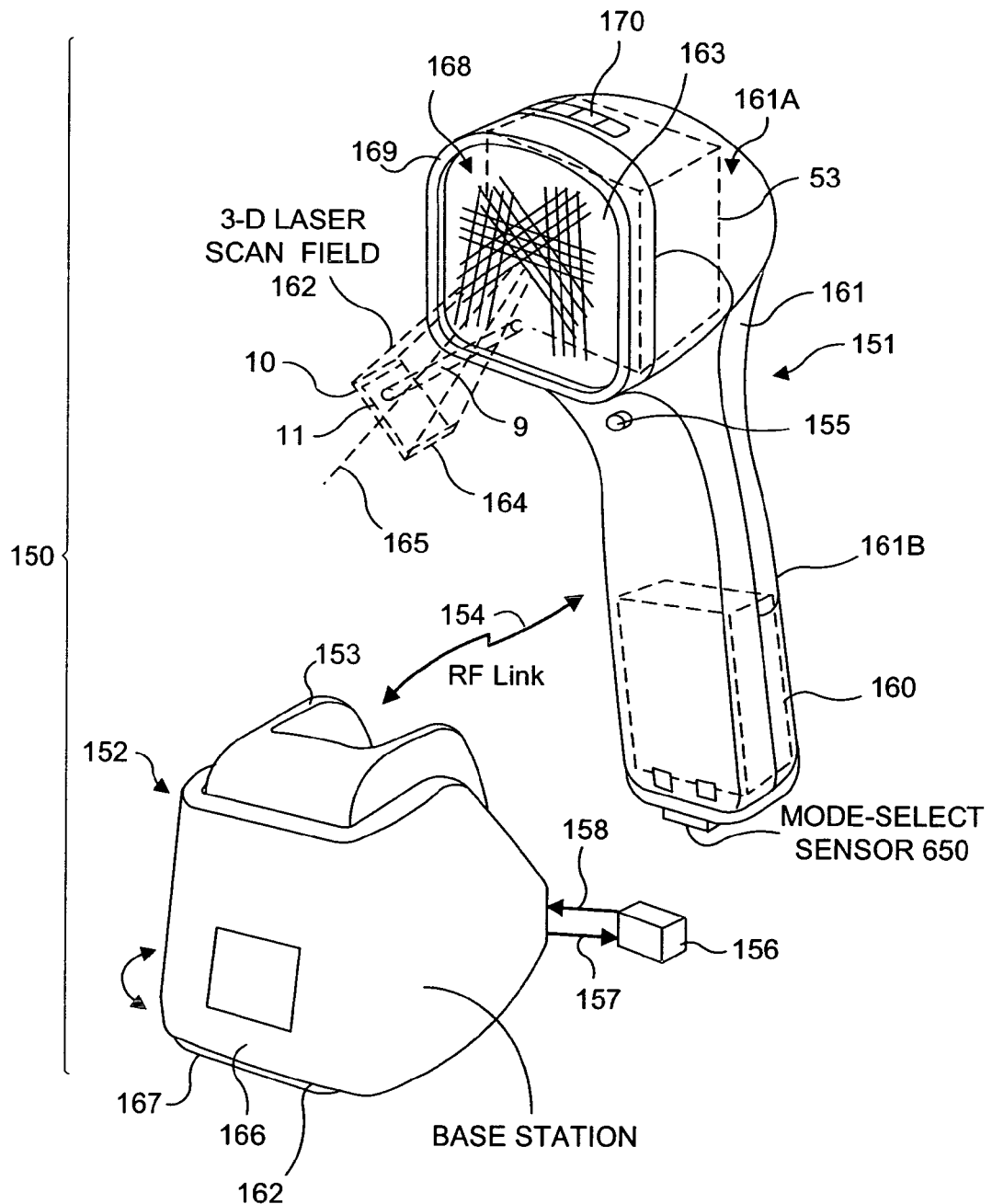
FIG. 4A is a perspective view of the seventh illustrative embodiment of the wireless automatically-activatable bar code symbol reading device of the present invention, comprising an integrated laser scanning bar code symbol reading engine for producing an IR-based object detection field and a laser-based omni-directional bar code symbol reading field, and a wireless communication link established with its base station adapted for battery recharging and hands-free mode of operation within diverse application environments.

Seventh Illustrative Embodiment of Wireless Automatically-Activated Bar Code Symbol Reading System of the Present Invention In FIG. 4A, the seventh illustrative embodiment of the wireless automatically-activated omni-directional bar code symbol reading system hereof 150 is shown comprising: an automatically-activated portable bar code symbol reading device 151 operably associated with a base unit 152 having a scanner support stand 153 pivotally connected thereto, for releasably supporting the automatic bar code symbol reading device 151 at any one of a number of positions above of a counter surface at a Point of Sale (POS) station. In the preferred embodiment, the bar code symbol reading device 151 is operably connected with its the base station unit 152 by way of a one way electromagnetic link 154 between bar code symbol reading device 151 and its mated base unit 152. After the successful reading of each bar code symbol by the bar code symbol reading device and the timely activation of data transmission activation switch 155, subsequently produced symbol character data (from the same bar code symbol) is transmitted to the basest station unit over the 2-way RF link (154) and thence to the host system (e.g. electronic cash register system, data collection device, etc.) 156 by way of a flexible multi-wire communications cable 157 extending from the base unit 152 and plugged directly into the data-input communications port of the host computer system 156.

In the illustrative embodiment, electrical power from a low voltage direct current (DC) power supply (not shown) is provided to the base unit by way of a flexible power cable 159. Notably, this DC power supply can be realized in host computer system 156 or as a separate DC power supply adapter pluggable into a conventional 3-prong electrical socket. In other embodiments of the present invention, cables 157 and 158 can be integrated to provide a single flexible, multi-wire cable for transmission of power to the base unit and data to the host system. As will be described in greater detail hereinafter, a rechargeable battery power supply unit 160 is contained primarily within the handle portion of the bar code symbol reading device 151 in order to energize the electrical and electro-optical components within the device.

As illustrated in FIG. 4A, scanner support stand 153 is particularly adapted for receiving and supporting portable bar code symbol reading device 151 without user support, thus providing a stationary, automatic hands-free mode of operation. In general, portable bar code symbol reading device 151 includes an ultra-light weight hand-supportable housing 161 having a head portion 161A and a contoured handle portion 161B. As will be described in greater detail hereinafter, head portion 161A encloses a laser scanning bar code symbol reading engine 53 capable of producing a highly collimated scanning pattern 162 through light transmission window 168 for the purpose of scanning bar code symbols on objects within a narrowly confined-scanning (i.e. 3-D scanning field) volume 164, while preventing unintentional scanning of bar code symbols on objects located outside thereof at point of sale (POS) stations.

Preferably, the stand portion 153 of the base unit 152 is pivotally supported with respect to the base portion 162 by way of pivot pins mounted within the base portion. In order to releasably hold the stand portion of the base unit relative to the base portion thereof in any one of a number of provided scanning positions, a releasable stand-locking mechanism is provided within the base portion. Preferably, pivot is used to pivotally connect the upper and lower sections 166 and 167 together for easy rotation of the base unit relative to the support surface.

As illustrated in FIG. 4A, the head portion 161A of the hand-supportable housing has a light transmission window 168 mounted over the entire light transmission aperture 163. A rubber bumper 169 protects the edge of the housing when dropped or set down. Also, a set of color-coded state indicator lights 170 are mounted on the head portion of the device housing 161A, for visually displaying the particular state in which the system resides at any instant of time. Notably, the color-coding scheme shown in FIG. 2C can be used. In general, any of the laser scanning engines disclosed in FIGS. 6A, 7A and 8A can be incorporated within the hand-supportable housing of the bar code symbol reading system shown in FIG. 4A, with little or no modifications to the form factor thereof.

Figure 4B:
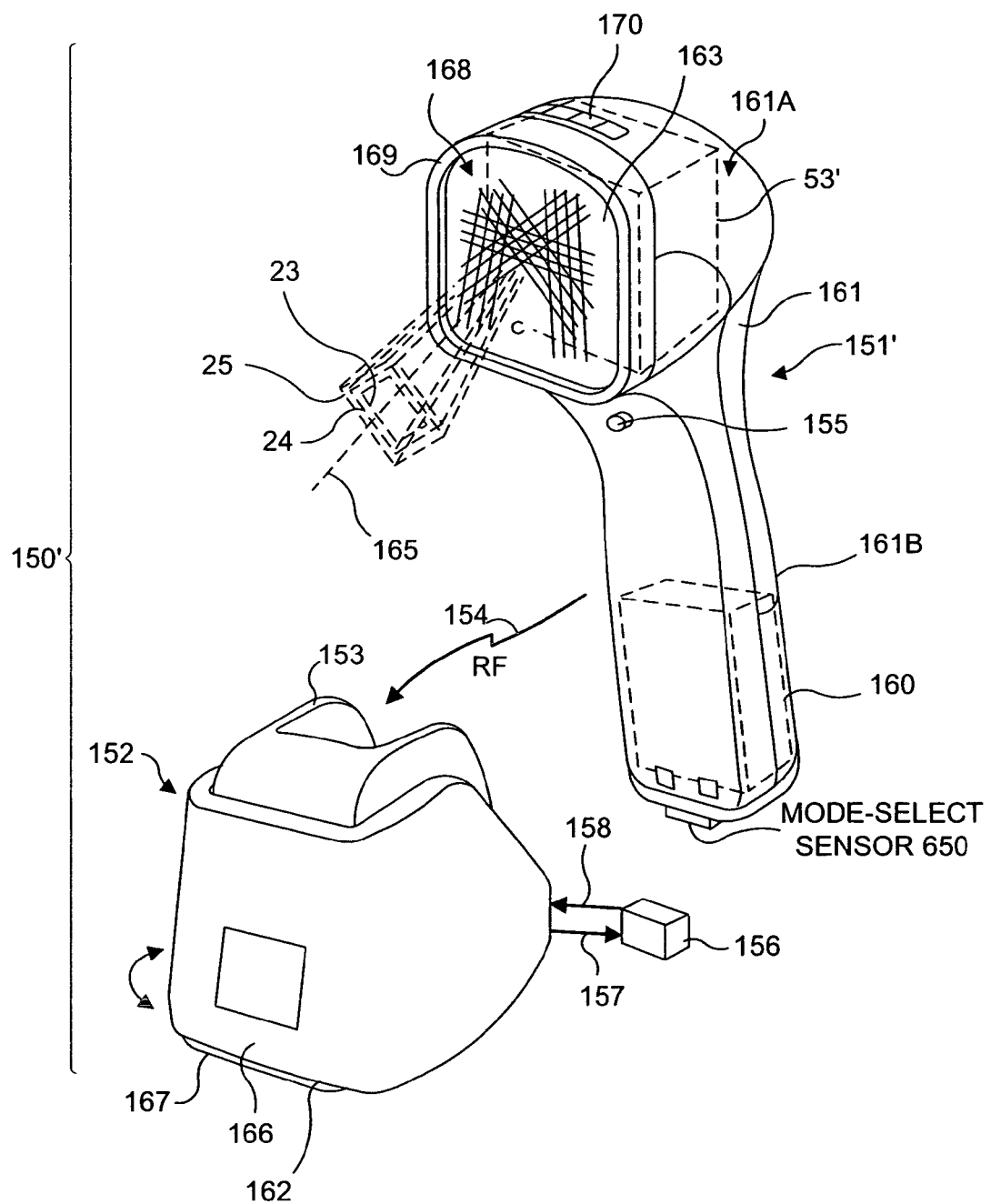
FIG. 4B is a perspective view of the eighth illustrative embodiment of the wireless automatically-activatable bar code symbol reading device of the present invention, comprising an integrated laser scanning engine for producing a laser-based object detection field and a laser-based omni-directional laser scanning field, and a wireless communication link established with its base station adapted for battery recharging and hands-free mode of operation within diverse application environments.

Eighth Illustrative Embodiment of Wireless Automatically-Activated Bar Code Symbol Reading System of the Present Invention In FIG. 4B, the eighth illustrative embodiment of the wireless automatically-activated omni-directional bar code symbol reading system hereof 150' is shown comprising: a hand-supportable laser scanning bar code symbol reading device 151' adapted for support within a user's hand; and a base station 152 in data communication with the hand-supportable bar code reading device 151' using a two-way RF-based data communication link 154 as illustrated in FIGS. 13A1 and 13A2. As shown, this automatically-activated bar code symbol reading system 150' is similar to the bar code symbol reading system 150 shown in FIG. 3A, in all but a few respects. In general, any of the laser scanning engines disclosed in FIGS. 6C, 7E, and 8B can be installed directly within the head portion of the bar code symbol reading device shown in FIG. 4B with little or no modification to the form factor thereto.

Figure 4C:
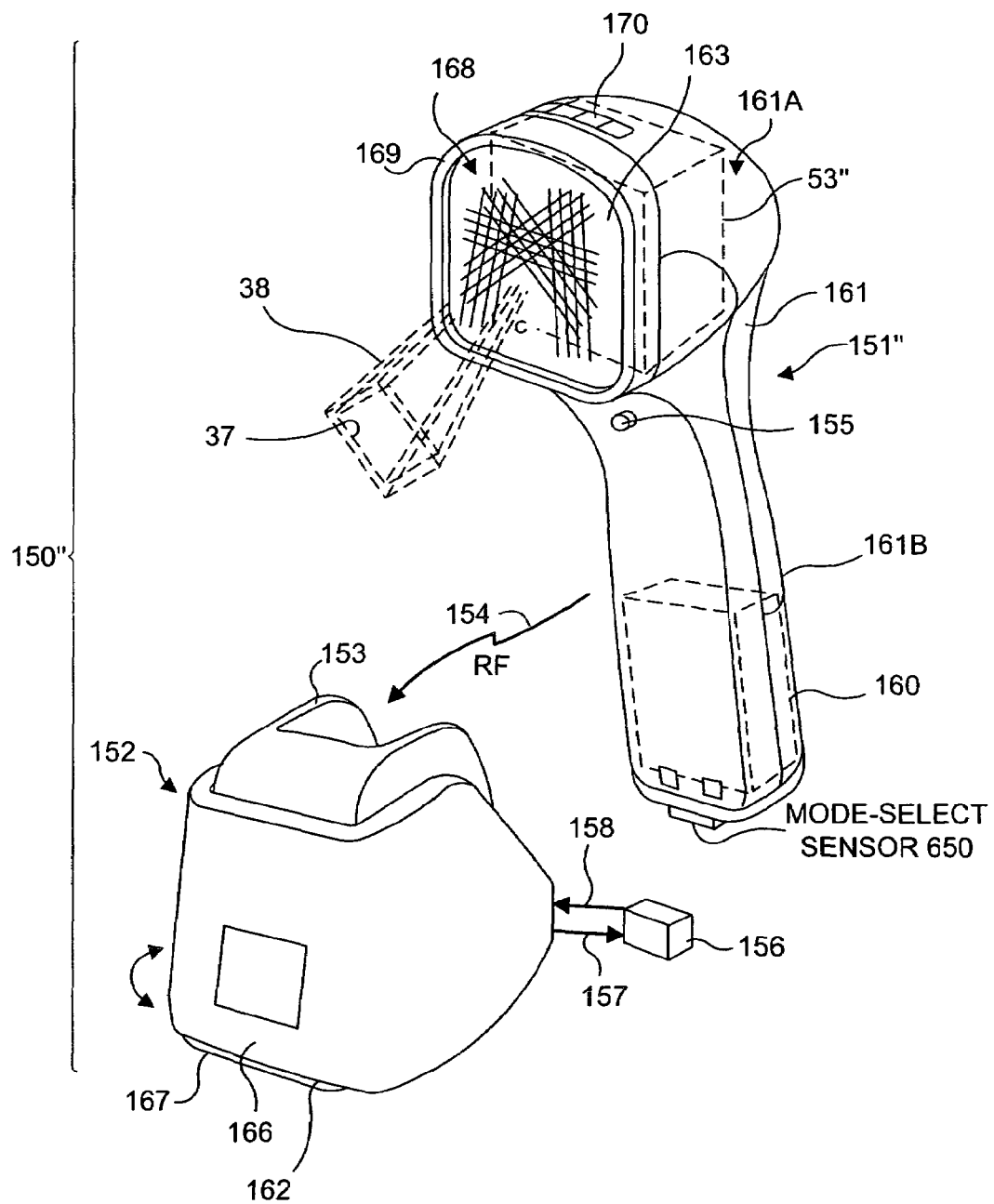
FIG. 4C is a perspective view of the nineth illustrative embodiment of the wireless automatically-activatable bar code symbol reading device of the present invention, comprising an integrated laser scanning bar code symbol reading engine for producing a laser-based bar code detection field and a laser-based omni-directional bar code symbol reading field, and a wireless communication link established with its base station adapted for battery recharging and hands-free mode of operation within diverse application environments.

Ninth Illustrative Embodiment Of Wireless Automatically-Activated Bar Code Symbol Reading System Of The Present Invention In FIG. 4C, the ninth illustrative embodiment of the wireless automatically-activated omni-directional bar code symbol reading system hereof 150" is shown comprising: a hand-supportable laser scanning bar code symbol reading device 151" adapted for support within a user's hand; and a base station 152 in data communication with the hand-supportable bar code reading device 151" using a two-way data communication link 154" as illustrated in FIGS. 13A1 and 13A2, to be described greater detail hereinafter. As shown, this automatically-activated bar code symbol reading system 790 is similar to the bar code symbol reading system 150 shown in FIG. 4A, in all but a few respects. In general, the bar code symbol reading device of FIG. 4C can incorporate within its hand-supportable housing 161A, any of the laser scanning engines disclosed in FIGS. 6D, 7F, and 8C, with little or no modification to the form factor thereof.

Tenth Illustrative Embodiment of Wireless Automatically-Activated Bar Code Symbol Reading System of the Present Invention In FIGS. 5A through 5D, the tenth illustrative embodiment of the wireless automatically-activated bar code symbol reading system hereof 790 is shown comprising: a hand-supportable laser scanning bar code symbol reading device 791 adapted for support within a user's hand; and a base station 792 in data communication with the hand-supportable bar code reading device 791 using a two-way data communication link of the present invention as illustrated in FIGS. 13A1 and 13A2, and to be described hereinafter. In this illustrative embodiment of the present invention, as well as in others, the operation of the data transmission activation switch 330 is essentially controlled (i.e. conditioned) by the automatic detection of the hand-supportable wireless device being physically located within the predetermined RF communication range of the RF-based data communication link (i.e. system), involving the detection of the strength of "heartbeat" signals transmitted from the base station to the wireless hand-supportable device, as shown in FIGS. 13A1 and 13A2.

In general, the hand-supportable bar code symbol reading device 790 shown in FIGS. 5A through 5D can incorporate within its hand-supportable housing, any of the 1D and 2D laser scanning engines disclosed in FIGS. 6A, 6C, 7A, 7E and 8A, 8B, and also any of the omnidirectional laser scanning engines disclosed in FIGS. 6F0 6D, 7F, and 8C, perhaps with slight modification to the form factor thereof in particular embodiments.

As shown in FIGS. 5E and 5F, the retractable/protractable support hook 793 is integrated within the cradle-providing base station 792 for two general kinds of installation, namely: (i) vertical installations, wherein the automatic hand-supportable laser scanning bar code symbol reading device 790 can be supported in a vertical position when the protractable/retractable hinged support hook 793 is arranged in its protracted configuration as shown in FIGS. 5E1 and 5F; and (ii) horizontal installations, wherein the automatic hand-supportable laser scanning bar code symbol reading device 790 can be supported in a horizontal position when the protractable/retractable hinged support hook 793 is arranged in its retracted configuration as shown in FIGS. 5G and 5H. protracted configuration. This feature permits the cradle/base station to be easily mounted to either a desk or to a wall surface. FIG. 5I shows an elevated side view of the cradle-supporting base station 792 employed in the system of FIGS. 5A through 5D, with its support hook 793 arranged in its retracted configuration. FIG. 5J shows an elevated side view of the cradle-supporting base station 792 employed in the system of FIGS. 5A through 5D, with its support hook 793 arranged in its Notably, the wireless 2-way RF-based data communication method of the present invention is permitted to work substantially the same in each of these base station installations.

As shown in the figures, the power switch for the wireless bar code symbol reader is located at the rear end of housing of the reader, and is accessible by way of a small pin hole 2000. With this feature, the operator can disconnect the battery using the power switch at the rear of the reader. This switching mechanism provides a simple way to save electrical power and will protect the battery aboard the wireless bar code symbol reader. In addition, this switch can serve as a hardware reset button when something is wrong with the wireless bar code reader.

Having described various illustrative embodiments of the wireless automatically-activated bar code symbol reading system of the present invention in great detail above, it is appropriate at this juncture to now describe in greater detail, each of the nine illustrative embodiments of the automatically-activated laser scanning engines hereof that can be readily incorporated into the above-described embodiments of the wireless bar code symbol reading systems of the present invention.

Automatically-Activated Laser Scanning Engine for Producing IR-Based Object Detection Field, One-Dimensional Laser-Based Bar Code Symbol Detection Field, and One-Dimensional Laser-Based Bar Code Symbol Reading Field As shown in FIGS. 6A to 6D, the first illustrative embodiment of the automatically-activated bar code symbol reading engine hereof 200 comprises: a miniature engine housing 201 realized as small as a sugar-cube using presently available enabling technology, having a lower housing (i.e. base) portion 202A and an upper housing (i.e. cover) portion 202B; a laser scanning module 203 for producing and scanning a laser beam across a scanning field (i.e. bar code symbol detection field, and bar code symbol reading field); a PC board 204 for supporting electronic circuits used to realize the subsystems and subcomponents thereof shown in FIGS. 10A1 through 10O, including a photodetector 226 coupled to analog and digital signal processing circuits and an infra-red transmitter 206A and an infrared receiver 206B coupled to the object detection subsystem realized on PC board, as taught in U.S. Pat. No. 5,808,285; and a scanning window 227 for covering the transmission aperture 228 of the engine housing, and providing the optical functions taught in U.S. Pat. No. 5,789,731 incorporated herein by reference.

Figure 6B:
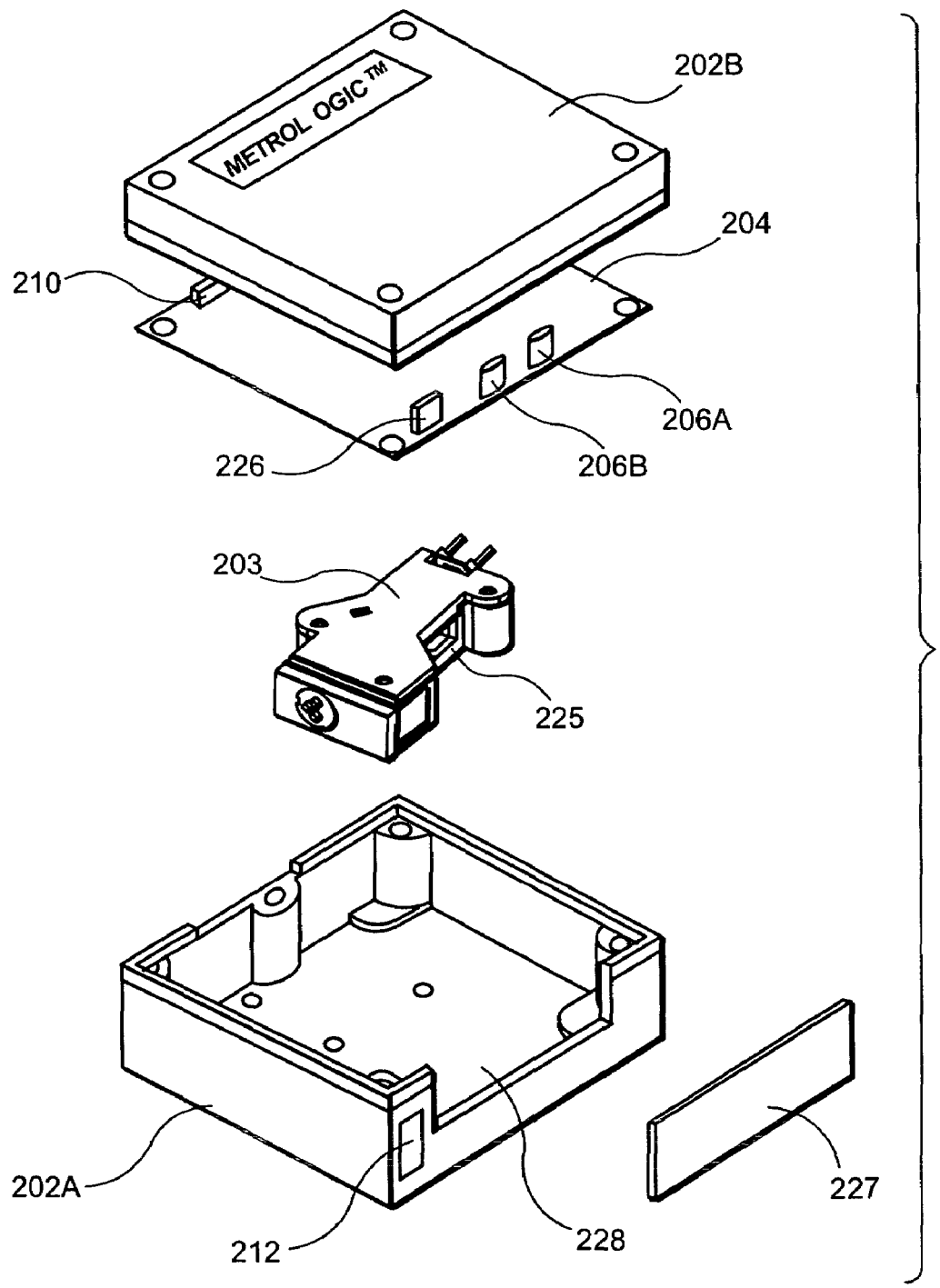
FIG. 6B is a perspective, exploded view of the automatically-activated laser-based bar code symbol reading engine shown in FIG. 6A.

As shown in FIGS. 6A and 6B, light transmission aperture 228 is formed in the side of the lower housing portion 202A of the engine housing to allow the laser beam produced therewithin to exit the housing. Another aperture 212, coincident with photodetector 205, is formed in the front side lower surface of housing portion 202A, to allow return laser light to be detected by photodetector 226. In the illustrative embodiment, light transmission aperture 228 permits IR light to exit and enter the lower housing portion 202A, as shown. To permit a flexible wire harness to interconnect with the circuitry on PC board 204 by way of a conventional connector 210, an input/output aperture (not shown) is formed in the rear side panel of the lower housing portion 202A. With PC boards 204 installed within the interior of the lower housing portion 202A, the upper housing portion 202B is snap-fitted with the lower housing portion 202A and fastened thereto using a set of machine screws (not shown).

Figure 15:
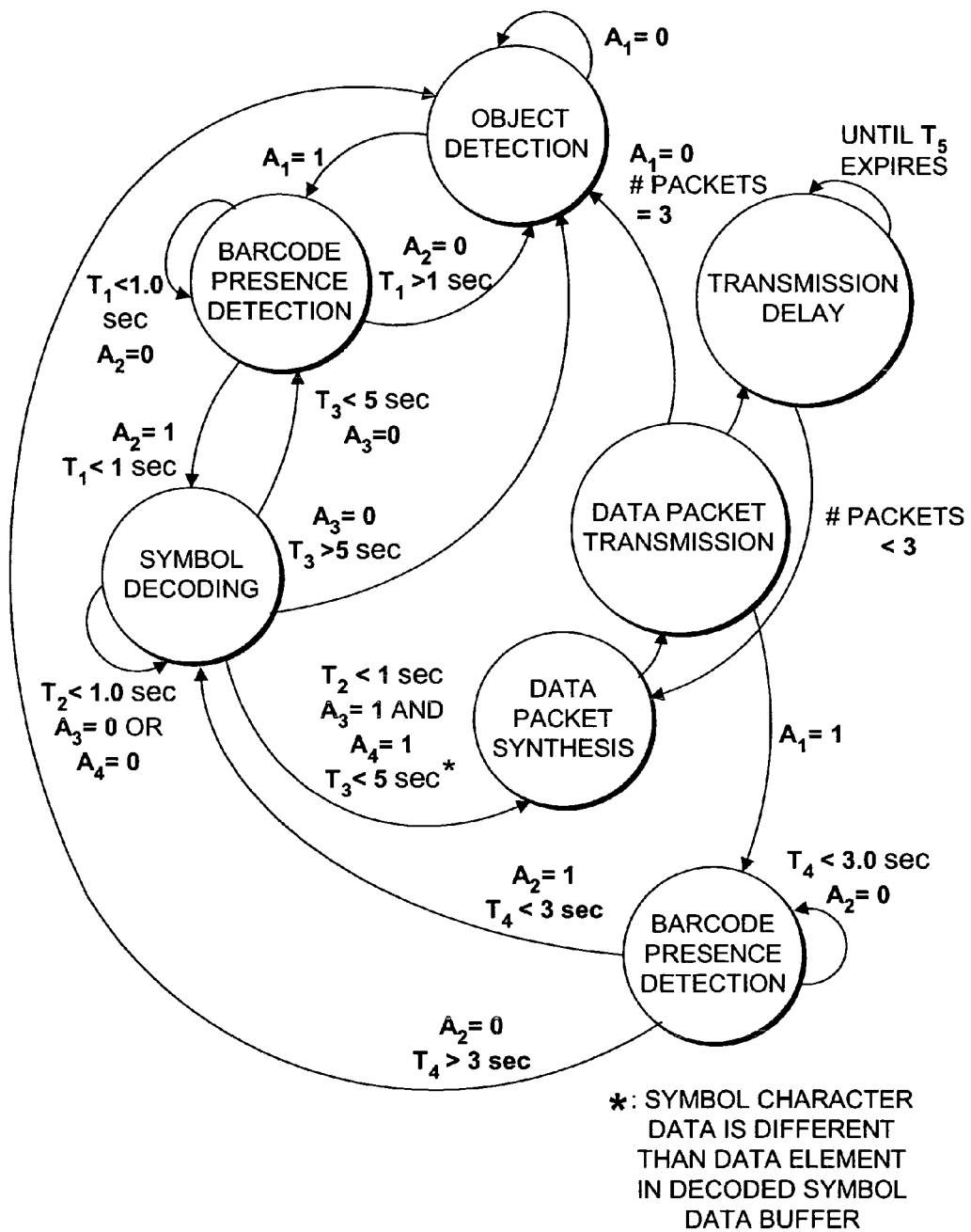
FIG. 15 is a state diagram illustrating the various states that the automatically-activated bar code symbol reading system of FIG. 11 may undergo during the course of its programmed operation.

Notably, the bar code symbol reading engine of FIG. 6A embodies the system architecture shown in FIGS. 10A1 through 12, which carries out the control process illustrated in FIGS. 14A1 through 14C4, and described by the state transition diagram of FIG. 15. Also, the produced output from this bar code symbol reading engine 200 is an RF carrier signal modulated by a serial data packet stream in response to several events, namely: (i) generation of symbol character data strings from the automatic bar code symbol reading engine 200; (ii) the manual actuation of the data transmission switch mounted on the exterior of the scanner housing; and (iii) the generation of in-range indication signal $A_5=1$ from the Bluetooth® RF transceiver chipset 803 embodied within the hand-supportable bar code reading device in which the engine is integrated.

Figure 6C:
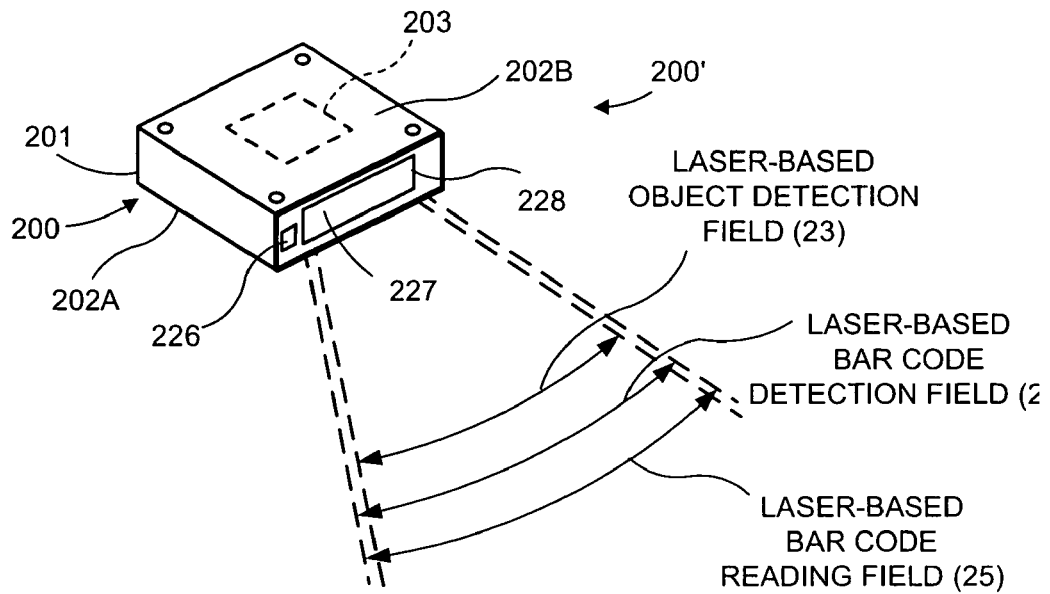
FIG. 6C is a perspective view of a second illustrative embodiment of the automatically-activated laser scanning bar code symbol reading engine of the present invention shown completely assembled and adapted for incorporation into any one of the bar code symbol reading devices of the present invention, and programmed for automatically reading bar code symbols using its laser-based object detection field and its 1-D laser-based scanning (i.e. bar code detection and reading) field.

Automatically-Activated Laser Scanning Engine for Producing Laser-Based Object Detection Field, One-Dimensional Laser-Based Bar Code Detection Field, and One-Dimensional Laser-Based Bar Code Reading Field In FIG. 6C, the second illustrative embodiment of the automatically-activated bar code symbol reading engine hereof 200' comprises: a miniature engine housing 201 realized as small as a sugar-cube using presently available enabling technology, having a lower housing (i.e. base) portion 202A and an upper housing (i.e. cover) portion 202B; a laser scanning module 203 as disclosed in application Ser. No. 09/071,512 filed May 1, 1998, incorporated hereby reference, for producing and scanning a laser beam across a scanning field; a PC board 204 (similar to that shown in FIG. 9B) for supporting electronic circuits used to realize the subsystems shown in FIGS. 22A1 through 22C of WO Publication No. WO 00/33239, including a photodetector 226 coupled to analog and digital signal processing circuits realized on PC board 204, as taught in U.S. Pat. No. 5,808,285; and a scanning window 227 for covering the transmission aperture 228 of the engine housing, and providing the optical functions taught in U.S. Pat. No. 5,789,731 incorporated herein by reference. In all but a few respects, the bar code symbol reading engine 200' is similar to the bar code symbol engine 200 of FIG. 6A, except that the engine 200' shown in FIG. 6C generates a laser-based object detection field (23), rather than an JR-based object detection field 9. The produced output from this bar code symbol reading engine is an RF carrier signal modulated by a serial data packet stream in response to several events, namely: (i) generation of symbol character data strings from the automatic bar code symbol reading engine 200; (ii) the manual actuation of the data transmission switch mounted on the exterior of the scanner housing; and (iii) the generation of in-range indication signal $A_5 1$ from the Bluetooth® RF transceiver chipset 803 embodied within the hand-supportable bar code reading device in which the engine is integrated.

Notably, the bar code symbol reading engine of FIG. 6C embodies the system architecture shown in FIGS. 22A1-22C of WO Publication No. WO 00/33239, and carries out the control process illustrated in FIGS. 23A1 through 23E thereof, and bounded by the state transition diagram of FIG. 24 shown therein. As will be described in greater detail hereinafter, the laser-based objection detection field 23 can be generated by driving a conventional VLD so as to produce a low-power, non-visible (or otherwise imperceptible) pulsed laser beam during the object detection mode of operation, as taught in U.S. Pat. No. 4,933,538, incorporated herein by reference. In this mode of operation, the same photodetector 226 used to detect reflected laser light, during the laser-based bar code symbol and reading modes of operation, can be used to detect the non-visible laser return signal during the object detection mode of operation. In this illustrative embodiment, the non-visible pulsed laser signal, reflected off an object present in the laser-based object detection field 23, and detected by photodetector 226, is processed so as to detect the presence of the object located therewithin and automatically generate a control activation signal $A_1=1$, indicative of such automatic object detection. In all other respects, the bar code symbol reading engine of FIG. 6C is substantially similar to the bar code symbol reading engine of FIG. 6A.

Figure 6D:
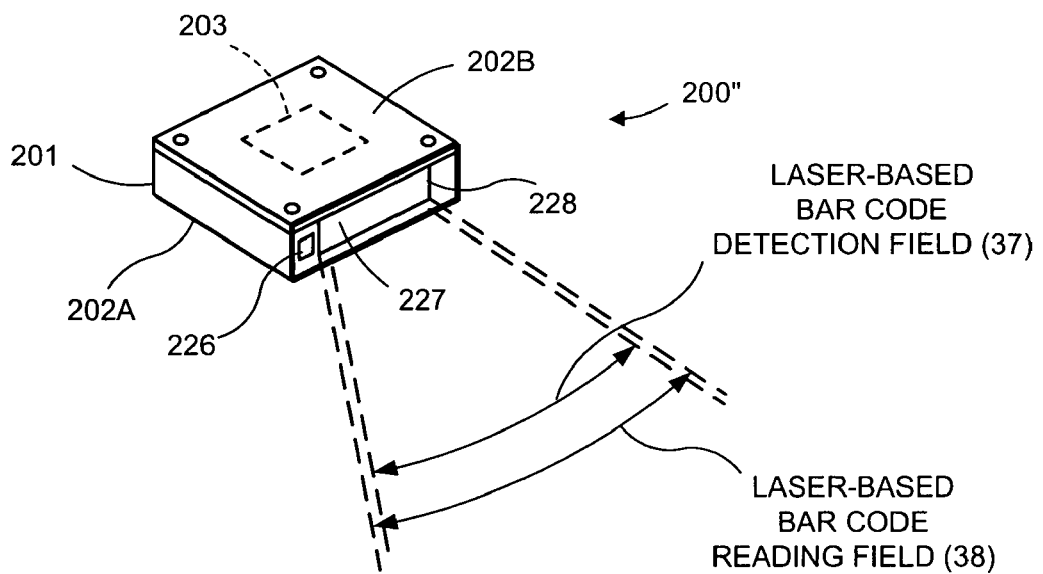
FIG. 6D is a perspective view of a third illustrative embodiment of the automatically-activated laser scanning bar code symbol reading engine of the present invention shown completely assembled, adapted for incorporation into any one of the bar code symbol reading devices of the present invention, and programmed for automatically reading bar code symbols using its 1-D laser-based scanning (i.e. bar code detecting and reading) field, without automatic object detection.

Automatically-Activated Laser Scanning Engine for Producing One-Dimensional Laser-Based Bar Code Detection Field, and One-Dimensional Laser-Based Bar Code Reading, without Object Detection Field In FIG. 6D, the third illustrative embodiment of the automatically-activated laser scanning engine 200" is shown comprising: a miniature engine housing 201 realized as small as a sugar-cube using presently available enabling technology, having a lower housing (i.e. base) portion 202A and an upper housing (i.e. cover) portion 202B; a laser scanning module 203 as disclosed in application Ser. No. 09/071,512 filed May 1, 1998, now abandoned, incorporated hereby reference, for producing and scanning a laser beam across a scanning field;

a PC board 204 (similar to that shown in FIG. 9B) for supporting electronic circuits used to realize the subsystems shown in FIGS. 25A through 26 of WIPO Publication No. WO 00/33239, including a photodetector 226 coupled to analog and digital signal processing circuits realized on PC board 204, as taught in U.S. Pat. No. 5,808,285; and a scanning window 227 for covering the transmission aperture 228 of the engine housing, and providing the optical functions taught in U.S. Pat. No. 5,789,731 incorporated herein by reference.

Notably, the bar code symbol reading engine of FIG. 6D embodies the system architecture shown in FIGS. 25A through 26 of WIPO Publication No. WO 00/33239, and carries out the control process illustrated in FIGS. 27A through 27C thereof, and bounded by the state transition diagram of FIG. 28 shown therein. In all but a few respects, the bar code symbol reading engine 200" of FIG. 6D is similar to the bar code symbol engines of FIGS. 6A and 6C, except that the bar code symbol reading engine of FIG. 6D does not generate any sort of object detection field. The produced output from this bar code symbol reading engine is an RF carrier signal modulated by a serial data packet stream in response to several events, namely: (i) generation of symbol character data strings from the automatic bar code symbol reading engine 200; (ii) the manual actuation of the data transmission switch mounted on the exterior of the scanner housing; and (iii) the generation of in-range indication signal $A_5=1$ from the Bluetooth® RF transceiver chipset 803 embodied within the hand-supportable bar code reading device in which the engine is integrated.

Automatically-Activated Laser Scanning Engine for Producing IR-Based Object Detection Field, Two-Dimensional Laser-Based Bar Code Detection Field, and Two-Dimensional Laser-Based Bar Code Detection Field In FIGS. 7A through 7D, the fourth illustrated embodiment of the automatically-activated laser scanning engine hereof 230 is shown comprising: a miniature engine housing 231 realized as small as a sugar-cube using presently available enabling technology, having a lower housing (i.e. base) portion 231A and an upper housing (i.e. cover) portion 231B; a x-y laser scanning module 232 as disclosed in WIPO Publication No. WO 99/57579 published Nov. 11, 1999, incorporated hereby reference presented on the inside surface of housing cover portion 231B, for producing and scanning a laser beam across a scanning field; a PC board 233 for supporting electronic circuits used to realize the subsystems and subcomponents thereof shown in FIGS. 15A1 through 16, including a photodetector 234 coupled to analog and digital signal processing circuits on the PC board 233, and an infrared transmitter 235 and an infrared receiver 236 coupled to the IR-based object detection circuit of the engine realized on PC board 233, as taught in U.S. Pat. No. 5,808,285; and a scanning window 237 for covering the transmission aperture 238 of the engine housing, and providing the optical functions taught in U.S. Pat. No. 5,789,731 incorporated herein by reference. Notably, the bar code symbol reading engine of FIG. 7A embodies the system architecture shown in FIGS. 10A1 through 10O, which carries out the control process illustrated in FIGS. 14A1 through 14C4, and bounded by the state transition diagram of FIG. 15.

As shown in FIG. 7D, the underside surface of the upper housing portion 213B functions as an optical bench (i.e. platform) whereupon the majority of optical and electro-optical components of the x-y laser scanning mechanism are strategically mounted. As shown in FIG. 7D, the lower housing portion 231A supports PC board 233, on which the circuits of FIG. 10A1 through 10O are realized using surface-mount components and like technology known in the art. As illustrated in FIGS. 7A and 7D, the output laser beam 251 is scanned over the x and y direction of its 2D laser scanning field which functions as the bar code symbol detection field during bar code symbol detection mode of operation, and the bar code symbol reading field during the bar code symbol reading mode of operation. Optionally, the data transmission subsystem can be realized on PC board 233 while the transmitting antenna 240, connected to PC board 233, is mounted onto the exterior of engine housing.

The produced output from this embodiment of the bar code symbol reading engine is a RF carrier signal modulated by a serial data stream in response to the occurrence of the following events: (i) generation of symbol character data strings from the automatic bar code symbol reading engine 200; (ii) the manual actuation of the data transmission switch mounted on the exterior of the scanner housing; and (iii) the generation of in-range indication signal $A_5=1$ from the Bluetooth® RF transceiver chipset 803 embodied within the hand-supportable bar code reading device in which the engine is integrated.

Automatically-Activated Laser Scanning Engine for Producing Laser-Based Object Detection Field, Two-Dimensional Laser-Based Bar Code Detection Field and Two-Dimensional Laser-Based Bar Code Detection Field In FIG. 7E, the fifth illustrative embodiment of the automatically-activated laser scanning engine hereof 230' is shown. In nearly all but a few respects, the bar code symbol reading engine of FIG. 7E is substantially similar to the bar code symbol reading engine of FIG. 7A, except that the engine of FIG. 7E produces a laser-based detection field similar, in principle, to the one produced by the engine of FIG. 6C. Notably, the bar code symbol reading engine of FIG. 7E embodies the system architecture shown in FIGS. 22A1 through 22C of WIPO Publication No. WO 00/33239, and carries out the control process illustrated in FIGS. 23A1 through 23E thereof, and bounded by the state transition diagram of FIG. 24 shown therein. The produced output from this bar code symbol reading engine is an RF carrier signal modulated by a serial data packet stream in response to several events, namely: (i) generation of symbol character data strings from the automatic bar code symbol reading engine 200; (ii) the manual actuation of the data transmission switch mounted on the exterior of the scanner housing; and (iii) the generation of in-range indication signal $A_5=1$ from the Bluetooth® RF transceiver chipset 803 embodied within the hand-supportable bar code reading device in which the engine is integrated.

Advantageously, the use of a raster-type (2-D) laser scanning pattern during these modes of operation enable more aggressive bar code symbol detection and reading of 2D (e.g. PDF417) type bar code symbols.

Automatically-Activated Laser Scanning Engine for Producing Two-Dimensional Laser-Based Bar Code Detection Field, and Two-Dimensional Laser-Based Bar Code Detection Field, without an Object Detection Field In FIG. 7F, the sixth illustrative embodiment of the automatically-activated laser scanning engine hereof 230" is shown. In nearly all but a few respects, the bar code symbol reading engine of FIG. 7F is substantially similar to the bar code symbol reading engine of FIG. 7A, except that the engine of FIG. 7F does not produce any sort of objection detection field. Instead, the engine shown in FIG. 7F relies on the use of automatic laser-based bar code symbol detection in which a visible laser beam is operated in a pulse mode of operation (e.g. housing about a 50% duty cycle). Notably, the bar code symbol reading engine of FIG. 7F embodies the system architecture shown in FIG. 25 of WIPO Publication No. WO 00/33239, and carries out the control process illustrated in FIGS. 27A through 27C thereof, and bounded by the state transition diagram of FIG. 28 shown therein. The produced output from this bar code symbol reading engine is an RF carrier signal modulated by a serial data packet stream in response to several events, namely: (i) generation of symbol character data strings from the automatic bar code symbol reading engine 200; (ii) the manual actuation of the data transmission switch mounted on the exterior of the scanner housing; and (iii) the generation of in-range indication signal $A_5=1$ from the Bluetooth® RF transceiver chipset 803 embodied within the hand-supportable bar code reading device in which the engine is integrated.

Automatically-Activated Laser Scanning Engine for Producing IR-Based Object Detection Field, Omni-Dimensional Laser-Based Bar Code Detection Field, and Omni-Dimensional Laser-Based Bar Code Detection Field In FIG. 8A, a seventh automatically-activated laser scanning engine hereof 260 is shown comprising: an ultra-compact engine housing 261 having a lower housing (i.e. base) portion 261A and an upper housing (i.e. cover) portion 261B; a polygon-based laser scanning module or mechanism 262, as disclosed in U.S. Pat. No. 5,796,091, incorporated here by reference, having an optical bench with optical and electro-optical components mounted thereon, for producing and scanning a laser beam across an omnidirectional scanning field; a PC board 263 for supporting electronic circuits used to realize the subsystems shown in FIGS. 10A1 through 10O, including an IR transmitter and receiver 264 and 265 coupled to an object detection circuit realized on PC board 263, and a photodetector 266 coupled to analog and digital signal processing circuits realized on a PC board 263, as taught in U.S. Pat. No. 5,976,091; and a scanning window 267 for covering the transmission aperture of the engine housing, and providing the optical functions taught in U.S. Pat. No. 5,789,731 incorporated herein by reference.

Notably, the bar code symbol reading engine of FIG. 8A embodies the system architecture shown in FIGS. 10A1 through 10O, and carries out the control process illustrated in FIGS. 14A1 through 14C4, and bounded by the state transition diagram of FIG. 15. During the bar code symbol detection mode, the engine automatically generates an omni-directional laser scanning pattern within its bar code symbol detection field 10, for collecting scan data for use in bar code symbol detection processing operations. Also, during the bar code symbol reading mode, the engine automatically generates an omni-directional laser scanning pattern within its bar code symbol reading field 11, for collecting scan data for use in bar code symbol detection processing operations. In FIGS. 9A and 9B, cross-sectional views of the omnidirectional and laser scanning pattern projected within fields 10 and 11 are shown. Further details regarding the laser scanning pattern are disclosed in U.S. Pat. No. 5,796,091, incorporated herein by reference. The produced output from this bar code symbol reading engine is an RF carrier signal modulated by a serial data packet stream in response to several events, namely: (i) generation of symbol character data strings from the automatic bar code symbol reading engine 200; (ii) the manual actuation of the data transmission switch mounted on the exterior of the scanner housing; and (iii) the generation of in range indication signal $A_5=1$ from the Bluetooth® RF transceiver chipset 803 embodied within the hand-supportable bar code reading device in which the engine is integrated.

Figure 8B:
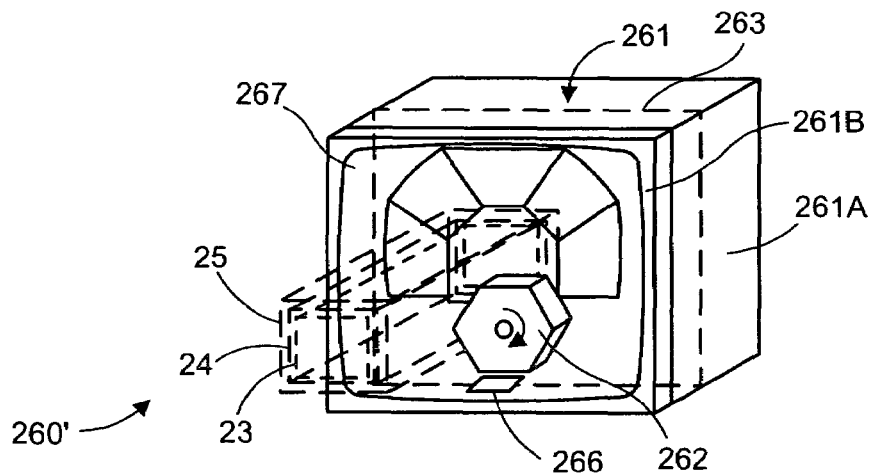
FIG. 8B is a perspective view of an eighth illustrative embodiment of the automatically-activated laser scanning bar code symbol reading engine of the present invention shown completely assembled, adapted for incorporation into any one of the wireless bar code symbol reading devices of the present invention, and programmed for automatically reading bar code symbols using its laser-based object detection field and its laser-based omnidirectional scanning (i.e. bar code detecting and reading) field in an automatic manner.

Automatically-Activated Laser Scanning Engine for Producing Laser-Based Object Detection Field, Omni-Dimensional Laser-Based Bar Code Detection Field, and Omni-Dimensional Laser-Based Bar Code Detection Field In FIG. 8B, the eighth illustrative embodiment of the automatically-activated laser scanning engine hereof 260' is shown comprising: an ultra-compact engine housing 261 having a lower housing (i.e. base) portion 261B and an upper housing (i.e. cover) portion 261A; a polygon-based laser scanning module 262 as disclosed in U.S. Pat. No. 5,796,091, incorporated here by reference, having an optical bench with optical and electro-optical components mounted thereon, for producing and scanning a laser beam across an omnidirectional scanning field; a PC board 263 for supporting electronic circuits used to realize the subsystems shown in FIGS. 22A1-22C, including a photodetector 266 coupled to analog and digital signal processing circuits realized on PC board 263, as taught in U.S. Pat. No. 5,796,091; and a scanning window 267 for covering the transmission aperture of the engine housing, and providing the spectral filtering functions taught in U.S. Pat. No. 5,789,731, incorporated herein by reference.

Notably, the bar code symbol reading engine of FIG. 8B embodies the system architecture shown in FIGS. 22A1-22C of WIPO Publication No. WO 00/33239, and carries out the control process illustrated in FIGS. 23A1 through 23E thereof, and is generally governed by the state transition diagram shown in FIG. 24 shown therein. In nearly all respects, but a few, the engine of FIG. 8B is similar to the engine of FIG. 8A, except that a laser-based object detection field 23 is automatically generated from the engine in FIG. 8B during its object detection mode of operation. The same techniques described in connection with the engine of FIG. 6C can be used to generate the laser-based object detection field 23 produced from the laser scanning engine of FIG. 8B. The produced output from this bar code symbol reading engine is an RF carrier signal modulated by a serial data packet stream in response to several events, namely: (i) generation of symbol character data strings from the automatic bar code symbol reading engine 200; (ii) the manual actuation of the data transmission switch mounted on the exterior of the scanner housing; and (iii) the generation of in-range indication signal $A_5=1$ from the Bluetooth® RF transceiver chipset 803 embodied within the hand-supportable bar code reading device in which the engine is integrated.

Figure 8C:
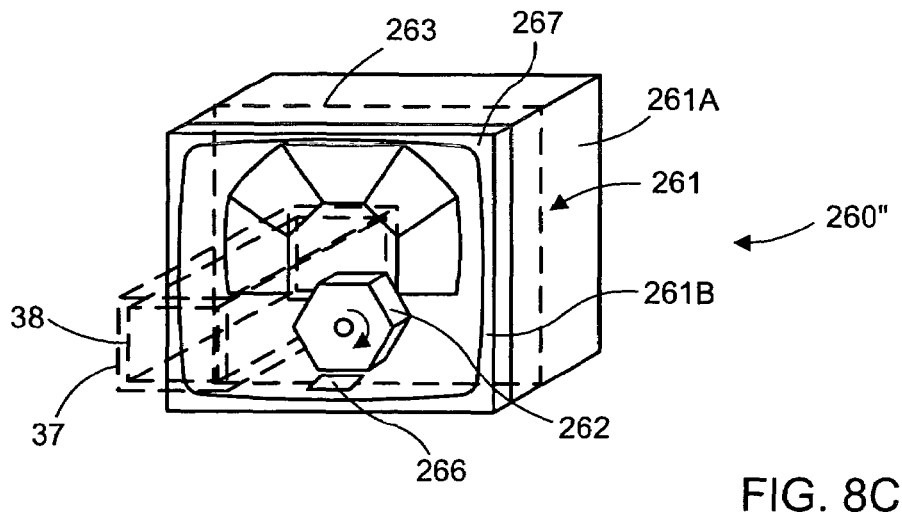
FIG. 8C is a perspective view of a ninth illustrative embodiment of the automatically-activated laser scanning bar code symbol reading engine of the present invention shown completely assembled, adapted for incorporation into any one of the wireless bar code symbol reading devices of the present invention, and programmed for reading bar code symbols using its laser-based omnidirectional-type scanning (i.e. bar code symbol detecting and reading) field without using automatic object detection.
Figure 9A:
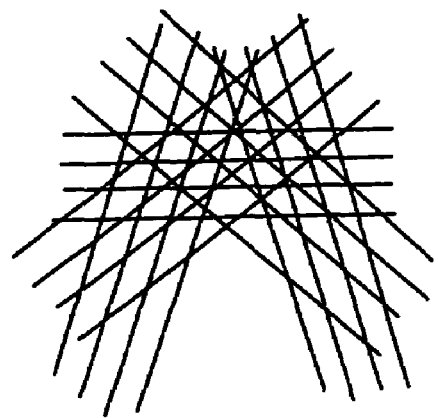
FIGS. 9A and 9B are schematic cross-sectional views of the 3-D laser scanning volume generated from the laser scanning engines of FIGS. 8A, 8B and 8C, taken parallel to the light transmissive window at about 1.0" and 5.0" therefrom.
Figure 9B:
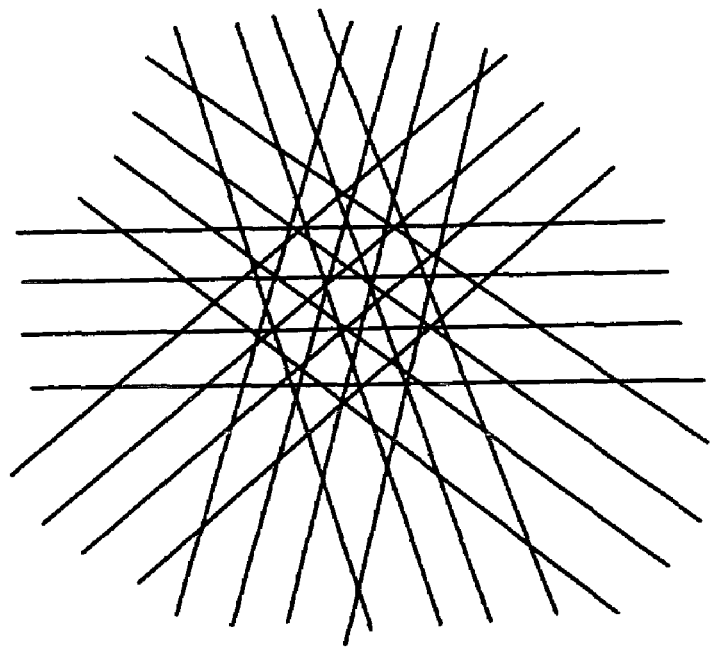

Automatically-Activated Laser Scanning Engine for Producing Omni-Dimensional Laser-Based Bar Code Detection Field, and Omni-Dimensional Laser-Based Bar Code Detection Field, without an Object Detection Field In FIG. 8C, the ninth illustrative embodiment of the automatically activated laser scanning engine hereof 260" is shown comprising: an ultra-compact engine housing 261 having a lower housing (i.e. base) portion 261A and an upper housing (i.e. cover) portion 261B; a polygon-based laser scanning module 262 as disclosed in U.S. Pat. No. 5,796,091, incorporated herein by reference, having an optical bench with optical and electro-optical components mounted thereon, for producing and scanning a laser beam across an omnidirectional scanning field; a PC board 263 for supporting electronic circuits used to realize the subsystems shown in FIGS. 25A-26, including a photodetector 266 coupled to analog and digital signal processing circuit realized on PC board 263, as taught in U.S. Pat. No. 5,796,091; and a scanning window 267 for covering the transmission aperture of the engine housing, and providing the spectral-filtering functions taught in U.S. Pat. No. 5,789,731, incorporated herein by reference.

Notably, the bar code symbol reading engine of FIG. 8C embodies the system architecture shown in FIGS. 25A-26 of WIPO Publication No. WO 00/33239 carries out the control process illustrated in FIGS. 27A through 27C thereof and is generally governed by the state transition diagram shown in FIG. 28 shown therein. In nearly all respects, but a few, the engine of FIG. 8C is similar to the engine of FIG. 8B, except that the laser scanning engine of FIG. 8C does not generate any form of object detection field during its system operation. The produced output from this bar code symbol reading engine is an RF carrier signal modulated by a serial data packet stream in response to several events, namely: (i) generation of symbol character data strings from the automatic bar code symbol reading engine 200; (ii) the manual actuation of the data transmission switch mounted on the exterior of the scanner housing; and (iii) the generation of in-range indication signal $A_5=1$ from the Bluetooth® RF transceiver chipset 803 embodied within the hand-supportable bar code reading device in which the engine is integrated.

Wireless Automatically-Activated Laser Scanning Bar Code Symbol System Comprising IR-Based Object Detection Subsystem Laser-Based Bar Code Symbol Detection Subsystem, Laser-Based Bar Code Symbol Reading Subsystem, and Manually-Activated Symbol Character Data Transmission Subsystem Referring to FIGS. 10A1 through 15, the first generalized system design will now be described in greater detail. Notably, the structure and functions of the first generalized system design are provided within each of illustrative embodiments of the present invention described above relating to automatically-activated bar code symbol reading systems comprising an IR-based object detection subsystem, a laser-based bar code presence detection subsystem, a laser-based bar code symbol reading subsystem and data transmission activation subsystem, as illustrated in FIG. 1A. Details on the second and third generalized system designs can be found by reading WIPO Publication No. WO 00/33239, taking into consideration the teachings described with respect to the first generalized embodiment described below.

As shown in FIG. 10A1 through 10O, wireless automatically-activated bar code symbol treading system 300 comprising a number of cooperating components, namely: a system override signal detection circuit 301 for detecting the production of a system override signal and producing in the presence thereof control activation signal $A_0=1$; a primary oscillator circuit 301A for producing a primary clock signal CLK for use by the system override signal detection circuit 301 and object detection circuit 307; a first RC timing network 302 for setting the oscillation frequency of the primary oscillator circuit; means (e.g. Hall-effect sensor) 335 for producing a system override signal; a manually-activatable data transmission switch 303 for generating control activation signal $A_4=1$ in response to activation of the switch; first control means 304, realized as a first control circuit $C_1$, for performing localized system control functions; a second RC timing network 305 for setting a timer $T_1$ in control circuit $C_1$; means (e.g. an object sensing circuit 306 and an object detection circuit 307) for producing a first activation control signal $A_1=1$ upon the detection of an object bearing a bar code in at least a portion of the object detection field 9; a laser beam scanning mechanism 308 for producing and scanning a visible laser beam across the bar code symbol on the detected object; photoreceiving circuit 309 for detecting laser light reflected off the scanned bar code symbol and producing an electrical signal $D_1$ indicative of the detected intensity; an analog-to-digital (A/D) conversion circuit 310 for converting analog scan data signal $D_1$ into a corresponding digital scan data signal $D_2$; a bar code symbol (presence) detection circuit 311 for processing digital scan data signal $D_2$ in order to automatically detect the digital data pattern of a bar code symbol on the detected object and produce control activation signal $A_2=1$; a third RC timing network 312 for setting a timer $T_{BCD}$ in the bar code symbol detection circuit 311; second control means 313, realized as a second control circuit $C_2$, for performing local system control operations in response to the detection of the bar code symbol; third control means 314, realized as third control module $C_3$; timers $T_2$, $T_3$, $T_4$, and $T_5$ identified by reference numerals 315, 316, 317 and 318, respectively; a symbol decoding module 319 for processing digital scan data signal $D_2$ so as to determine the data represented by the detected bar code symbol, generate symbol character data representative thereof, and produce activation control signal $A_3$ for use by third control module $C_3$; a data packet synthesis module 320 for synthesizing a group of formatted data packets for transmission to its mated base unit 440; a data packet transmission circuit 321 for transmitting the group of data packets synthesized by the data packet synthesis module 319; an object detection state indicator (e.g. LED) 451 a bar code symbol detection state indicator 452 driven by enable signal $E_2$ and control activation signal $A_2=1$, a bar code symbol reading state indicator (e.g. LED) 453 driven by enable signal $E_8=1$; and a data transmission state indicator 454 (e.g. LED) driven by signal $E_9=1$; Bluetooth™ RF transceiver chip sets 803 and 804 installed in both the hand-supportable device 791 and the cradle-providing base station 792, respectively, for implementing a 2-way RF data communication link therebetween; a Data Packet Group Buffer (i.e. FIFO) 802 arranged in data communication with the Data Packet Transmission Circuit 321 under the control of $C_3$ Control Module 314 using enable signal $E_{11}$; Data Packet Transmission Circuit 321 controlled by $C_3$ Control Module 314 using enable signal $E_{10}$; an Out-Of-Communication Range Indicator (audible and/or visual) 805 arranged under the $C_3$ Control Module, for generating audible and/or visual indications to the operator when the hand-supportable bar code reader is moved outside of the communication range of the system; land additional control system logic programmed into the system control process illustrated in the flow charts of FIGS. 14A1 through 14C4, so as to enable the wireless bar code reader to (i) read a barcode while out of the communication range of its remote base station, (ii) store such data until communication can be reestablished between the wireless unit and the base station, and then (3) transmit the buffered and packaged data to the base station when the wireless device is once again located within the communication range of the system. Preferably, the memory storage capacity of the Data Packet Group Buffer 802 will be sufficient to hold numerous bar code symbols read while the wireless device is outside the communication range of its remote base station.

Figure 10D:
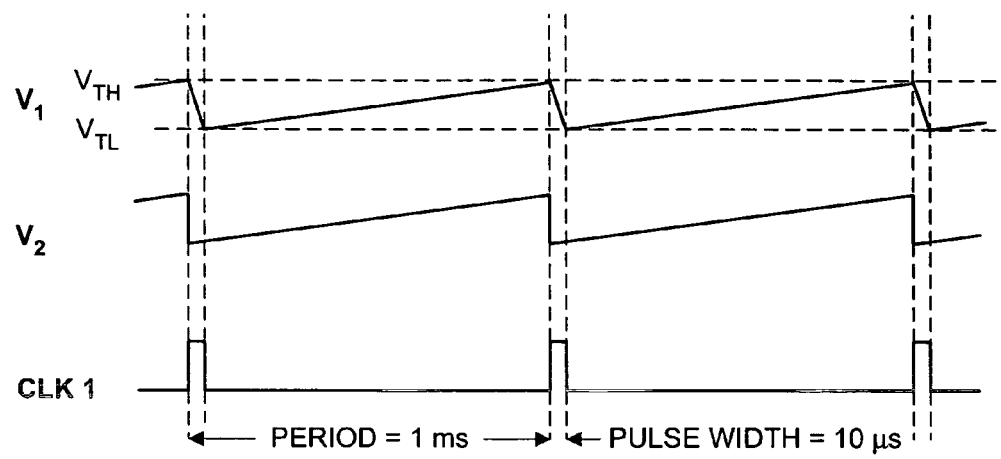
FIG. 10D is a timing diagram for the oscillator circuit of FIG. 10 C.

As will be described in greater detail hereinafter, second control circuit $C_2$ is capable of "overriding" (i.e. inhibit and/or enable) first control circuit $C_1$, whereas third control circuit $C_3$ is capable of overriding first and second control circuits $C_1$, and $C_2$, respectively. As shown in FIGS. 10A1 through 10A4, such control override functions are carried out by the generation of control override signals (i.e. $C_2/C_1$, $C_3/C_2$ and $C_3/C_1$) transmitted between respective control structures during system operation. Owing to the unique architecture of the control subsystem hereof, the automatically activated bar code symbol reading device hereof is capable of versatile performance and ultra-low power operation. The structure, function and advantages of this control subsystem architecture will become apparent hereinafter.

As shown in FIGS. 10A1 through 10A4, electrical power is provided to the components of the bar code reading device by battery power supply unit 320 contained within the housing of the device. As shown in the schematic diagram of FIG. 10B1, battery power supply unit 320 contained within the housing of the code symbol reading device provides electrical power to the components therewithin in accordance with a programmed mode of intelligent operation. In the illustrative embodiment, battery power supply unit 320 comprises a power supply distribution circuit 325, replaceable or rechargeable batteries 326, and an automatic power control circuit 330. In the illustrative embodiment, where rechargeable batteries are employed, the power supply circuit 320 further includes a secondary inductive coil 327B, bridge rectifier 328 and voltage regulation circuit 329. Preferably, all of these subcomponents are contained within the hand-supportable housing of the device, and configured together as shown in FIG. 10B1.

As illustrated in FIG. 10B1, the function of secondary inductive coil 327 is to establish an electromagnetic coupling with the primary inductive coil contained, for example, in the base unit 440 associated with the bar code reading device. In those embodiments of the bar code symbol reading system having a base unit 440 with an integrated recharging unit, the rechargeable batteries 326 therein are automatically recharged whenever the bar code symbol reading device is supported in the recharging portion of the base unit. More specifically, when arranged in this configuration, electrical power is inductively transferred from the primary inductive coil 327A in the base unit 440 to secondary inductive coil 327B in the bar code symbol reading device, as shown in FIGS. 10A1 through 10A4. The inductively coupled AC power signal is then rectified by bridge rectifier 320, and ultimately filtered by voltage regulation circuit 329 to provide a regulated DC power supply signal for recharging rechargeable batteries 326.

As shown in FIG. 10B1, automatic power control circuit 330 is connected in series between rechargeable battery 326 and power distribution circuit 325. The function of automatic power control circuit 330 is to automatically control (i.e. manage) the availability of battery power to electrically-active components within the bar code symbol reading device when the device is operated in its hands-on mode of operation (i.e. removed from the cradle portion of the base station) under a predefined set of operating conditions. Notably, while power distribution circuit 325 distributes electrical power throughout the bar code symbol reading device by way of a power distribution bus, automatic power control circuit 330 globally enables consumption of electrical power (i.e. the product of voltage and direct current) by the system components only when the power control circuit 330 is activated.

As shown in FIG. 10B1, the automatic power control circuit 330 comprises a number of subcomponents, namely: a DC-to-DC voltage converter 330A; a power commutation switch 330B; and a resettable timer circuit 330C. The function of the DC-to-DC voltage converter 330A is to convert the voltage from battery power source 326 to +5 Volts, whereas the function of the power commutation switch 330B is to selectively commute electrical power from the DC-to-DC converter 330A to the input port of the power distribution circuit 325. The function of the resettable timer circuit 330C is to control the power commutation circuit so that battery power is provided to the power distribution circuit 325 in a power conserving manner without compromising the performance of the bar code symbol reading system in its various modes of operation.

In general, there are numerous ways in which to realize the power reset switch 330D employed in the power supply unit 320 shown in FIGS. 10A1 through 10B1. In practice, however, the particular manner in which this subcomponent is realized will depend on the particular embodiment of the bar code symbol reading system, as well as its particular application. For example, consider the bar code symbol reading system illustrated in FIG. 2A. In this particular embodiment of the present invention, it would advantageous to realize the power reset switch 330D as a spring-biased switch provided on one of the support surfaces of the hand-supportable housing thereof. In this arrangement, the power reset switch 330D would generate a power reset signal when the hand-supportable housing is picked-up out of its stand, or off a countertop surfaces upon which it was supported while in its power-off/saving mode of operation.

As shown in FIGS. 10A1 through 10A4, battery supply 326 aboard each bar code symbol reading device is automatically charged to its normal output voltage (i.e. $V_{BATTERY}$) by way of battery recharging apparatus 327A/327B, 328 and 329. A predetermined time duration $\Delta T$ (e.g. greater than 1 minute, preferably 5 minutes) after the occurrence of a power switching event, power supply unit 320 attains its steady-state condition. At this state, capacitor $C_1$ charges through resistor $R_1$, to a voltage above Vref. This causes the output voltage of the capacitor C1 to drop to a level which disables FET 330B, thereby disabling the supply of battery power to power distribution circuit 325, and ultimately disabling the bar code symbol reading device. Upon the occurrence of any of the above three "power switching" events described above, capacitor $C_1$ quickly discharges through resistor $R_2$ (i.e. $R_1 \gg R_1$), causing the output voltage of capacitor C1 to go to a level which enables FET 330B to supply battery power to the power distribution circuitry 325, and thereby enabling the bar code reading device for the predetermined time period (e.g. $\Delta T$ greater than 1 minute, preferably 5 minutes). This programmed duration of power supply provides a time window $\Delta T$, within which the object detection circuit of the system can automatically detect an object within its object detection field 9. This power resetting operation does not, however, initiate or otherwise cause laser scanning or bar code symbol reading operations to commence or cease. Only the introduction of an object into the object detection field 9 (i.e. when the resettable timer circuit 330C has been reset) can initiate or otherwise cause laser scanning or bar code symbol reading operations to commence.

A principal advantage of the power control scheme of the present invention is that it provides automatic power conservation in automatic code symbol reading applications employing IR-based object detection as shown in FIGS. 10A1 through 10A4, or laser-based object detection as shown in FIGS. 22A1 through 22A4 of WIPO Publication No. WO 00/33239 while minimally impacting upon the diverse modes of automatic operation provided by the system hereof. In particular, provided that the user reads at least one bar code symbol within the predetermined time duration $\Delta T$ programmed into the bar code symbol reading device, there is no need to reset the power control circuit hereof. Also, when the hand-supportable housing of the bar code reading device is placed (i.e. supported) within the support recess of scanner support portion of its base unit, mode-select sensor (e.g. Hall-effect sensor) 650, sensing magnetic flux generated by permanent magnet 551B, produces a signal (e.g. $A_4=1$) which continuously activates power control circuit 330, causing battery power to be supplied from recharging battery 326 to the power distribution circuit 325, and thereby enabling continuous scanner operation in the hands-free mode of operation.

Simultaneously, mode-select sensor 650 also causes data transmission control activation signal $A_4=1$ to be generated when the hand-supportable bar code reading device is placed within the scanner support portion of the base unit 440.

In addition, a low battery protection circuit 3000 is provided within the wireless bar decode reader for (i) automatically monitoring the voltage of the battery source 326; (ii) razzing/vibrating the wireless bar code reader if the battery voltage is detected as being below a predetermined voltage threshold, and then turning off the laser diode within the wireless device, and causing the system to enter its sleep mode. This low battery protection circuit 3000 can protect the battery from over-discharge and data errors, because the current drawn from the battery will be much higher when its voltage is too low.

In the illustrative embodiment of the present invention, system override signal detection circuit 301, primary oscillator circuit 301A, object detection circuit 307, first control circuit $C_1$, analog-to-digital conversion circuit 310, bar code symbol detection circuit 311, and second control circuit $C_2$ are all realized on a single Application Specific Integrated Circuit (ASIC) chip 333 using microelectronic circuit fabrication techniques known in the art. In the illustrative embodiment, the ASIC chip and associated circuits for laser scanning and light detection and processing functions, are mounted on a PC board with the housing of the bar code symbol reading device. Symbol decoding module 319, data packet synthesis module 320, timers $T_2$, $T_3$, $T_4$, and $T_5$ and third control module $C_3$ are realized using a single programmable device, such as a microprocessor having accessible program and buffer memory, and external timing circuitry, collectively depicted by reference numeral 334 in FIG. 10A2. In the illustrative embodiment, these components and devices are mounted on the PC board with the bar code symbol reading device.

In the illustrative embodiment, when automatic power control circuit 330 is activated (i.e. upon the occurrence of a particular switching condition), electrical power from battery power unit 326 is automatically provided to first control circuit $C_1$, system override detection circuit 301, primary oscillator circuit 301A, IR object sensing circuit 306 and object detection circuit 307. This enables the operation of these components, while providing only biasing voltages to all other system components so that they are each initially disabled from operation. In accordance with the principles of the present invention, the distribution of electrical power to all other system components occurs under the management of the control architecture formed by the interaction of distributed control centers $C_1$, $C_2$ and $C_3$.

As shown in FIG. 10C, primary clock oscillator circuit 301A supplies a periodic pulsed signal CLK1 to the system override signal detection circuit 301 and the object detection circuit 307. In the illustrative embodiment, the primary oscillation circuit 301A is designed to operate at a low frequency (e.g. about 1.0 Khz) and a very low duty cycle (e.g., about 1.0%). The "ON" time for the system override signal producing device 335 and the IR object sensing circuit 306 is proportional to the duty cycle of the primary oscillation circuit 301A. This feature allows for minimal operating current when the bar code symbol reading engine is in its object detection mode and also when the system override signal producing device 335 is activated (i.e. produces a system override signal $D_0=1$).

Figure 10E:
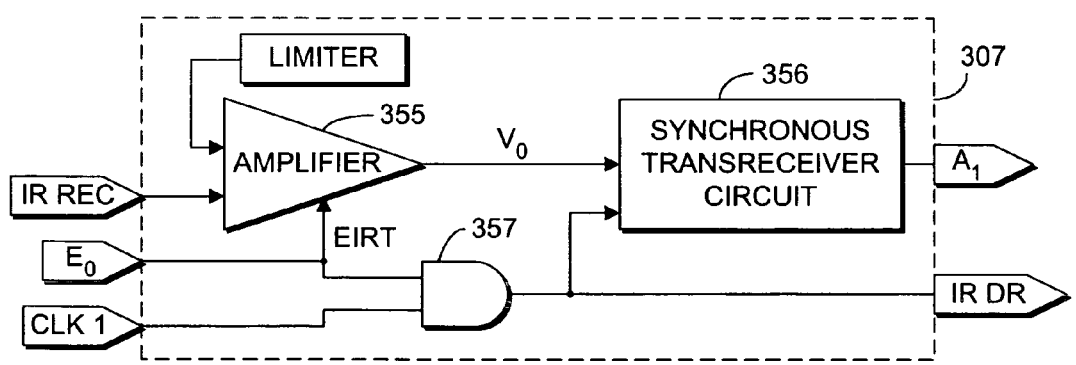
FIG. 10E is a block functional diagram of the IR-based object detection circuit in the bar code symbol reading system of FIGS. 10A1 through 10A4.

In accordance with the present invention, the purpose of object detection circuit 307 is to produce a first control activation signal $A_1=1$ upon determining that an object (e.g. product, document, etc.) is present within the object detection field 9 of the bar code symbol reading device, and thus at least a portion of the bar code detection field 10. In the illustrative embodiment automatic object detection is employed. It is understood, however, that "passive" techniques may be used with acceptable results. As shown in FIG. 10E, the object detection circuit 307 comprises two major subcomponents, namely object sensing circuit 306 and object detection circuit 307, both of which are locally controlled by control circuit $C_1$. In the illustrative embodiment, object sensing circuit 306 comprises an IR LED 206A driven by an IR transmitter drive circuit 349, and an IR phototransistor (or photodiode) 206B activated by an IR receive biasing circuit 358. These components are arranged and mounted on the PC board so as to provide an object detection field 9 that spatially encompasses the laser scanning plane, as described above. As shown in FIGS. 10A1 through 10A4, the object detection circuit 307 produces an enable signal IR DR which is provided to the IR transmitter drive circuit 349. The signal produced from IR phototransistor 206B, identified as IR REC, is provided as input signal to the object detection circuit 307 for signal processing in a manner which will be described in detail below. In the illustrative embodiment, IR LED 206A generates a 900 nanometer signal that is pulsed at the rate of the primary oscillation circuit 301A (e.g. 1.0 KHZ) when the object detection circuit 307 is enabled by enable signal $E_0$ produced from the first control circuit $C_1$. Preferably, the duty cycle of the primary oscillation circuit 301A is less than 1.0% in order to keep the average current consumption very low.

Alternatively, the automatic bar code reading device of the present invention can be readily adapted to sense ultrasonic energy reflected off an object present within the object detection field 9. In such an alternative embodiment, object sensing circuit 306 is realized as an ultrasonic energy transmitting/receiving mechanism. In the housing of the bar code reading engine, an ultrasonic energy signal is generated and transmitted forwardly into the object detection field 9. Then, ultrasonic energy reflected off an object within the object detection field 9 is detected adjacent to the transmission window using an ultrasonic energy detector (integrated with the housing) producing an analog electrical signal (i.e. UE REC) indicative of the detected intensity of received ultrasonic energy. Preferably, a focusing element is disposed in front of the energy detector in order to effectively maximize the collection of ultrasonic energy reflected off objects in the object detection field. In such instances, the focusing element essentially determines the geometrical characteristics of the object detection field of the device. Consequently, the energy focusing (i.e. collecting) characteristics of the focusing element will be selected to provide an object detection field which spatially encompasses at least a portion of the laser-based bar code symbol detecting and readings fields. The electrical signal produced from the ultrasonic-energy based object sensing circuit is provided to the object detection circuit 307 for processing in the manner described above.

Figure 10F:
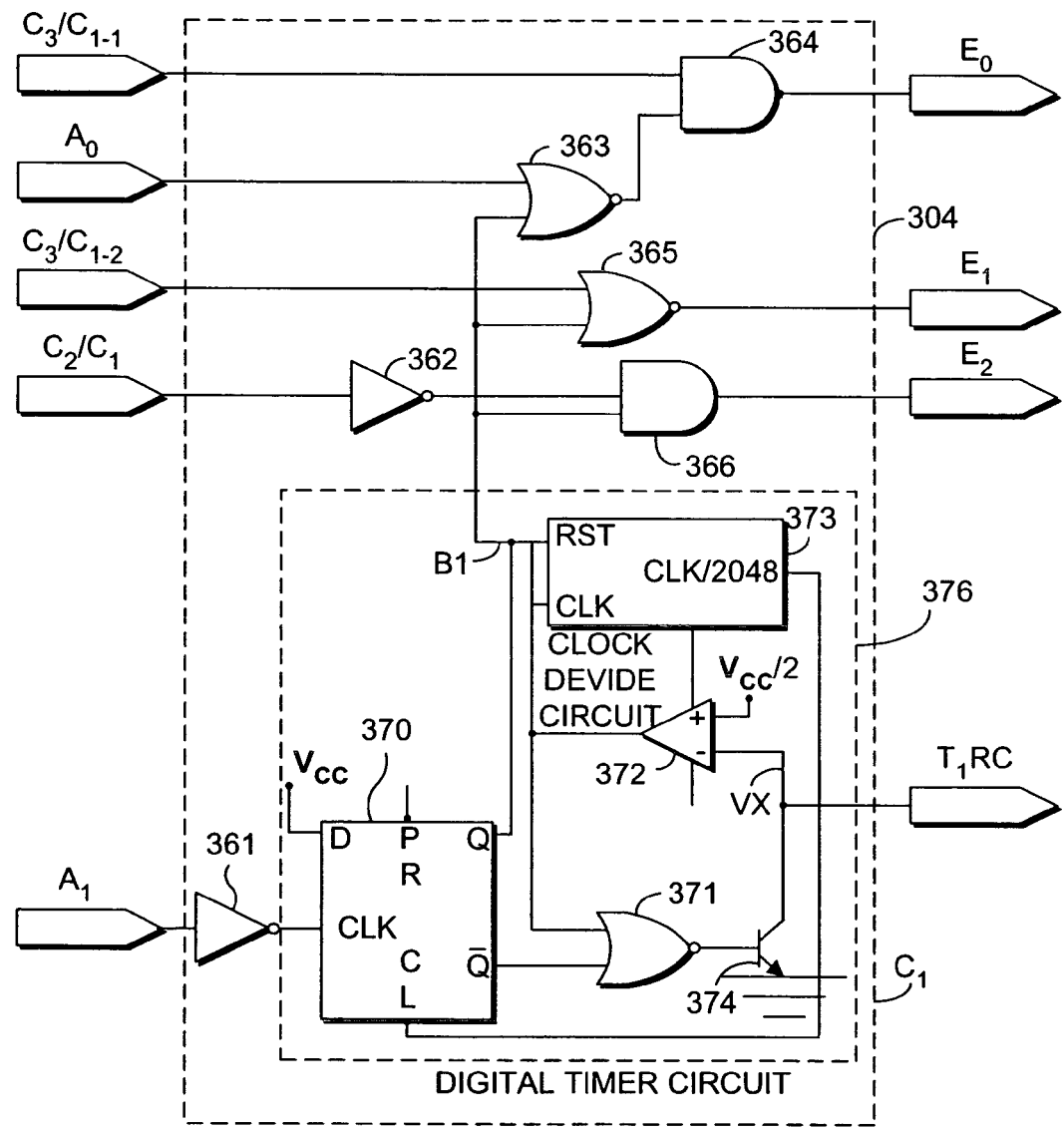
FIG. 10F is a functional logic diagram of the first control circuit ($C_1$) of the control subsystem of FIGS. 10A1 through 10A4.
Figure 10G:
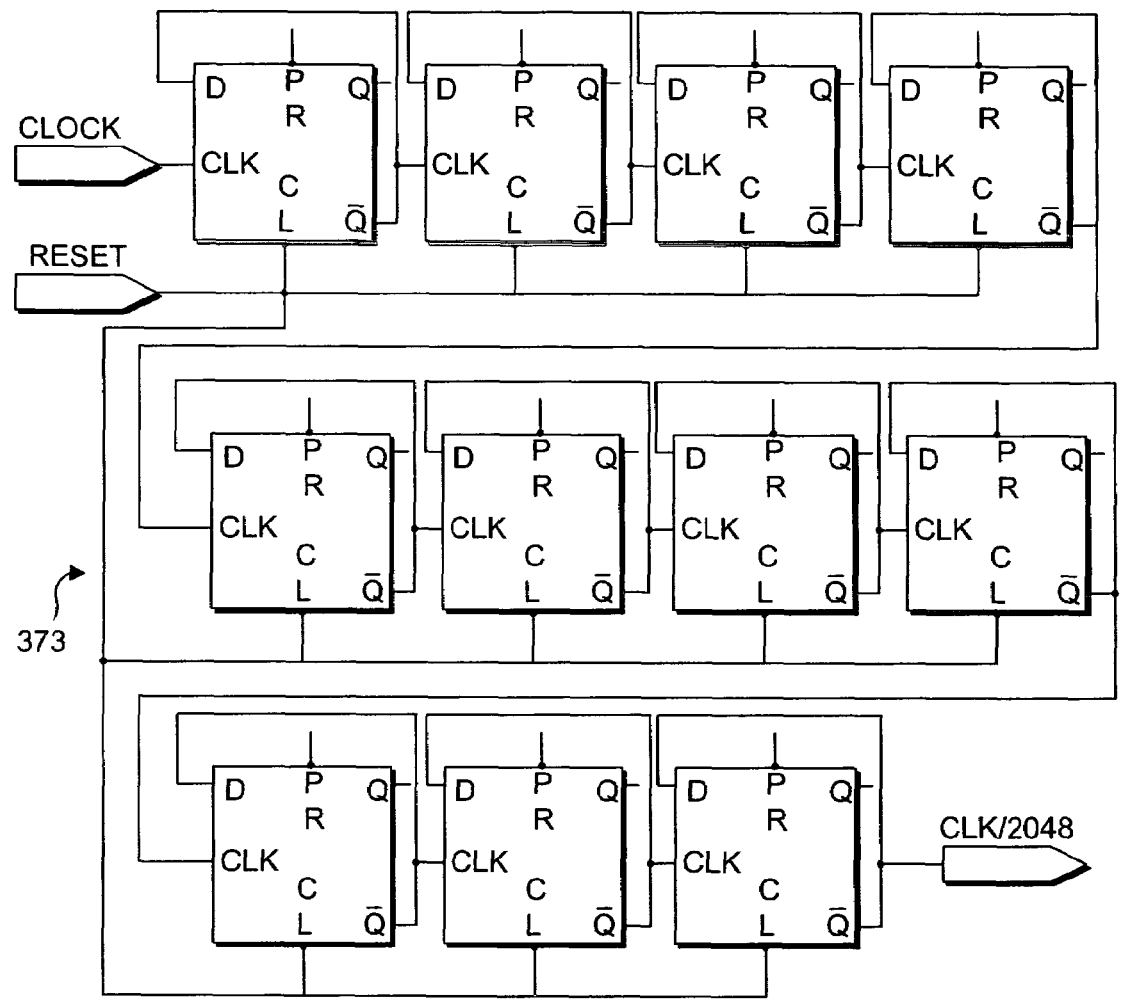
FIG. 10G is a functional logic diagram of the clock divide circuit in the first control circuit $C_1$ of FIG. 10F.

Referring to FIG. 10F, the first control logic block $C_1$ will be described in greater detail. In general, the function of the first control logic block $C_1$ is to provide the first level of system control. This control circuit activates the object detection circuit 307 by generating enable signal $E_0=1$, it activates laser beam scanning circuit 308, photoreceiving circuit 309 and A/D conversion circuit 310 by generating enable signal $E_1=1$; it also activates bar code symbol detection circuit 311 by generating enable signal $E_2=1$. In addition, the first control circuit $C_1$ provides control lines and signals in order to control these functions, and provides a system override function for the low power standby mode in the bar code symbol reading engine. In the illustrative embodiment, the specific operation of first control circuit $C_1$ is dependent on the state of several sets of input signals (i.e. activation control signal $A_0$ and $A_1$, and override signals $C_2/C_1$, $C_3/C_{1-1}$ and $C_3/C_{1-2}$) and an internally generated digital timer signal B1. A preferred logic implementation of the first control circuit $C_1$ is set forth in FIGS. 10F and 10G. The functional dependencies among the digital signals in this circuit are represented by the Boolean logic expressions set forth in the Table of FIG. 10H, and therefore are sufficient to uniquely characterize the operation of first control circuit $C_1$.

As illustrated in FIGS. 10A1 through 10A4, laser scanning circuit 308 comprises a light source 377 which, in general, may be any source of intense light suitably selected for maximizing the reflectivity from the object bearing a bar code symbol. In the preferred embodiment, light source 377 comprises a solid-state visible laser diode (VLD) which is driven by a conventional driver circuit 378. In the illustrative embodiment, the wavelength of visible laser light produced from the laser diode is preferably about 670 nanometers. In order to repeatedly scan the produced laser beam over the scanning field (having a predetermined spatial extent in front the light transmission window), any number of laser beam scanning mechanisms described herein can be used. In FIGS. 10A1 through 10A4, the scanner driver air unit is schematically depicted by reference numeral 381. As the scanning mechanism can be realized in a variety of different ways, as illustrated herein above, a scanner motor 380 is used to represent this structure in the system. Notably, this scanning motor 380 need not be electro-mechanical in nature, but may be based on electro-optical beam scanning/steering principles employing, for example, cholesteric liquid crystal (CLC) laser beam steering technology known in the art. Thus, the term "scanning motor" as used herein is understood as any means for moving, steering, swinging or directing the path of a light beam through space during system operation for the purpose of obtaining information relating to an object and/or a bar code symbol.

As shown in the generalized system diagram of FIGS. 10A1 through 10A4, laser diode 377 and scanning motor 380 are enabled by enable signal $E_1$ provided as input to driver circuits 378 and 381. When enable signal $E_1$ is a logical "high" level (i.e. $E_1=1$), a laser beam is generated and projected through the light transmissive window, and repeatedly scanned across the bar code symbol detection field, and an optical scan data signal is thereby produced off the object (and bar code) residing within the bar code symbol detection field 10. When laser diode and scanning motor enable signal $E_1$ is a logical "low" (i.e. $E_1=0$), there is no laser beam produced, projected, or scanned across the bar code symbol detection field 10.

When a bar code symbol is present on the detected object at the time of scanning, the user visually aligns the visible laser beam across the bar code symbol, and incident laser light on the bar code will be scattered/reflected (typically according to Lambert's Law). This scattering/reflection process produces a laser light return signal of variable intensity which represents a spatial variation of light reflectivity characteristics of the pattern of bars and spaces comprising the scanned bar code symbol. Photoreceiving circuit 309 detects at least a portion of the reflected laser light of variable intensity and produces an analog scan data signal $D_1$ indicative of the detected light intensity.

In response to reflected laser light focused onto photoreceiver 385, the photoreceiver produces an analog electrical signal which is proportional to the intensity of the detected laser light. This analog signal is subsequently amplified by preamplifier 387 to produce analog scan data signal $D_1$. In short, laser scanning circuit 308 and photoreceiving circuit 309 cooperate to generate analog scan data signals $D_1$ from the scanning field (i.e. bar code detection and reading fields), over time intervals specified by first and second control circuits $C_1$ and $C_2$ during normal modes of operation, and by third control module $C_3$ during "control override" modes of operation.

Figures 10H, 10I:
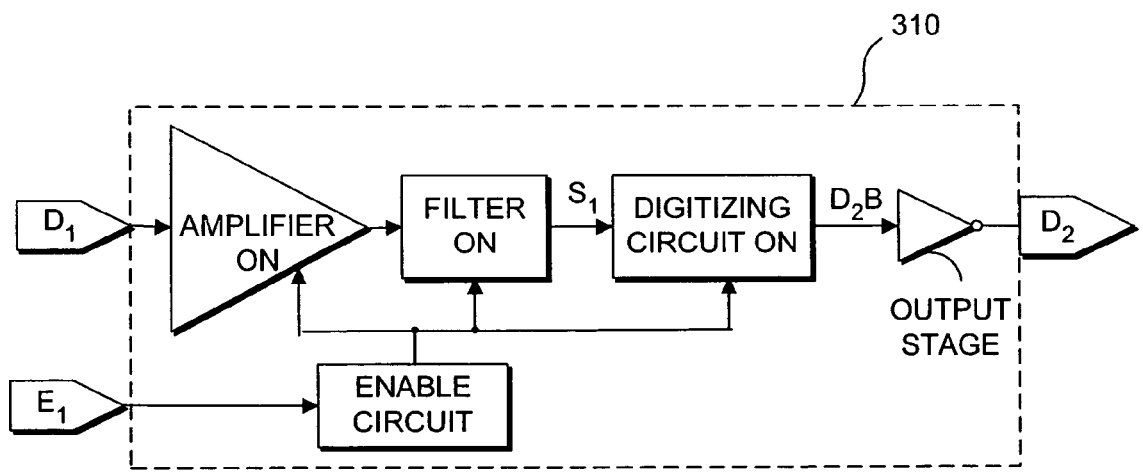
FIG. 10H is table setting forth Boolean logic expressions for the enabling signals produced by the first control circuit $C_1$.
FIG. 10I is a functional block diagram of the analog to digital (A/D) signal conversion circuit in the ASIC chip in the bar code symbol reading system of FIGS. 10A1 through 10A4.

As illustrated in FIG. 10I, analog scan data signal $D_1$ is provided as input to A/D conversion circuit 310. In a manner well known in the art, A/D conversion circuit 310 processes analog scan data signal $D_1$ to provide a digital scan data signal $D_2$ which has a waveform that resembles a pulse width modulated signal, where the logical "1" signal levels represent spaces of the scanned bar code symbol and the logical "0" signal levels represent bars of the scanned bar code symbol. The A/D conversion circuit 310 can be realized using any conventional A/D conversion technique well known in the art. Digitized scan data signal $D_2$ is then provided as input to bar code symbol detection circuit 311 and symbol decoding module 319 for use in performing particular functions required during the bar code symbol reading process of the present invention.

Figure 10J:
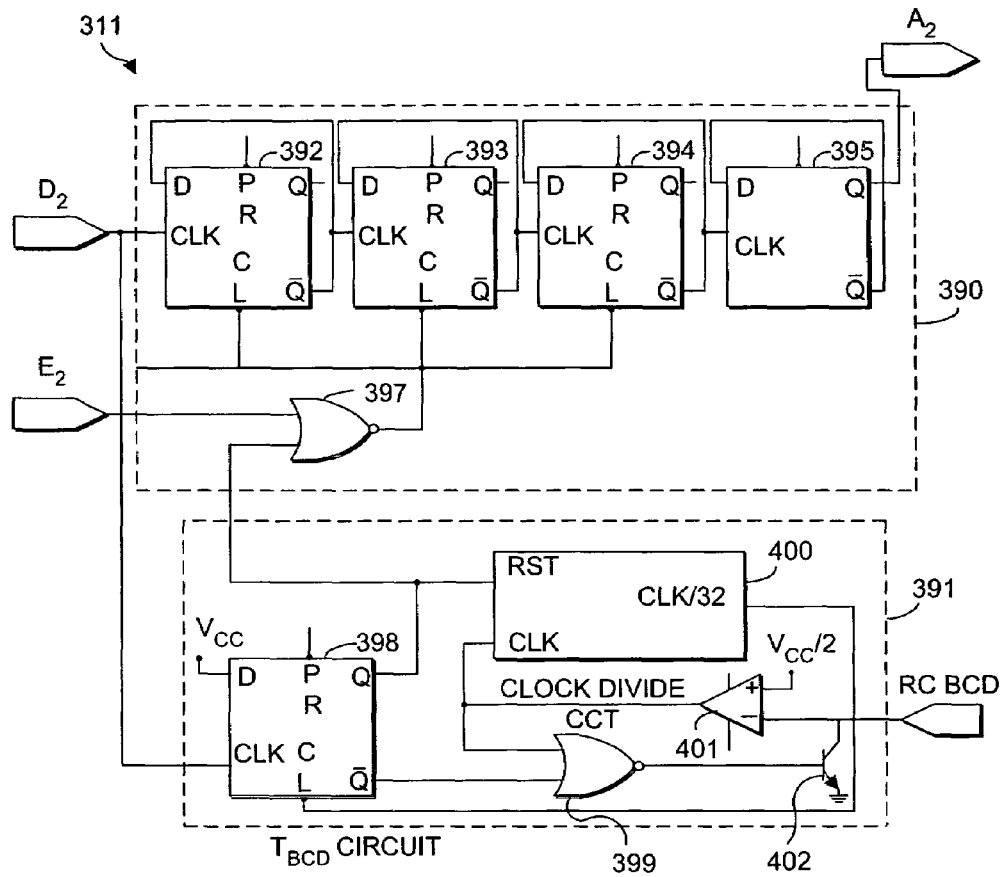
FIG. 10J is a functional logic diagram of the bar code symbol (presence) detection circuit in the ASIC chip in the bar code symbol reading system of FIGS. 10A1 through 10A4.
Figure 10K:
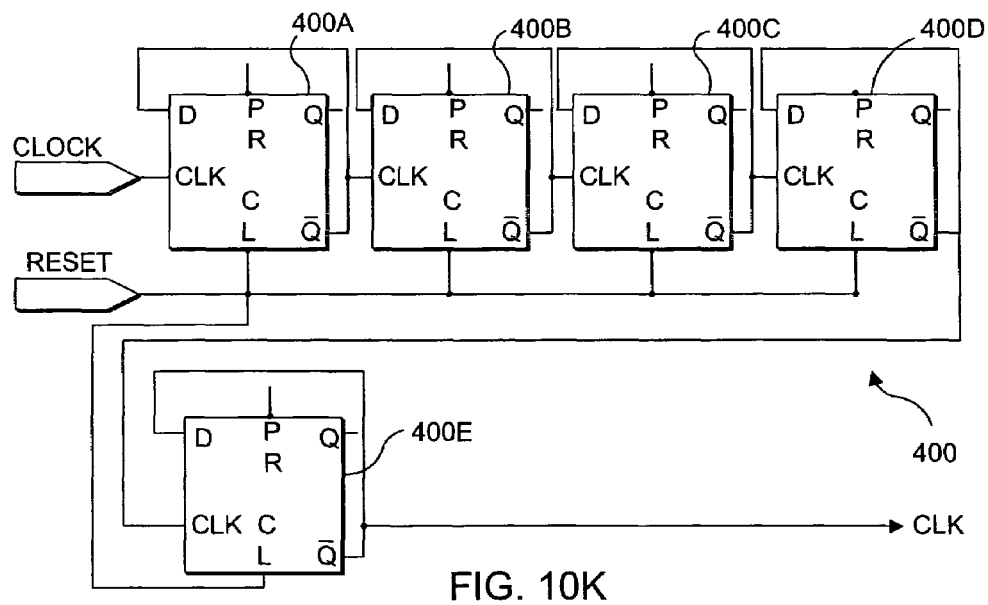
FIG. 10K is a functional logic diagram of the clock divide circuit in the bar code symbol detection circuit of FIG. 10J.

In FIG. 10J, the bar code symbol detection circuit 311 of the illustrative embodiment is shown in greater detail. The primary purpose of bar code symbol detection circuit 311 is to determine whether a bar code is present in or absent from the bar code symbol detection field 10, over time intervals specified by first control circuit $C_1$ during normal modes of operation, and by third control module $C_3$ during control override modes of operation. In the illustrative embodiment, bar code symbol detection circuit 311 indirectly detects the presence of a bar code in the bar code symbol detection field 10 by detecting its bar code symbol "envelope". In the illustrative embodiment, a bar code symbol envelope is deemed present in the bar code symbol detection field 10 upon detecting a corresponding digital pulse sequence in digital signal $D_2$ which A/D conversion circuit 310 produces when photoreceiving circuit 309 detects laser light reflected off a bar code symbol in the bar code symbol detection field 10. This digital pulse sequence detection process is achieved by counting the number of digital pulse transitions (i.e. falling pulse edges) that occur in digital scan data signal $D_2$ within a predetermined time period $T_1$ clocked by the bar code symbol detection circuit. According to the laws of physics governing the laser scanning mechanism employed within the implementation of the system, the number of digital (pulse-width modulated) pulses detectable at photoreceiver 385 during time period $T_1$ is a function of the distance of the bar code from the light transmission window 311 at the time of scanning. Thus, a bar code symbol scanned at 6" from the light transmission window will produce a larger number of digital pulses (i.e. digital count) at photoreceiver 385 during time period $T_1$ than will the same bar code symbol scanned at 3" from the light transmission window.

When an object is detected in the object detection field 9, first control circuit Cl produces enable signal $E_2=1$ so as to enable digital pulse transition counter 390 for a time duration of $T_1$. As shown, the digital scan data signal $D_2$ (representing the bars and spaces of the scanned bar code) drives the clock line of first flip flop 392, as well as the CLK line of flip flop circuit 398 in the $T_{BCD}$) digital timer circuit 391. The first pulse transition in digital scan data signal $D_2$ starts digital timer circuit 391. The production of each count reset pulse CNT RESET from digital timer circuit 391 automatically clears the digital pulse transition counter circuit 390, resetting it once again to count the number of pulse transitions present in the incoming digital scan data signal $D_2$ over a new time subinterval $T_{BCD}$. The Q output corresponding to eight pulse transitions counted during time period $T_{BCD}$, provides control activation signal $A_2$. When the presence of a bar code in the bar code symbol detection field 10 is detected, the second activation control signal $A_2$ is generated, the third control circuit $C_3$ is activated and second control circuit $C_2$ is overridden by the third control circuit $C_3$ through the transmission of control override signals (i.e. $C_3/C_2$ inhibit and $C_3/C_1$ enable signals) from the third control circuit $C_3$.

Upon entering the bar code symbol reading state, the third control module $C_3$ provides override control signal $C_3/C_{1-2}$ to the first control circuit $C_1$. In response to control signal $C_3/C_{1-2}$, the first control circuit $C_1$ produces enable signal $E_1 32$ 1 which enables the laser scanning circuit 308, photo-receiving circuit 309 and A/D conversion circuit 310. In response to control signal $C_3/C_2$, the first control circuit $C_1$ produces enable signal $E_2=0$, which disables bar code symbol detector circuit 311. Thereafter, the third control module $C_3$ produces enable signal $E_4=1$ to enable symbol decoding module 319. In response to the production of such signals, the symbol decoding module 319 decode processes, scan line by scan line, the stream of digitized scan data contained in signal $D_2$ in an attempt to decode the detected bar code symbol within the second predetermined time period $T_2$ established and monitored by the third control module $C_3$. If the symbol decoding module 319 successfully decodes the detected bar code symbol within time period $T_2$, then symbol character data $D_3$ (representative of the decoded bar code symbol and typically in ASCII code format) is produced. Thereupon symbol decoding module 319 produces and provides the third control activation signal $A_3$ to the third control module $C_3$.

If the data transmission control activation signal $A_4=1$ has been produced by manually-activatable switch 303 within a predetermined time duration (i.e. time frame) set by a timer within the third control module $C_3$, then the third control module $C_3$ automatically induces a state transition from the bar code symbol reading state to the data (packet) transmission state. In response thereto, three distinct events are programmed to occur. Firstly, the third control module $C_3$ automatically produces and provides enable signal $E_5$ to data packet synthesis module 320. Secondly, symbol decoding module 319 stores symbol character data $D_3$ in a memory buffer associated with data packet synthesis module 320. Thirdly, the third control module $C_3$ produces and provides enable signal $E_7$ to the data packet transmission circuit 321. These enabling events activate the data (packet) transmission subsystem shown in FIGS. 10A1 through 10A4. Upon activation of the data packet transmission subsystem, the subsequently produced symbol character data string is transmitted to the base unit 440 and therefrom to the host computer 441.

Alternatively, upon generation of control activation signals $A_3=1$ and $A_4=1$ within the time period established by the third system control module $C_3$, a different set of events can be programmed to occur. For example, the third control module $C_3$ can produce and provide enable signal $E_6$ to the data storage module, and thereafter produce and provide enable signal $E_7$ to the data transmission circuit 321. These enabling events activate the data (packet) transmission subsystem of the system to operate in different ways depending on whether the in-range or out-of-range indication control signal $A_5$ is generated by the Bluetooth® RF transceiver chipset 803 aboard the bar code symbol reading device. If the value of the activation control signal is $A_5=1$, then the data packet transmission subsystem automatically transmits the selected symbol character data string to the base unit 440, and therefrom to the host computer 441. If the value of the activation control signal is $A_5=0$, then the data packet transmission subsystem automatically transmits the selected/packaged symbol character data string to the on-board Data Packet Group Buffer 802, for storage until the bar code symbol reading device is moved back within the predetermined RF-based data communication range of the system.

In the illustrated embodiment, symbol decoding module 319, data packet synthesis module 320, and timers $T_2$, $T_3$, $T_4$ and $T_5$ are each realized using programmed microprocessor and accessible memory 334. Similarly, the third control module $C_3$ and the control functions which it performs at Blocks I to GG in FIGS. 14A1 through 14C4, for example, are realized as a programming implementation using techniques well known in the art.

The function of data packet synthesis module 320 is to use the produced symbol character data to synthesize a group of data packets for subsequent transmission to its mated base unit 440 by way of data packet transmission circuit 321. The function of the data storage module 322 is to buffer packaged symbol character data strings until ready to be either transmitted to the base station 440' by way of the data packet transmission circuit 321 via wireless electromagnetic data transmission/reception, or temporary storage within the data packet group buffer 802.

Figure 10O:
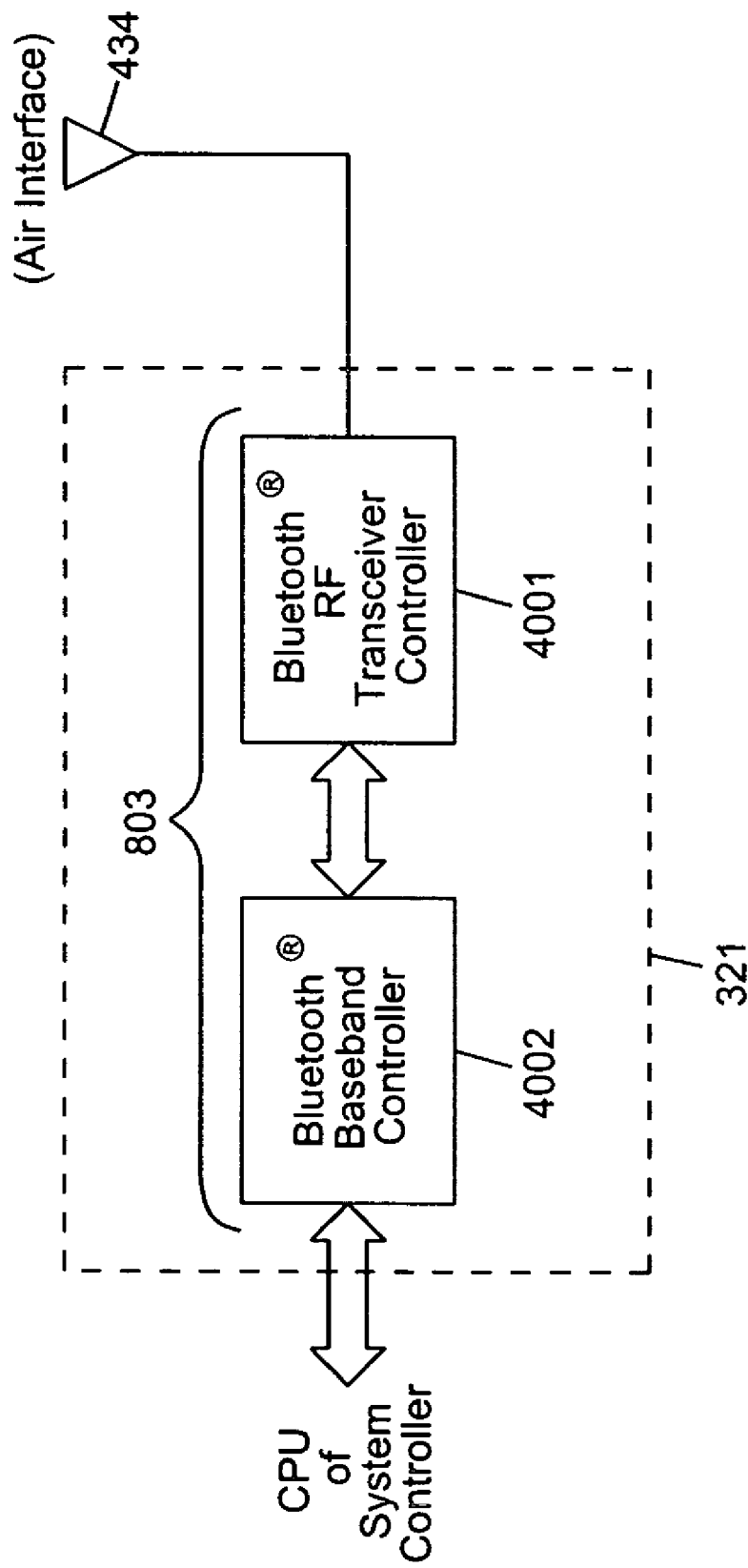
FIG. 10O is a functional block diagram of the data packet transmission circuit employed in the wireless bar code symbol reading system of FIGS. 10A1 through 10A4, showing the arrangement of a Bluetooth® baseband controller (i.e. Phillips PCF877750 IC) interfaced with the system controller, a Bluetooth® RF transceiver module (i.e. Phillips UAA3558 IC) interface with the baseband controller, and a ceramic antenna element configured with the RF transceiver module and interfaced with free-space.

As shown in FIG. 10O, the data packet transmission circuit 321 of the illustrative embodiment comprises several modules, namely: a Bluetooth® RF tranceiver module 400 (i.e. BG100 TrueBlue Bluetooth radio module by Phillips Electronics); and a Bluetooth® baseband controller module 4002 (i.e. PCF87750 Bluetooth Baseband Controller by Phillips Electronics) arranged with the RF transceiver module 4001. Currently, Bluetooth™ 2-way RF data communication link technology currently has a radio range of approximately 10 m (30 ft), or 100 m optionally, with greater ranges under development. The Bluetooth™ communication protocol employed in the wireless system of this illustrative embodiment enables the reader to operate within a 10 m range, but this range can vary from embodiment to embodiment, as advances in the Bluetooth® RF Communication Specification occur.

As described in Phillips Electronics brochures, the BGB100 TrueBlue Bluetooth radio module 4001 is a short-range radio transceiver for wireless links operating in the globally available ISM band, between 2402 and 2480 MHz. It is composed of a fully integrated, state-of-the-art near-zero-IF transceiver chip, an antenna filter for out-of-band blocking performance, a TX/RX switch, TX and RX baluns, the VCO resonator and a basic amount of supply decoupling. The device is a "Plug-and-Play" module that needs no external components for proper operation. Robust design allows for untrimmed components, giving a cost-optimized solution. Demodulation is done in open-loop mode to reduce the effects of reference frequency breakthrough on reception quality. An advanced offset compensation circuit compensates for VCO drift and RF frequency errors during open-loop demodulation, under control by the baseband processor. The circuit is integrated on a ceramic substrate. It is connected to the main PCB through a LGA (Land Grid Array). A metal cap suppresses the effect of EMI (Electro Magnetic Interference). The RF port has a normalized 50 Ω transmission line. The interfacing to the baseband processor is very simple, which leads to a low-power solution. Control of the module operating mode is done through a 3-wire serial bus and two timing signals. TX and RX data I/O lines are analogue-mode interfaces. A high-dynamic range RSSI output allows near-instantaneous assessment of radio link quality. Frequency selection is done internally by a conventional synthesizer. It is controlled by the same serial 3-wire bus. The synthesizer accepts reference frequencies of 12, 13, 16 and 26 MHz. This reference frequency should be supplied by an external source. This can be a dedicated (temperature compensated) crystal oscillator or be part of the baseband controller. The circuit is designed to operate from 3.0 V nominal supplies. Separate ground connections are provided for reduced parasitic coupling between different stages of the circuit. There is a basic amount of RF supply decoupling incorporated into the circuit. The envelope is a leadless SOT649A package with a metal cap.

As described in Phillips Electronics brochures, the PCF87750 Bluetooth Baseband Controller 4002 is a flexible baseband controller for use with the Bluetooth® BGB 100 TrueBlue Bluetooth radio module 4001. The PCF87750 Baseband Controller comprises an ARM7TDMI microcontroller, SRAM (static RAM), firmware memory, Bluetooth core, interface circuits, a CVSD codec, voice path A/D and D/A conversion and power management. This results in a one-chip implementation of the complete baseband for Bluetooth. This device offers power management to reduce the power of those blocks which are not actively processing. There are 2 device pinouts available from the PCF87750: Fully integrated device with on-chip memory; and Emulation device (for development and emulation only). The PCF87750 incorporates the Phillips Semiconductors UAA3558/3559 interface, as well as the Ericsson Siri radio interface.

The details on how to integrate (i.e. embed) Bluetooth™ RF-based 2-way data communication chip set module technology into wireless applications is generally well known in the RF art, and reference can be made to supporting documentation located at the official Bluetooth™ Website http:www.bluetooth.com, which is hereby incorporated herein by reference in its entirety as if set forth fully herein. During implementation of the present invention, the Bluetooth™ RF module 4001 associated with the Bluetooth® RF transceiver chipset 803 is directly connected to the CPU (i.e. microcontroller) of the wireless bar code treader and it notifies the CPU in the wireless bar code reader when the wireless RF communication link has been established between the wireless bar code reader and the base station, as well as when the communication link has been severed or disrupted.

In the preferred embodiment, the wireless data communication method of the present invention described hereinabove is implemented by programming the system control software in the bar code symbol reader to always store, in its memory, its current "link status" with the base station which is indicated by $A_5=1$ when the link status is GOOD, and $A_5=0$ when the link status is NO GOOD. This link status information is maintained by monitoring the strength of RF-based "heartbeat signals" (i.e. reference signals) periodically transmitted from the base station to the wireless bar code symbol reader during all modes of system operation. When the data transmission activation button 330 is pressed during or immediately after a valid read of a bar code symbol, the system control software in the wireless bar code reader first checks the status of its wireless link with the base station. If the RF link has been established, which means that the base station (i.e. its Bluetooth® RF transceiver chipset) is in range of the wireless bar code reader (i.e. its Bluetooth® RF transceiver chipset), then the wireless bar code reader transmits the stored and packaged symbol character data immediately to the base station. If the RF communication link has not been established, which means that the base station (i.e. Bluetooth® RF transceiver chipset) is out of range of the bar code symbol reader (i.e. Bluetooth® RF transceiver chipset), then the wireless reader does not attempt to transmit the packaged symbol character data to the base station. Instead, the Bluetooth® RF transceiver chipset in the wireless bar code reader periodically monitors the link status of the system (i.e. between the bar code reader and the base station) until a suitable RF link is reestablished therebetween. If so, then the wireless bar code symbol reader either (i) transmits the stored packaged symbol character data to the base station over the re-established RF communication link, or alternatively, (ii) waits until a new bar code symbol has been read, and when this event occurs, then old packaged symbol character data string discarded and then the current packaged symbol data string is transmitted to the base station over the RF communication link. The system controller within the wireless bar code symbol reader, and correspondingly the base station controller in the base station, can be programmed in a straightforward manner to determine if either modes (i) or (ii) shall occur during system operation.

In an alternative embodiment of the present invention, the control process within the wireless bar code symbol reading system described herein can also be programmed in various sways to carry out additional functionalities which create value for the user of the system.

For example, the control process within the wireless system of the present invention can be programmed so that after the first time the wireless bar code symbol reader reads a bar code symbol while the data transmission switch is actuated, the produced symbol character data is automatically transmitted to the base unit, and thereafter, the laser light source within the wireless bar code symbol reader is deactivated and locked. Then, after the base unit receives the correct symbol character data, it will automatically send an ACK command back to the wireless bar code symbol reader, and then the laser light source therein can be unlocked and re-enabled. Then the second read can be processed. Notably, this system control process, between both the wireless bar code symbol reader and its base station, provides a strict method of conserving electrical battery power aboard the wireless bar code symbol reader which is significant in wireless portable bar code symbol reading and data collection operations.

The control process within the wireless system of the present invention may also be programmed to require the user to press the data transmission activation button (i.e. switch) on the wireless bar code symbol reader an additional time so as to enable the transmission of the packaged symbol character data string to the base station, i.e. after the wireless bar code symbol reader has just established a new communication link with its base station. This feature would X allow the user to rescan a different bar code symbol so as to overwrite symbol character data within buffer memory before the data is transmitted to the base station, and ultimately the host system.

The control process within the wireless system of the present invention can be programmed to (i) enable multiple reads (i.e. selected symbol character strings) to be stored in buffer memory aboard the wireless bar code symbol reader, and (ii) require that the data i transmission activation switch 330 be depressed (i.e. actuated) to enable the transmission of such symbol character data to the base station via the wireless RF-based data communication link.

The control process within the wireless system of the present invention can be programmed so that (i) all three LEDs on the wireless bar code symbol reader illuminate to indicate that wireless reader is out of its predetermined data communication range, as well as (ii) all three LEDs illuminate to indicate that there is stored data in the Data Packet Group Buffer 802 waiting to be transmitted to the base station upon the re-establishment of the wireless RF communication link between the wireless bar code symbol reader and its base station.

The control process within the wireless system of the present invention can be programmed so that collected and buffered packaged symbol character data can be cleared from memory (aboard the wireless bar code symbol reader) by holding down the data transmission activation switch 330 for a programmed duration (e.g. 3 seconds).

The control process within the wireless system of the present invention can be programmed so that it tests its data communication link before transmission of data packets buffered in memory. With this feature, the system can avoid losing packaged symbol character data caused by the disconnection of the RF communication link between the wireless bar code symbol reader and its base station. Before the wireless bar code symbol reader transmits symbol character data to its base station, it will test the connection first; and if the connection is broken, then the wireless reader will hold the barcode data and try to establish the connection. When the connection is established again, then the wireless reader will send the stored barcode to its base station.

FIGS. 46A1 through 46C4 illustrates the steps involved in the control process carried out by the control subsystem of the bar code symbol reading system of FIGS. 45A1 through 45A4. This process is similar to the process shown in FIGS. 20A1 through 20E, except for at Blocks Y through FF shown in FIGS. 46C2 and 46C3 which relate to the range-dependent data packet transmission control feature of the present invention.

The system shown in FIGS. 43A through 46C8 also embodied a number of other technical features which shall now be specified below.

For example, a mechanical vibrator can be included within the hand-supportable housing of the wireless device so that when scan data transmission from the reader to the base station is successful, then the reader automatically vibrates. The mechanical vibrator would be arranged under the control of $C_3$ Control Module. In a noisy environment, this feature should provide a clear signal to the operator that the transmission status has been successful.

When wireless reader of the present invention switches into its sleep mode (however it was caused to enter this date), the baseband (micro)controller 4002 used within each Bluetooth™ RF transceiver chipset (aboard the wireless reader and base station alike) will issue the disconnect commands, causing the RF data communication link between the wireless bar code reader (i.e. or data terminal) and its base station to be terminated. Thereafter, these baseband microcontrollers 4002 enter an idle mode and the associated Bluetooth™ RF transceiver chipsets are automatically driven into a low power mode of operation. When the wireless reader is woken up from its sleep mode, these baseband microcontrollers are also woken up at the same time, and the Bluetooth® radio transceiver modules are activated and the RF communication link is reestablished. All of these actions are automatically carried out within the wireless communication system of the present invention. All that the operator is required to do during such periods of non-operation is to push the data transmission activation switch 330 in order to wake up the system.

Another object of the present invention is to enable wireless update the firmware within the wireless bar code reader using the Internet. With this feature, the reader's firmware can be updated by a host computer. To achieve this, the host computer sends a command to base station then the base station will send the command to the wireless reader. Thereafter, the base station transmits firmware code (e.g. associated with the Bluetooth™ wireless data communications interface) from the host computer to the wireless bar code reader. Then using the updated code received by the wireless bar code reader, the reader can update its firmware according to these codes upon entering a firmware update mode of operation.

The detailed structure and internal functions of the wireless bar code symbol reading system of the first generalized system design have been described in detail above. The operation of the control system thereof is described in the system block diagram shown in FIGS. 15A1-15A4 and control Blocks A to GG shown in FIGS. 20A1 to 20E. As illustrated in FIG. 15, the wireless automatic hand-supportable bar code reading system has four basic states of operation, namely: object detection, bar code symbol presence detection, bar code symbol reading, and symbol character data transmission/storage. The nature of each of these states has been described above in great detail. Transitions between the various states are indicated by directional arrows. Besides each set of directional arrows are transition conditions expressed in terms of control activation signals (e.g. $A_1, A_2, A_3$ and $A_4$) and where appropriate, state time intervals (e.g. $T_1, T_2, T_3, T_4,$ and $T_5$). Conveniently, the state diagram of FIG. 21 expresses most simply the four basic operations occurring during the control flow within the system control program of FIGS. 20A1 to 20E. Significantly, the control activation signals $A_1, A_2, A_3$ and $A_4$ shown in FIG. 21 indicate which events within the object detection field 9, the bar code detection field 10 and/or the bar code reading fields 11 can operate to affect a state transition within the allotted time frame(s), where prescribed.

By virtue of this embodiment of the present invention, there is now provided an automatically-activated wireless laser scanning bar code symbol reading system for use in a work environment.

RF-Based Transceiving Base Station for Use with Automatically-Activated Bar Code Symbol Reading Device of the Present Invention In general, the base station in the wireless bar code reading system of the present invention performs two basic functions: (1) provide a 2-way RF packet communication interface with the wireless bar code symbol reader 41(791) using the Bluetooth® Wireless Communication Specification on the base station side of the wireless communication system; and (2) provide a data communication interface with the host system to which the base station 142(792) is connected.

Figure 11:
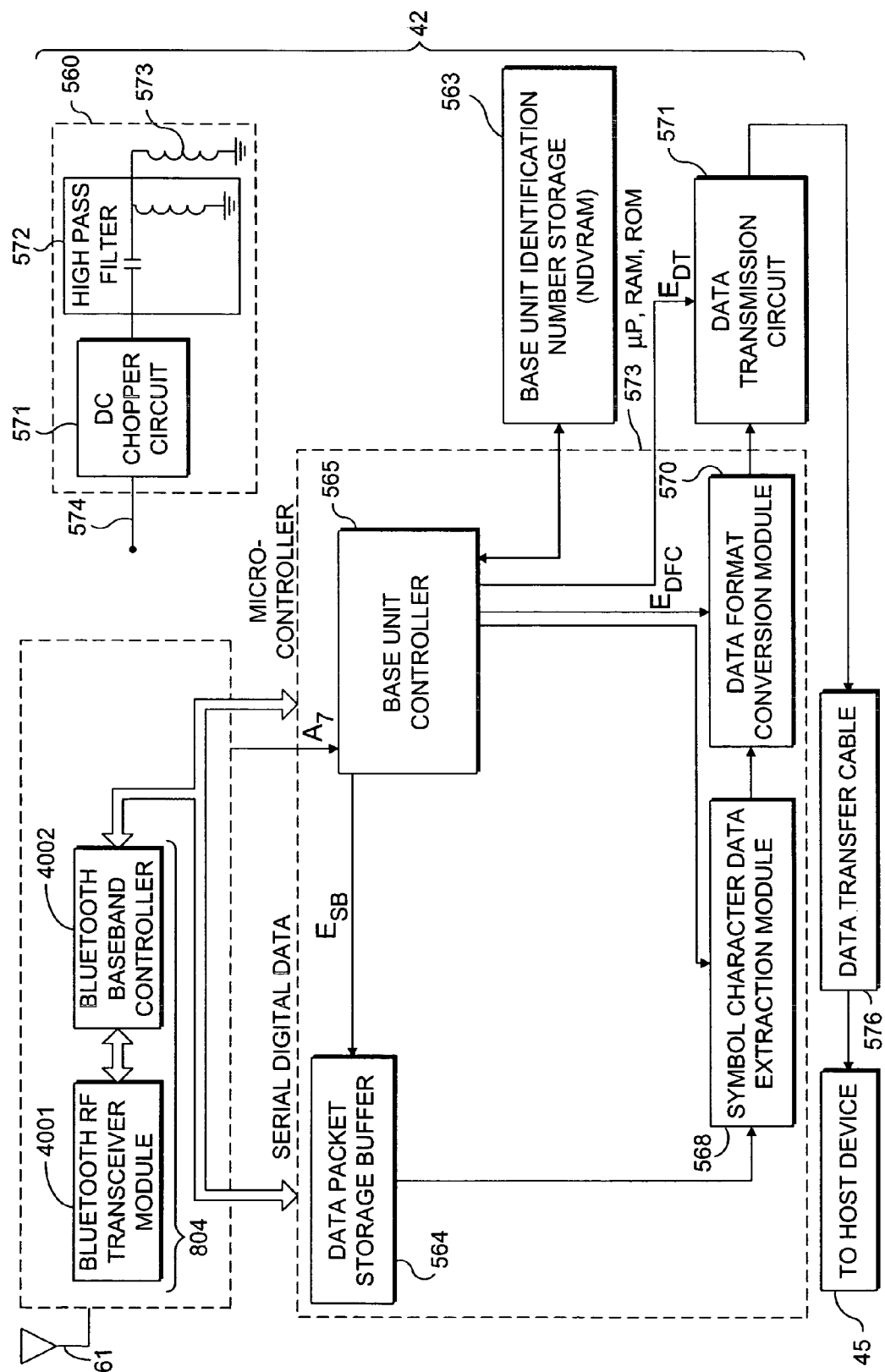
FIG. 11 is a functional block diagram of the data packet receiving and processing circuitry in the base unit of the illustrative embodiment, showing the arrangement of a Bluetooth® baseband controller (i.e. Phillips PCF877750 IC) interfaced with the base unit controller, a Bluetooth® RF transceiver module (i.e. Phillips UAA3558 IC) interfaced with the baseband controller, and a ceramic antenna element configured with the RF transceiver module and interfaced with free-space.
Figure 12:
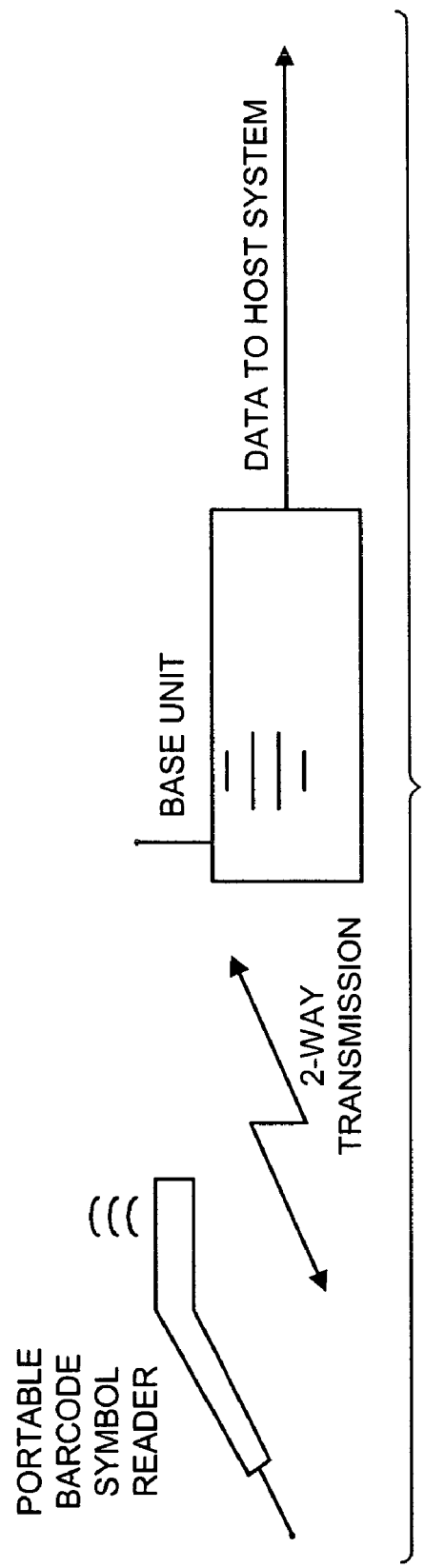
FIG. 12 is a schematic representation illustrating the 2-way RF communication method used to link the wireless bar code symbol reader hereof to its remote base unit, wherein the bar code symbol reader employs two-way wireless data packet transmission to the base unit employing frequency hopping technique supported by the use of the Bluetooth RF communication chipset.
Figure 14B:
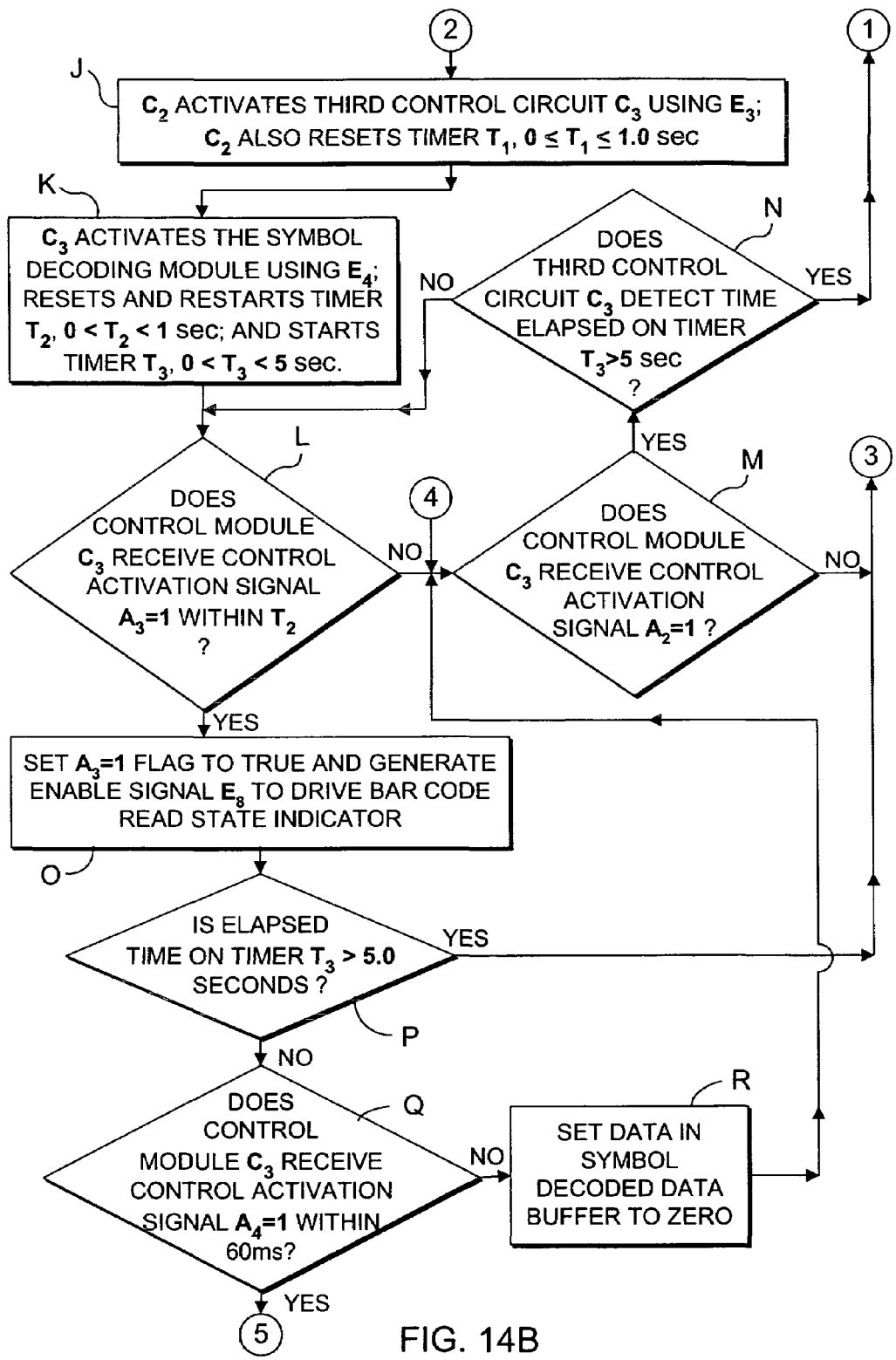

As shown in FIG. 11, the base station 42 comprises a number components, namely: a power supply circuit 560; a receiving antenna element 561; a Bluetooth®RF tranceiver module 4001 (i.e. BG100 TrueBlue Bluetooth radio module by Phillips Electronics) connected to the antenna element; and a Bluetooth® baseband controller module (i.e. PCF87750 Bluetooth Baseband Controller by Phillips Electronics) arranged with the RF transceiver module 4001; a data packet storage buffer 564; a base unit system controller 565; a symbol character data extraction module 569; a data format conversion module 570; and a serial data transmission circuit 571. In the illustrative embodiment, a programmed microprocessor and associated memory (i.e. ROM and RAM), indicated by reference numeral 573, are used to realize the base unit system controller 565 and each of the above-described data processing modules.

During implementation of the present invention, the Bluetooth™ RF module 4001 associated with the Bluetooth® RF transceiver chipset is directly connected to the CPU (i.e. microcontroller) of the base station and it notifies the CPU in the base station when the wireless RF communication link has been established between the wireless bar code reader and the base station, as well as when the communication link that been severed or disrupted.

In the preferred embodiment, the wireless data communication method of the present invention described hereinabove is implemented by programming the system control software in the base station 42 to transmit and receive RF-based "heart beat" signals to monitor the status of the RF communication link, and to logically reciprocate communication requests made by the wireless bar code symbol reader which serves as the source of information to be communicated across the RF communication link of the wireless bar code symbol reading system.

In the illustrative embodiment, it is also necessary to provide a means within the base station housing to recharge the batteries contained within the hand-supportable housing of the wireless bar code symbol reading device. Typically, DC electrical power will be available from the host computer system 45, to which the base station is operably connected by way of a flexible cable. An electrical arrangement for achieving this function is set forth in FIG. 37. As shown, power supply circuit 560 aboard the base unit of the present invention comprises a conventional current chopper circuit 571, a high-pass electrical filter 572 in parallel therewith, and a primary inductive coil 573 in parallel with the high-pass electrical filter. Low voltage DC electrical power provided from the host computer system by way of power cable 574 is provided to direct current (DC) chopper circuit 571, which is realized on PC board 558 using high-speed current switching circuits. The function of current chopper circuit 571 is to convert the input DC voltage to the circuit into a high-frequency triangular-type (time-varying) waveform, consisting of various harmonic signal components. The function of the high-pass electrical filter is to filter out the lower frequency signal components and only pass the higher frequency signal components to the inductive coil 573. As such, the high frequency electrical currents permitted to flow through inductive coil 573 induce a high voltage thereacross and produce time-varying magnetic flux (i.e. lines of force). In accordance with well known principles of electrical energy transfer, the produced magnetic flux transfers electrical power from the base unit to the rechargeable battery aboard the bar code symbol reading device, whenever the primary and secondary inductive coils aboard the base unit and the mated device are electromagnetically coupled by the magnetic flux. In order to maximize energy transfer between the base unit and its mated device during battery recharging operations, high permeability materials and well known principles of magnetic circuit design can be used to increase the amount of magnetic flux coupling the primary and secondary inductive coils of the battery recharging circuit.

Notably, the base station of the illustrative embodiment described above is realized in the form of a cradle-providing unit adapted to receive the wireless bar code symbol reader, support a Bluetooth® RF communication link therewith, while providing a means for recharging the batteries contained in the wireless device while it is supported within the cradle portion of the base station. The base station of the present invention can be realized in different form factors, such as, PCMICA cards, portable data collection base stations, and the like, as described in WIPO Publication No. WO 00/33239.

Figure 18B:
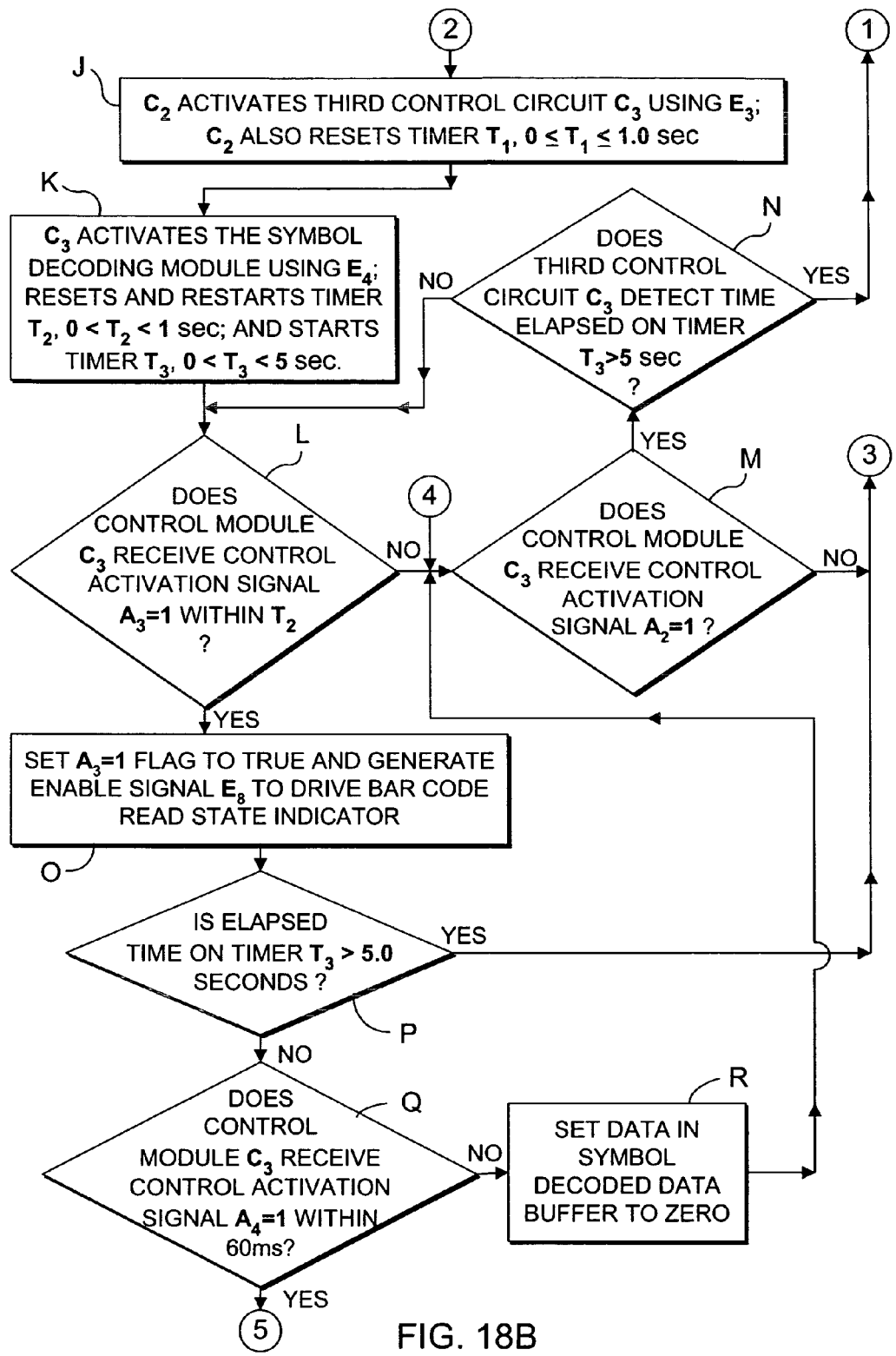

Wireless Automatic Hand-Supportable 2-D Bar Code Symbol Reading Device of the Present Invention with Automatic Range-Dependent Data Transmission Control Referring to FIGS. 16 through 18C4, a wireless automatic hand-supportable 2D (PDF417) bar code symbol reading system will now be described, that is capable of decoding all standard linear bar codes as well as certain 2-D codes, including PDF417, PDF417 truncated, and RSS composite. With a simple swipe of the easy-to-view laser line over the 2-D code, data is captured, decoded, and transmitted quickly and easily. For linear codes, the wireless 2D bar code symbol reading system operates in a fashion similar to the system shown in FIGS. 1A3 through 15, and described above. Simply aim the laser line on a desired bar code, swipe the 2D bar code symbol while pressing the data transmission button, and the data is transmitted over a wireless 2D RF communication link to its base station, and ultimately to the host system to which it is connected.

Figure 16:
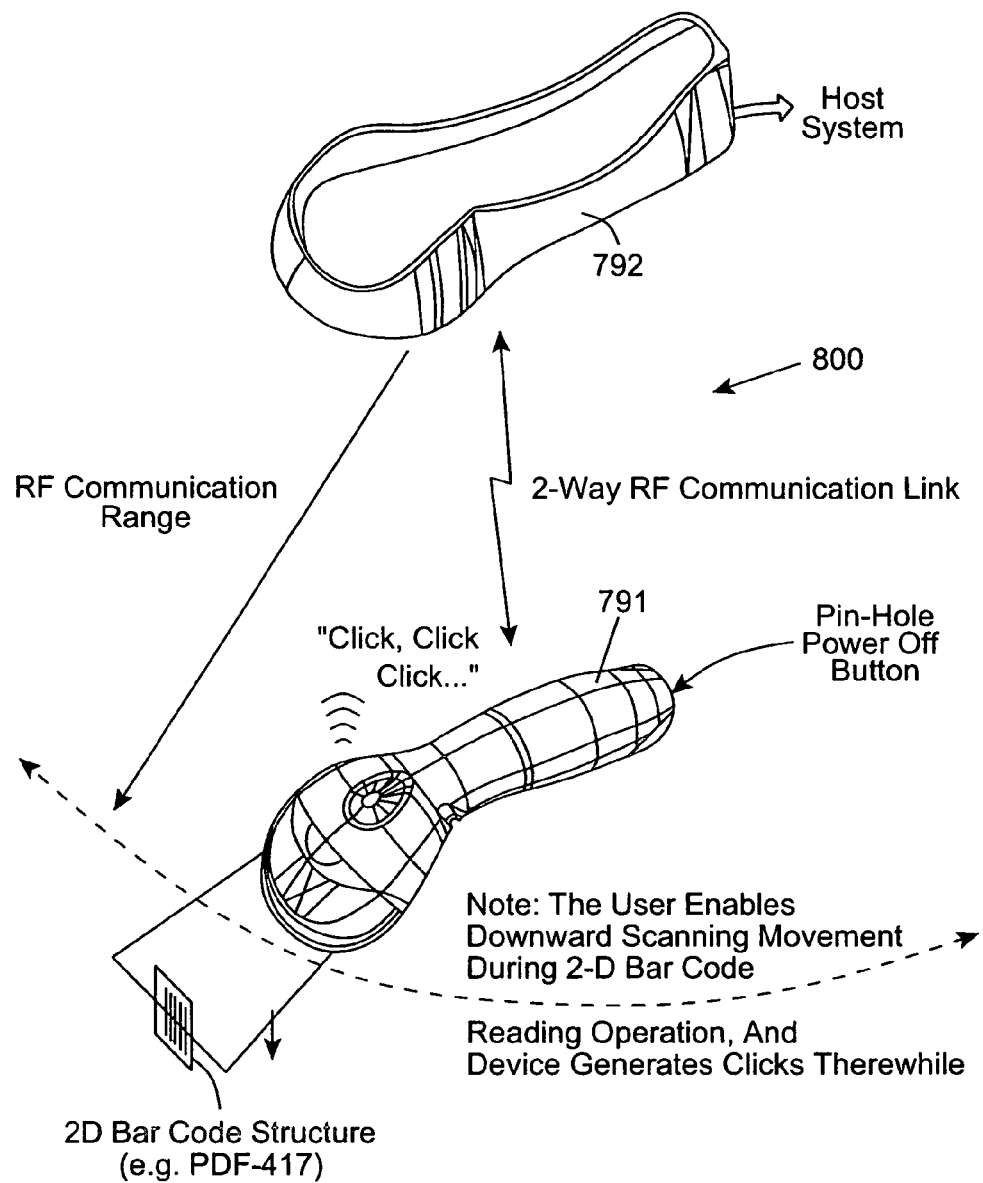
FIG. 16 is a perspective views of an alternative embodiment of the automatic wireless laser scanning bar code symbol reading system of the present invention shown in FIGS. 5A-5J, modified to support the reading of 2-D bar code symbols (e.g. such as the PDF 417 symbology) and the novel 2-way RF-based data communication link interface illustrated in FIGS. 5A-5J, by way of the user manually moving the linear laser scanning pattern generated therefrom in a downward direction along the height dimension of the 2-D bar code structure, and therewhile, the Bar Code Symbol Data Detector (311') employed therein automatically activating the generation of audible sounds (e.g. clicks) as each line of bar code symbol data is detected thereby prior to 2-D symbol decoding and data packet transmission to the remote base station.
Figure 17B:
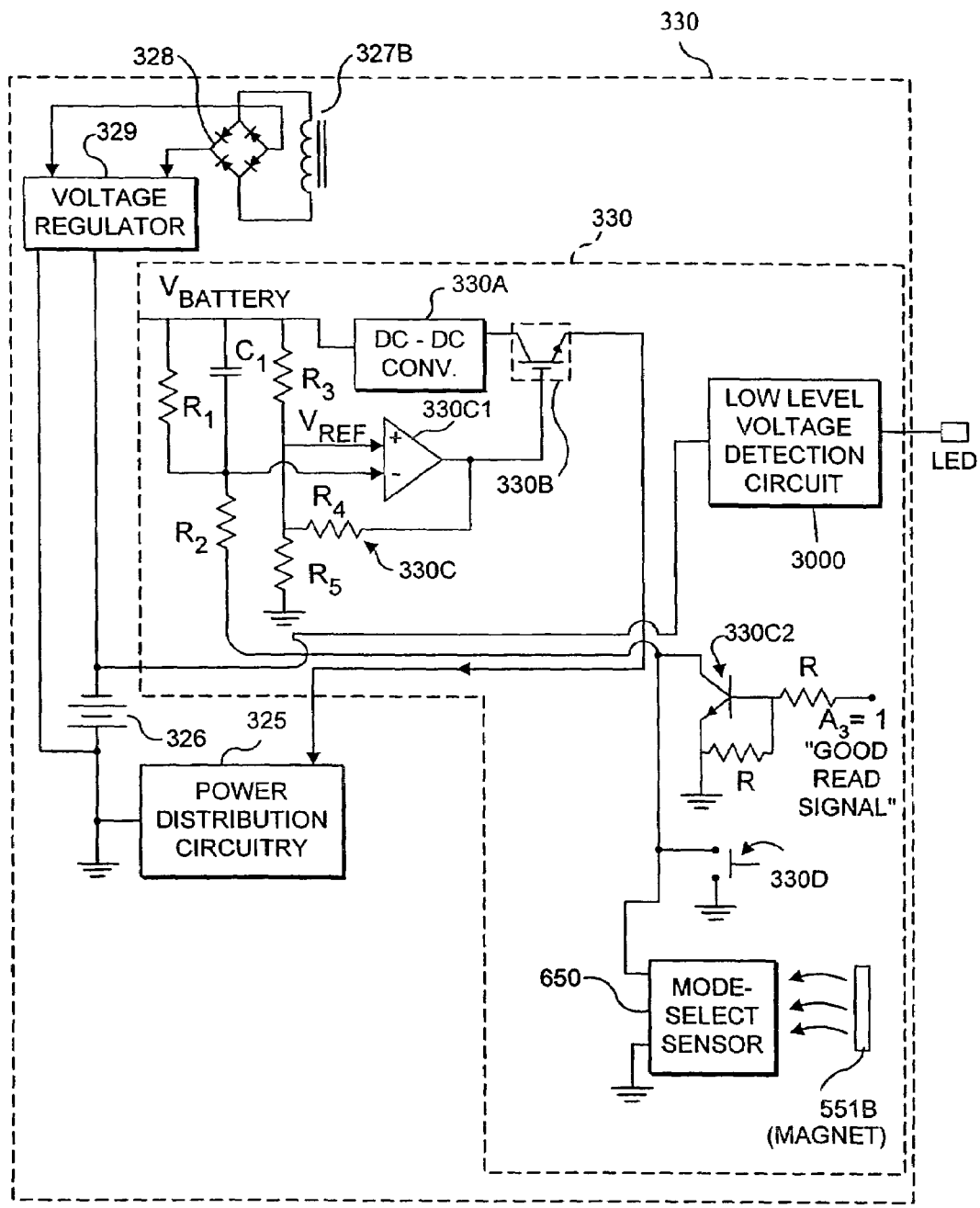
FIG. 17B is a schematic diagram of the automatic power control circuit shown in FIG. 17A3.

FIG. 16 shows an alternative embodiment of the automatic wireless laser scanning bar code symbol reading system shown in FIGS. 5A through 5J, modified to support the reading of 2-D bar code symbols (e.g. such as the PDF 417 symbology) and the novel 2-way RF-based data communication link interface and control structure of the present invention. As shown in FIG. 16, this system is designed to operate by the operator manually moving the linear laser scanning pattern generated from the wireless reader in a downward direction along the height dimension of the 2-D bar code structure. Therewhile, the Bar Code Symbol Data Detector (311') employed therein automatically generates Scan Data Activation Signal $A_2=1$, whereupon the $C_2$ Control Module 313 automatically activates a Audible Data Capture Buffering Indicator (e.g. piezo-electrical transducer) 306, causing audible sounds (e.g. clicks) to be generated as each line of bar code symbol data is detected thereby prior to 2-D symbol decoding.

When the data scanning/collection/buffering process is completed (with the swiping of the linear laser pattern across the 2-D bar code symbol), and each line collected scan data is buffered in memory and ready for decode processing, the system automatically generates a visual indication of such completion (via LEDs on the wireless reader), and if the operator has depressed the data transmission activation switch 330 within when the scanning process is completed, then data packets are automatically transmitted to the remote base station in accordance with the principles of the present invention herein. If the wireless reader is moved outside its communication range, then the data packets are buffered in the Data Packet Group Buffer 802 and subsequently transmitted to the base unit when link status is resumed, as described in detail above.

As illustrated in FIGS. 17A1 through 17B, the wireless system of FIG. 16 is similar to the wireless system shown and described in FIGS. 10A through 10O. except that the wireless system of FIG. 16 employs Barcode Symbol Data Detection Circuit 311' (for detecting lines of 2-D bar code symbols being scanned) instead of Bar Code Symbol Presence Detection Circuit 311 which has been designed to detect the presence of complete 1-D bar code symbols in a real-time manner; (2) Audible Scan Data Capture Buffering Indicator 806, for generating audible clicking or like sounds during the line by line capture of 2-D bar code symbol scan data during barcode swiping operations illustrated in FIG. 16; and (3) a visual indicator (LEDs) for signaling to the operator that the 2-D bar code symbol has been scanned and decoded (i.e. read). Base station unit 440' is similar to base station unit 42 described above.

FIGS. 18A1 through 18C4 shows a high level flow chart of the control process carried out by the control subsystem of the bar code symbol reading system of FIGS. 17A1 through 17B. The primary points of difference between the control processes of these two wireless systems are indicated at Blocks Y through FF in FIGS. 18C2 through 18C3.

By virtue of this alternative embodiment of the present invention, there is now provided an automatically-activated wireless laser scanning 2D bar code symbol reading system for use in a work environment.

Having described the preferred embodiments of the present invention, several modifications come to mind.

For example, in the illustrative embodiments of the present invention, particular types of bar code symbol reading engines disclosed herein have been suggested for incorporation into various types of wireless bar code reading systems. It is understood, however, that any laser scanning bar code symbol reading engine disclosed herein can be incorporated into any wireless laser scanning bar code symbol reading systems of the present invention, regardless of its form factor in relation to the form factor of the engine.

While various types of laser scanning bar code symbol reading mechanisms disclosed herein have been shown or realized in the form of an engine, having a separate housing or module, it is understood that each such mechanism need not have a separate housing or modular structure, but can be integrated directly into the structure of the hand-supportable housing of the bar code symbol reading device.

While the illustrative embodiments of the present invention have been described in connection with various types of bar code symbol reading applications involving 1-D and 2-D bar code structures, it is understood that the present invention can be used in connection with any machine-readable indicia or graphical structures including, but not limited to bar code symbol structures. Hereinafter, the term code symbol shall be deemed to include such information carrying structures.

It is understood that the laser scanning modules, engines and bar code symbol reading Systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A wireless automatically-activated bar code symbol reading system for use in a work environment, said wireless automatically-activated bar code symbol reading system comprising:
 (A) a wireless hand-supportable bar code symbol reader in two-way RF communication with a base station operably connected to a host system, by way of an RF-based wireless data communication link having a predetermined RF communication range over which two-way communication of data packets can occur in a reliable manner, said wireless hand-supportable bar code symbol reader including
  (1) a hand-supportable housing;
  (2) a bar code symbol reading mechanism, disposed in said hand-supportable housing, for reading a bar code symbol on an object and producing a symbol character data string representative of said read bar code symbol;
  (3) a first RF-based transceiver circuit, disposed in said hand-supportable housing, for transmitting to said base station groups of data packets associated with one or more of said produced symbol character data strings;
  (4) a data packet group buffer, disposed in said hand-supportable housing, for buffering one or more groups of data packets associated with symbol character data strings produced in response to the reading of bar code symbols by said bar code symbol reading mechanism;
  (5) a data transmission circuit, disposed in said hand-supportable housing, for transmitting a selected one of said produced symbol character data strings to either said first RF-based transceiver circuit or said data packet group buffer;
  (6) a device controller, disposed within said hand-supportable housing, for controlling the operation of said wireless hand-supportable bar code symbol reader and said first RF-based transceiver circuit; and
 (B) said base station installable within the work environment and including
  (1) a base station housing,
  (2) a second RF-based transceiver circuit, disposed within said base station housing, for receiving groups of data packets corresponding to the symbol character data strings transmitted from said first RF-based transceiver circuit, and
  (3) a base station controller mounted in said base station housing, for controlling the operation of said base station;
 wherein said first and second RF-based transceiver circuits enable the RF-based wireless data communication link between said wireless hand-supportable bar code reader and said base station;
 wherein said first and second RF-based transceiver circuits cooperate to enable the communication of data packets between said wireless hand-supportable bar code symbol reader and said base station, over said RF-based wireless data communication link;
 wherein said second RF-based transceiver includes circuitry for automatically generating and transmitting a reference signal to said first RF-based transceiver circuit over said RF-based wireless data communication link;
 wherein said first RF-based transceiver circuit includes circuitry for automatically receiving said reference signal and detecting the strength of said reference signal;
 wherein said device controller is programmed to automatically detect when said wireless hand-supportable bar code symbol reader is located inside of said predetermined RF communication range based on measuring the strength of said detected reference signal, and thereupon to automatically transmit to said first RF-based transceiver, the symbol character data string produced while said wireless hand-supportable bar code symbol reader is located inside of said predetermined RF communication range; and
 wherein said device controller is programmed to automatically detect when said wireless hand-supportable bar code symbol reader is located outside of said predetermined RF communication range based on measuring the strength of said detected reference signal, and thereupon to automatically collect and store in said data packet group buffer, the symbol character data string produced while said wireless hand-supportable bar code symbol reader is located outside of said predetermined RF communication range.

2. The wireless automatically-activated bar code symbol reading system of claim 1, wherein said wireless hand-supportable bar code reader further comprises an out-of-communication range indicator, integrated within said hand-supportable housing, for generating an audible and/or visual signal indicative that said wireless hand-supportable bar code symbol reader is located outside said predetermined RF communication range; and wherein said device controller controls said data transmission circuit, said data packet group buffer and said out-of-communication range indicator.

3. The wireless automatically-activated bar code symbol reading system of claim 1, wherein said device controller is further programmed to cause said out-of-communication range indicator to automatically generate an audible and/or visual signal when said wireless hand-supportable bar code symbol reader is detected as being located outside of said predetermined RF communication range based on measuring the strength of said detected reference signal.

4. The wireless automatically-activated bar code symbol reading system of claim 1, wherein said base station further comprises: a cradle portion adapted for receiving said hand-supportable housing.

5. The wireless automatically-activated bar code symbol reading system of claim 4, wherein said cradle portion includes a radio antenna.

6. The wireless automatically-activated bar code symbol reading system of claim 1, wherein said data packet group buffer is realized as a memory chip installed aboard said hand-supportable housing.

7. The wireless automatically-activated bar code symbol reading system of claim 1, wherein said reference signal is a heartbeat-type signal generated from said second RF-based transceiver circuit.

8. The wireless automatically-activated bar code symbol reading system of claim 1, wherein said first RF-based transceiver circuit and said device controller are realized as a first RF-based chipset disposed within said hand-supportable housing.

9. The wireless automatically-activated bar code symbol reading system of claim 1, wherein said second RF-based transceiver circuit and said base station controller are realized as a second RF-based chipset disposed within said base station housing.

10. The wireless automatically-activated bar code symbol reading system of claim 1, which further comprises a good read indicator, integrated with said hand-supportable housing, for indicating each instance of when a bar code symbol is read by said bar code symbol reading mechanism and a symbol character data string representative thereof is produced.

11. The wireless automatically-activated bar code symbol reading system of claim 1, which further comprises an object detection subsystem disposed within said hand-supportable housing and including infrared (IR) signal transmission/receiving circuitry for automatically detecting said object within an object detection field definable relative to said hand-supportable housing.

12. The wireless automatically-activated bar code symbol reading system of claim 1, which further comprises an object detection subsystem disposed within said hand-supportable housing, and including a low-power non-visible laser beam signaling mechanism for automatically detecting said object within an object detection field definable relative to said hand-supportable housing.

13. The wireless automatically-activated bar code symbol reading system of claim 1, wherein said device controller is further programmed so that said device controller automatically tests said RF-based wireless data communication link prior to transmitting symbol character data, stored in said data packet group buffer, to said first RF-based transceiver circuit when said wireless hand-supportable bar code symbol reader is once again located inside of said predetermined RF communication range.

14. The wireless automatically-activated bar code symbol reading system of claim 1, wherein said wireless bar code symbol reader further comprises three LEDs integrated with said hand-supportable housing, and wherein said device controller is programmed so that said three LEDs are illuminated to indicate that said wireless reader is located outside of said predetermined RF communication range out of range.

15. The wireless automatically-activated bar code symbol reading system of claim 1, wherein said wireless hand-supportable bar code symbol reader further comprises three LEDs integrated with said hand-supportable housing, and wherein said device controller is programmed so that said three LEDs are illuminated to indicate that symbol character data is stored in said data packet group buffer waiting to be transmitted to said base station by way of said RF-based wireless data communication link.

16. The wireless automatically-activated bar code symbol reading system of claim 1, wherein said device controller is programmed so that symbol character data stored within said data packet group buffer can be cleared by holding down said manually-operated data transmission activation switch for a second predetermined time duration.

17. The wireless automatically-activated bar code symbol reading system of claim 1, wherein said bar code symbol reading mechanism comprises a laser scanning bar code symbol reading mechanism capable of producing a visible laser scanning pattern for automatically reading a bar code symbol on an object within a first predetermined time period, and each instant said bar code symbol is read by said visible laser scanning pattern within said first predetermined time period, automatically producing a symbol character data string representative of said read bar code symbol.

* * * * *